US012532884B2

(12) United States Patent
Rendine et al.

(10) Patent No.: US 12,532,884 B2
(45) Date of Patent: Jan. 27, 2026

(54) FUNGICIDAL COMPOSITIONS

(71) Applicant: SYNGENTA CROP PROTECTION AG, Basel (CH)

(72) Inventors: Stefano Rendine, Stein (CH); Farhan Bou Hamdan, Stein (CH); Laura Quaranta, Basel (CH); Simon Williams, Stein (CH); Matthias Weiss, Stein (CH); Thomas James Hoffman, Stein (CH); Ulrich Johannes Haas, Stein (CH); David Beattie, Basel (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 639 days.

(21) Appl. No.: 17/905,472

(22) PCT Filed: Mar. 5, 2021

(86) PCT No.: PCT/EP2021/055593
§ 371 (c)(1),
(2) Date: Sep. 1, 2022

(87) PCT Pub. No.: WO2021/176057
PCT Pub. Date: Sep. 10, 2021

(65) Prior Publication Data

US 2023/0125322 A1 Apr. 27, 2023

(30) Foreign Application Priority Data

Mar. 5, 2020 (GB) ..................................... 2003214
Dec. 18, 2020 (GB) ..................................... 2020137

(51) Int. Cl.

| | |
|---|---|
| ***A01N 37/10*** | (2006.01) |
| ***A01N 37/34*** | (2006.01) |
| ***A01N 37/36*** | (2006.01) |
| ***A01N 37/38*** | (2006.01) |
| ***A01N 37/42*** | (2006.01) |
| ***A01N 37/50*** | (2006.01) |
| ***A01N 39/04*** | (2006.01) |
| ***A01N 43/40*** | (2006.01) |
| ***A01N 43/42*** | (2006.01) |
| ***A01N 43/54*** | (2006.01) |
| ***A01N 43/56*** | (2006.01) |
| ***A01N 43/653*** | (2006.01) |
| ***A01N 43/713*** | (2006.01) |
| ***A01N 43/82*** | (2006.01) |
| ***A01N 43/84*** | (2006.01) |
| ***A01N 45/02*** | (2006.01) |
| ***A01N 47/04*** | (2006.01) |
| ***A01N 47/14*** | (2006.01) |
| ***A01N 47/24*** | (2006.01) |
| ***A01N 53/00*** | (2006.01) |
| ***A01N 57/20*** | (2006.01) |

(Continued)

(52) U.S. Cl.
CPC ............. *A01N 37/10* (2013.01); *A01N 37/34* (2013.01); *A01N 37/36* (2013.01); *A01N 37/38* (2013.01); *A01N 37/42* (2013.01); *A01N 37/50* (2013.01); *A01N 39/04* (2013.01); *A01N 43/40* (2013.01); *A01N 43/42* (2013.01); *A01N 43/54* (2013.01); *A01N 43/56* (2013.01); *A01N 43/653* (2013.01); *A01N 43/713* (2013.01); *A01N 43/82* (2013.01); *A01N 43/84* (2013.01); *A01N 45/02* (2013.01); *A01N 47/04* (2013.01); *A01N 47/14* (2013.01); *A01N 47/24* (2013.01); *A01N 53/00* (2013.01); *A01N 57/20* (2013.01); *A01N 59/02* (2013.01); *A01N 59/16* (2013.01); *A01N 59/20* (2013.01); *A01N 59/26* (2013.01); *A01P 3/00* (2021.08)

(58) Field of Classification Search
CPC ........ A01N 37/10; A01N 43/54; A01N 37/38; A01N 37/36; A01N 43/40; A01N 43/82; A01N 37/34; A01N 37/42; A01N 37/50; A01N 39/04; A01N 43/42; A01N 43/56; A01N 43/653; A01N 43/713; A01N 43/84; A01N 45/02; A01N 47/04; A01N 47/14; A01N 47/24; A01N 53/00; A01N 57/20; A01N 59/02; A01N 59/16; A01N 59/20; A01N 59/26; A01P 3/00
See application file for complete search history.

(56) References Cited

U.S. PATENT DOCUMENTS

| | | | |
|---|---|---|---|
| 5,312,960 | A | 5/1994 | Kramer et al. |
| 6,221,808 | B1 | 4/2001 | Schmidt et al. |

(Continued)

FOREIGN PATENT DOCUMENTS

| | | | |
|---|---|---|---|
| DE | 4019307 | A1 | 12/1991 |
| EP | 0178826 | A2 | 4/1986 |

(Continued)

OTHER PUBLICATIONS

Hiroshi, S., Acrylic Acid Derivatives, Use of the Same and Intermediates for the Preparation Thereof (WO0100562), 2001, Espacenet English Translation, 33 pages. (Year: 2001).*

(Continued)

*Primary Examiner* — Ali Soroush
*Assistant Examiner* — Andriae M Holt
(74) *Attorney, Agent, or Firm* — BakerHostetler; Toni-Junell Herbert

(57) ABSTRACT

A fungicidal composition comprising a mixture of components (A) and (B), wherein components (A) and (B) are as defined in claim 1, and use of the compositions in agriculture or horticulture for controlling or preventing infestation of plants by phytopathogenic microorganisms, preferably fungi.

19 Claims, No Drawings

(51) Int. Cl.

| | |
|---|---|
| ***A01N 59/02*** | (2006.01) |
| ***A01N 59/16*** | (2006.01) |
| ***A01N 59/20*** | (2006.01) |
| ***A01N 59/26*** | (2006.01) |
| ***A01P 3/00*** | (2006.01) |

(56) References Cited

U.S. PATENT DOCUMENTS

| | | | |
|---|---|---|---|
| 2021/0307328 | A1 | 10/2021 | Matsuzaki et al. |
| 2022/0256844 | A1 | 8/2022 | Tamashima |

FOREIGN PATENT DOCUMENTS

| | | | |
|---|---|---|---|
| EP | 0212859 | A2 | 3/1987 |
| JP | 2020079269 | A | 5/2020 |
| JP | 2021035985 | A | 3/2021 |
| JP | 2021035986 | A | 3/2021 |
| JP | 2021035988 | A | 3/2021 |
| WO | 9608969 | A2 | 3/1996 |
| WO | 9732842 | A1 | 9/1997 |
| WO | 9803464 | A1 | 1/1998 |
| WO | 9817115 | A1 | 4/1998 |
| WO | 9834898 | A1 | 8/1998 |
| WO | 0100562 | A1 | 1/2001 |
| WO | 2010149732 | A2 | 12/2010 |
| WO | 2020027214 | A1 | 2/2020 |
| WO | 2020027216 | A1 | 2/2020 |
| WO | 2020079111 | A1 | 4/2020 |
| WO | 2020193387 | A1 | 10/2020 |
| WO | 2020262648 | A1 | 12/2020 |
| WO | 2021153754 | A1 | 8/2021 |
| WO | 2021153756 | A1 | 8/2021 |
| WO | 2021153757 | A1 | 8/2021 |
| WO | 2021153758 | A1 | 8/2021 |
| WO | 2021153759 | A1 | 8/2021 |
| WO | 2021153760 | A1 | 8/2021 |
| WO | 2021153782 | A1 | 8/2021 |
| WO | 2021153786 | A1 | 8/2021 |
| WO | 2021153794 | A1 | 8/2021 |
| WO | 2021219386 | A1 | 11/2021 |
| WO | 2021219387 | A1 | 11/2021 |
| WO | 2021219388 | A1 | 11/2021 |
| WO | 2021219390 | A1 | 11/2021 |
| WO | 2022004702 | A1 | 1/2022 |
| WO | 2022004704 | A1 | 1/2022 |
| WO | 2022008303 | A1 | 1/2022 |
| WO | 2022013009 | A1 | 1/2022 |
| WO | 2022033906 | A1 | 2/2022 |
| WO | 2022181793 | A1 | 9/2022 |

OTHER PUBLICATIONS

Written Opinion of the International Searching Authority and International Search Report for International Application No. PCT/EP2021/055593, mailed Jun. 11, 2021.

* cited by examiner

FUNGICIDAL COMPOSITIONS

CROSS-REFERENCE TO RELATED APPLICATIONS

This application is a 371 National Stage application of International Application No. PCT/EP2021/055593 filed Mar. 5, 2021, which claims priority to GB 2003214.0, filed Mar. 5, 2020, and GB 2020137.2, filed Dec. 18, 2020, the entire contents of these applications are hereby incorporated by reference.

The present invention relates to novel fungicidal compositions, to their use in agriculture or horticulture for controlling diseases caused by phytopathogens, especially phytopathogenic fungi, and to methods of controlling diseases on useful plants.

Whilst many fungicidal compounds and compositions, belonging to various different chemical classes, have been/are being developed for use as fungicides in crops of useful plants, crop tolerance and activity against particular phytopathogenic fungi do not always satisfy the needs of agricultural practice in many respects. Therefore, there is a continuing need to find new compounds and compositions having superior biological properties for use in controlling or preventing infestation of plants by phytopathogenic fungi. For example, compounds possessing a greater biological activity, an advantageous spectrum of activity, an increased safety profile, improved physico-chemical properties, increased biodegradability. Or else, compositions possessing a broader spectrum of activity, improved crop tolerance, synergistic interactions or potentiating properties, or compositions which display a more rapid onset of action or which have longer lasting residual activity or which enable a reduction in the number of applications and/or a reduction in the application rate of the compounds and compositions required for effective control of a phytopathogen, thereby enabling beneficial resistance-management practices, reduced environmental impact and reduced operator exposure.

The use of compositions comprising mixtures of different fungicidal compounds possessing different modes of action can address some of these needs (e.g., by combining fungicides with differing spectrums of activity).

According to the present invention, there is provided a fungicidal composition comprising a mixture of components (A) and (B) as active ingredients, wherein component (A) is a compound of formula (I)

(I)

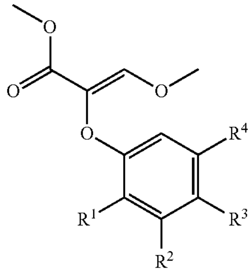

wherein $R^1$ is methyl;

$R^2$ is hydrogen;

$R^3$ is hydrogen;

$R^4$ is $C_3$-$C_7$cycloalkyl;

or an agronomically acceptable salt thereof;

and component (B) is a compound selected from the group consisting of:

bixafen, sulfur, copper hydroxide, triclopyricarb, acibenzolar-S-methyl, copper oxychloride, cyproconazole, difenoconazole, epoxicon-azole, flutriafol, hexaconazole, ipconazole, metconazole, paclobutrazole, prothioconazole, prochloraz, propiconazole, pyrisoxazole, tebuconazole, fenpropidin, fenpropimorph, spiroxamine, cyprodinil, fludioxonil, metalaxyl, metalaxyl-M (mefenoxam), carbendazim, penthiopyrad, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, folpet, chlorothalonil, fluazinam, fluxapyroxad, fenhexamid, fos-etyl-aluminium, pyribencarb, tricyclazole, mandipropamid, flubeneteram, isopyrazam, sedaxane, benzovindiflupyr, pydiflumetofen, isoflucypram, isotianil, dipymetitrone, fluindapyr, coumethoxystrobin (jiaxiangjunzhi), Ivbenmixianan, mandestrobin, oxathiapiprolin, pyraziflumid, inpyrfluxam, mefentrifluconazole, ipfentrifluconazole, aminopyrifen, (Z,2E)-5-[1-(4-chlorophenyl)pyrazol-3-yl]oxy-2-methoxyimino-N,3-dimethyl-pent-3-enamide, florylpicoxamid, fenpicoxamid, ipflufenoquin, quinofumelin, benzothiostrobin, fluopyram, pyrapropoyne, 2-(difluoromethyl)-N-(3-ethyl-1,1-dimethyl-indan-4-yl)pyridine-3-carboxamide, 4-[[6-[2-(2,4-difluorophenyl)-1,1-difluoro-2-hydroxy-3-(1,2,4-triazol-1-yl)propyl]-3-pyridyl]oxy]benzonitrile, metyltetraprole, fluoxapiprolin, enoxastrobin, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile, trinexapac, trinexapac-ethyl, coumoxystrobin, N'-[5-bromo-2-methyl-6-[(1S)-1-methyl-2-propoxy-ethoxy]-3-pyridyl]-N-ethyl-N-methyl-formamidine, N'-[5-bromo-2-methyl-6-[(1-methyl-2-propoxy-ethoxy]-3-pyridyl]-N-ethyl-N-methyl-formamidine, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N'-[5-bromo-2-methyl-6-(2-propoxypropoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N'-[4-(1-cyclopropyl-2,2,2-trifluoro-1-hydroxy-ethyl)-5-methoxy-2-methyl-phenyl]-N-isopropyl-N-methyl-formamidine, N-ethyl-N'-[5-methoxy-2-methyl-4-[2-trifluoromethyl)oxetan-2-yl]phenyl]-N-methyl-formamidine, N-ethyl-N'-[5-methoxy-2-methyl-4-[2-trifuoromethyl)tetrahydrofuran-2-yl]phenyl]-N- methyl-formamidine, N-(2-fluorophenyl)-4-[5-(trifluoromethyl)-1,2,4-oxadiazol-3-yl]benzamide, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, [(1S,2S)-1-methyl-2-(o-tolyl)propyl](2S)-2-[(4-methoxy-3-propanoyloxy-pyridine-2-carbonyl)amino]propanoate, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol yl]phenyl]methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl]phenyl]methyl]isoxazolidin-3-one, 5,5-dimethyl-2-[[4-[5-(trifluoromethyl)-1,2,4-oxadiazol-3-yl]phenyl]methyl]isoxazolidin-3-one, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile, 3-[2-(1-chlorocyclopropyl)-3-(3-chloro-2-fluoro-phenyl)-2-hydroxy-propyl]imidazole-4-carbonitrile, (4-phenoxyphenyl)methyl 2-amino-6-methyl-pyridine-3-carboxylate, N-methyl-4-[5-(trifluoromethyl)-1,2,4-oxadiazol-3-yl]benzenecarbothioamide; N-methyl-4-[5-(trifluoromethyl)-1,2,4-oxadiazol-3-yl]benzamide; (Z,2E)-5-[1-(2,4-dichlorophenyl)pyrazol-3-yl]oxy-2-methoxyimino-N,3-dimethyl-pent-3-enamide, (5-methyl-2-pyridyl)-[4-[5-(trifluoromethyl)-1,2,4-oxadiazol-3-yl]phenyl]methanone, (3-methylisoxazol-5-yl)-[4-[5-(trifluoromethyl)-1,2,4-oxadiazol-3-yl]phenyl]methanone, ethyl 1-[[5-[5-(trifluoromethyl)-1,2,4-oxadiazol-3-yl]-2-thienyl]methyl]pyrazole-4-carboxylate, 2,2-difluoro-N-methyl-2-[4-[5-(trifluoromethyl)-1,2,4-oxadiazol-3-yl]phenyl]acetamide, N—[(Z)-methoxyiminomethyl]-4-[5-(trifluoromethyl)-1,2,4-oxadiazol-3-yl]benzamide, N—[N-methoxy-C-methyl-carbonimidoyl]-4-[5-(trifluoromethyl)-1,2,4-oxadiazol-3-yl]benzamide, N-[3-(4-chlorophenyl)-4,5-dihydroisoxazol-5-yl]-5-methyl-1,2,4-oxadiazole-3-carboxamide, 2-(difluoromethyl)-N-(1,1-dimethyl-3-propyl-indan-4-yl)pyridine-3-carboxamide, [(1S,2S)-2-(4-fluoro-2-methyl-phenyl)-1,3-dimethyl-butyl](2S)-2-[(3-acetoxy-4-methoxy-pyridine-2-carbonyl)amino]propanoate, [(1S,2S)-2-(4-fluoro-2-methyl-phenyl)-1,3-dimethyl-butyl](2S)-2-[[3-(acetoxymethoxy)-4-methoxy-pyridine-2-carbonyl]amino]propanoate, cis-jasmone, potassium phosphonate, calcium phosphonate, glyphosate (including the diammonium, isopropylammonium and potassium salts thereof), 2,4-D (including the choline salt and 2-ethylhexyl ester thereof), dicamba (including the aluminium, aminopropyl, bis-aminopropylmethyl, choline, dichloroprop, diglycolamine, dimethylamine, dimethylammonium, potassium and sodium salts thereof), glufosinate (including the ammonium salt thereof), thiamethoxam, cyclobutrifluram, isocycloseram, spiropidion, abamectin, emamectin, cyantraniliprole, chlorantraniliprole, diafenthiuron, broflanilide, 2-chloro-N-cyclopropyl-5-(1-{2,6-dichloro-4-[1,2,2,2-tetrafluoro-1-(trifluoromethyl)ethyl]phenyl}-1H-pyrazol-4-yl)-N-methylnicotinamide and fluxametamide.

In general, the weight ratio of component (A) to component (B) may preferably be from 100:1 to 1:100, from 50:1 to 1:50, from 20:1 to 1:50, from 15:1 to 1:50 from 15:1 to 1:30, from 12:1 to 1:25, from 10:1 to 1:20, from 5:1 and 1:15, from 3:1 to 1:10 or from 2:1 to 1:5.

Further according to the invention, there is provided a method of controlling or preventing phytopathogenic diseases, especially phytopathogenic fungi, on useful plants or on propagation material thereof, which comprises applying to the useful plants, the locus thereof or propagation material thereof a fungicidal composition according to the invention.

The benefits provided by certain fungicidal mixture compositions according to the invention may also include, inter alia, advantageous levels of biological activity for protecting plants against diseases that are caused by fungi or superior properties for use as agrochemical active ingredients (for example, greater biological activity, an advantageous spectrum of activity, an increased safety profile, improved physico-chemical properties, or increased biodegradability).

Preferred groups and values for the substituents $R^1$, $R^2$, $R^3$ and $R^4$ in the compounds of formula (I) are, in any combination thereof, as set out below.

$R^1$ is methyl.

$R^2$ is hydrogen.

$R^3$ is hydrogen.

$R^4$ is $C_3$-$C_7$cycloalkyl.

Preferably, component (A) is a compound selected from, methyl (Z)-2-(5-cyclobutyl-2-methyl-phenoxy)-3-methoxy-prop-2-enoate (compound X.01), methyl (Z)-2-(5-cyclopentyl-2-methyl-phenoxy)-3-methoxy-prop-2-enoate (compound X.02), methyl (Z)-2-(5-cyclopropyl-2-methyl-phenoxy)-3-methoxy-prop-2-enoate (compound X.03), or methyl (Z)-2-(5-cyclohexyl-2-methyl-phenoxy)-3-methoxy-prop-2-enoate (compound X.04), as defined in Table X below.

More preferably, component (A) is a compound selected from, methyl (Z)-2-(5-cyclopentyl-2-methyl-phenoxy)-3-methoxy-prop-2-enoate (compound X.02), or methyl (Z)-2-(5-cyclohexyl-2-methyl-phenoxy)-3-methoxy-prop-2-enoate (compound X.04), as defined in Table X below.

In one embodiment component (A) is methyl (Z)-2-(5-cyclopentyl-2-methyl-phenoxy)-3-methoxy-prop-2-enoate (compound X.02).

In another embodiment component (A) is methyl (Z)-2-(5-cyclohexyl-2-methyl-phenoxy)-3-methoxy-prop-2-enoate (compound X.04).

TABLE X

| Compound number | Compound structure | IUPAC name |
|---|---|---|
| X.01 | 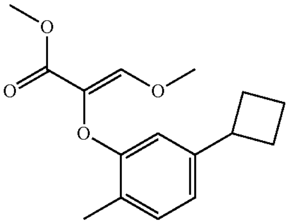 [SMILES: CO/C=C(\Oc1cc(C2CCC2)ccc1C)C(=O)OC] | methyl (Z)-2-(5-cyclobutyl-2-methyl-phenoxy)-3-methoxy-prop-2-enoate |
| X.02 | 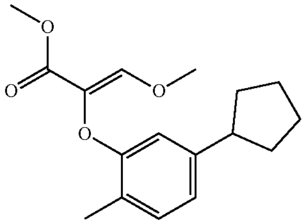 [SMILES: CO/C=C(\Oc1cc(C2CCCC2)ccc1C)C(=O)OC] | methyl (Z)-2-(5-cyclopentyl-2-methyl-phenoxy)-3-methoxy-prop-2-enoate |
| X.03 | 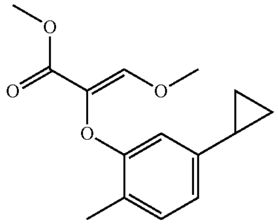 [SMILES: CO/C=C(\Oc1cc(C2CC2)ccc1C)C(=O)OC] | methyl (Z)-2-(5-cyclopropyl-2-methyl-phenoxy)-3-methoxy-prop-2-enoate |
| X.04 | 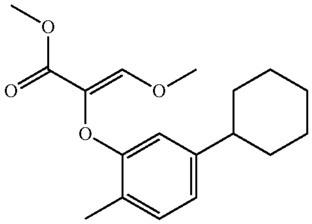 [SMILES: CO/C=C(\Oc1cc(C2CCCCC2)ccc1C)C(=O)OC] | methyl (Z)-2-(5-cyclohexyl-2-methyl-phenoxy)-3-methoxy-prop-2-enoate |

Component (B) is a compound selected from the group consisting of:

bixafen, sulfur, copper hydroxide, triclopyricarb, acibenzolar-S-methyl, copper oxychloride, cyproconazole, difenoconazole, epoxicon-azole, flutriafol, hexaconazole, ipconazole, metconazole, paclobutrazole, prothioconazole, prochloraz, propiconazole, pyrisoxazole, tebuconazole, fenpropidin, fenpropimorph, spiroxamine, cyprodinil, fludioxonil, metalaxyl, metalaxyl-M (mefenoxam), carbendazim, penthiopyrad, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, folpet, chlorothalonil, fluazinam, fluxapyroxad, fenhexamid, fosetyl-aluminium, pyribencarb, tricyclazole, mandipropamid, flubeneteram, isopyrazam, sedaxane, benzovindiflupyr, pydiflumetofen, isoflucypram, isotianil, dipymetitrone, fluindapyr, coumethoxystrobin (jiaxiangjunzhi), Ivbenmixianan, mandestrobin, oxathiapiprolin, pyraziflumid, inpyrfluxam, mefentrifluconazole, ipfentrifluconazole, aminopyrifen, (Z,2E)-5-[1-(4-chlorophenyl)pyrazol-3-yl]oxy-2-methoxyimino-N,3-dimethyl-pent-3-enamide, florylpicoxamid, fenpicoxamid, ipflufenoquin, quinofumelin, benzothiostrobin, fluopyram, pyrapropoyne, 2-(difluoromethyl)-N-(3-ethyl-1,1-dimethyl-indan-4-yl)pyridine-3-carboxamide, 4-[[6-[2-(2,4-difluorophenyl)-1,1-difluoro-2-hydroxy-3-(1,2,4-triazol-1-yl)propyl]-3-pyridyl]oxy]benzonitrile, metyltetraprole, fluoxapiprolin, enoxastrobin, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile, trinexapac, trinexapac-ethyl, coumoxystrobin, N'-[5-bromo-2-methyl-6-[(1S)-1-methyl-2-propoxy-ethoxy]-3-pyridyl]-N-ethyl-N-methyl-formamidine, N'-[5-bromo-2-methyl-6-[(1R)-1-methyl-2-propoxy-ethoxy]-3-pyridyl]-N-ethyl-N-methyl-formamidine, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N'-[5-bromo-2-methyl-6-(2-propoxypropoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N'-[4-

(1-cyclopropyl-2,2,2-trifluoro-1-hydroxy-ethyl)-5-methoxy-2-methyl-phenyl]-N-isopropyl-N-methyl-formamidine, N-ethyl-N'-[5-methoxy-2-methyl-4-[2-trifluoromethyl)oxetan-2-yl]phenyl]-N-methyl-formamidine, N-ethyl-N'-[5-methoxy-2-methyl-4-[2-trifuoromethyl)tetrahydrofuran-2-yl]phenyl]-N-methyl-formamidine, N-(2-fluorophenyl)-4-[5-(trifluoromethyl)-1,2,4-oxadiazol-3-yl]benzamide, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, [(1S,2S)-1-methyl-2-(o-tolyl)propyl](2S)-2-[(4-methoxy-3-propanoyloxy-pyridine-2-carbonyl)amino]propanoate, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl]phenyl]methyl]isoxazolidin-3-one, 5,5-dimethyl-2-[[4-[5-(trifluoromethyl)-1,2,4-oxadiazol-3-yl]phenyl]methyl]isoxazolidin-3-one, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile, 3-[2-(1-chlorocyclopropyl)-3-(3-chloro-2-fluoro-phenyl)-2-hydroxy-propyl]imidazole-4-carbonitrile, (4-phenoxyphenyl)methyl 2-amino-6-methyl-pyridine-3-carboxylate, N-methyl-4-[5-(trifluoromethyl)-1,2,4-oxadiazol-3-yl]benzenecarbothioamide; N-methyl-4-[5-(trifluoromethyl)-1,2,4-oxadiazol-3-yl]benzamide; (Z,2E)-5-[1-(2,4-dichlorophenyl)pyrazol-3-yl]oxy methoxyimino-N,3-dimethyl-pent-3-enamide, (5-methyl-2-pyridyl)-[4-[5-(trifluoromethyl)-1,2,4-oxadiazol-3-yl]phenyl]methanone, (3-methylisoxazol-5-yl)-[4-[5-(trifluoromethyl)-1,2,4-oxadiazol yl]phenyl]methanone, ethyl 1-[[5-[5-(trifluoromethyl)-1,2,4-oxadiazol-3-yl]-2-thienyl]methyl]pyrazole carboxylate, 2,2-difluoro-N-methyl-2-[4-[5-(trifluoromethyl)-1,2,4-oxadiazol-3-yl]phenyl]acetamide, N—[(Z)-methoxyiminomethyl]-4-[5-(trifluoromethyl)-1,2,4-oxadiazol-3-yl]benzamide, N—[N-methoxy-C-methyl-carbonimidoyl]-4-[5-(trifluoromethyl)-1,2,4-oxadiazol-3-yl]benzamide, N-[3-(4-chlorophenyl)-4,5-dihydroisoxazol-5-yl]-5-methyl-1,2,4-oxadiazole-3-carboxamide, 2-(difluoromethyl)-N-(1,1-dimethyl-3-propyl-indan-4-yl)pyridine-3-carboxamide, [(1S,2S)-2-(4-fluoro-2-methyl-phenyl)-1,3-dimethyl-butyl] (2S)-2-[(3-acetoxy-4-methoxy-pyridine-2-carbonyl)amino]propanoate, [(1S,2S)-2-(4-fluoro-2-methyl-phenyl)-1,3-dimethyl-butyl] (2S)-2-[[3-(acetoxymethoxy)-4-methoxy-pyridine-2-carbonyl]amino]propanoate, cis-jasmone, potassium phosphonate, calcium phosphonate, glyphosate (including the diammonium, isopropylammonium and potassium salts thereof), 2,4-D (including the choline salt and 2-ethylhexyl ester thereof), dicamba (including the aluminium, aminopropyl, bis-aminopropylmethyl, choline, dichloroprop, diglycolamine, dimethylamine, dimethylammonium, potassium and sodium salts thereof), glufosinate (including the ammonium salt thereof), thiamethoxam, cyclobutrifluram, isocycloseram, spiropidion, abamectin, emamectin, cyantraniliprole, chlorantraniliprole, diafenthiuron, broflanilide, 2-chloro-N-cyclopropyl-5-(1-{2,6-dichloro-4-[1,2,2,2-tetrafluoro-1-(trifluoromethyl)ethyl]phenyl}-1H-pyrazol-4-yl)-N-methylnicotinamide and fluxametamide.

Preferably component (B) is a compound selected from the group consisting of, bixafen, sulfur, copper hydroxide, triclopyricarb, acibenzolar-S-methyl, copper oxychloride, cyproconazole, difenoconazole, epoxicon-azole, flutriafol, hexaconazole, ipconazole, metconazole, paclobutrazole, prothioconazole, prochloraz, propiconazole, pyrisoxazole, tebuconazole, fenpropidin, fenpropimorph, spiroxamine, cyprodinil, fludioxonil, metalaxyl, metalaxyl-M (mefenoxam), carbendazim, penthiopyrad, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, folpet, chlorothalonil, fluazinam, fluxapyroxad, fenhexamid, fosetyl-aluminium, pyribencarb, tricyclazole, mandipropamid, flubeneteram, isopyrazam, sedaxane, benzovindiflupyr, pydiflumetofen, isoflucypram, isotianil, dipymetitrone, fluindapyr, coumethoxystrobin (jiaxiangjunzhi), Ivbenmixianan, mandestrobin, oxathiapiprolin, pyraziflumid, inpyrfluxam, mefentrifluconazole, ipfentrifluconazole, aminopyrifen, (Z,2E)-5-[1-(4-chlorophenyl)pyrazol-3-yl]oxy-2-methoxyimino-N,3-dimethyl-pent-3-enamide, florylpicoxamid, fenpicoxamid, ipflufenoquin, quinofumelin, benzothiostrobin, fluopyram, pyrapropoyne, 2-(difluoromethyl)-N-(3-ethyl-1,1-dimethyl-indan-4-yl)pyridine-3-carboxamide, 4-[[6-[2-(2,4-difluorophenyl)-1,1-difluoro-2-hydroxy-3-(1,2,4-triazol-1-yl)propyl]-3-pyridyl]oxy]benzonitrile, metyltetraprole, fluoxapiprolin, enoxastrobin, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile, trinexapac, trinexapac-ethyl, coumoxystrobin, N'-[5-bromo-2-methyl-6-[(1S)-1-methyl-2-propoxy-ethoxy]-3-pyridyl]-N-ethyl-N-methyl-formamidine, N'-[5-bromo-2-methyl-6-[(1R)-1-methyl-2-propoxy-ethoxy]-3-pyridyl]-N-ethyl-N-methyl-formamidine, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N'-[5-bromo-2-methyl-6-(2-propoxypropoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N'-[4-(1-cyclopropyl-2,2,2-trifluoro-1-hydroxy-ethyl)-5-methoxy-2-methyl-phenyl]-N-isopropyl-N-methyl-formamidine, N-ethyl-N'-[5-methoxy-2-methyl-4-[2-trifluoromethyl)oxetan-2-yl]phenyl]-N-methyl-formamidine, N-ethyl-N'-[5-methoxy-2-methyl-4-[2-trifluoromethyl)tetrahydrofuran-2-yl]phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-

(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl]phenyl]methyl]isoxazolidin-3-one, 5,5-dimethyl-2-[[4-[5-(trifluoromethyl)-1,2,4-oxadiazol-3-yl]phenyl]methyl]isoxazolidin-3-one, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile, 3-[2-(1-chlorocyclopropyl)-3-(3-chloro-2-fluoro-phenyl)-2-hydroxy-propyl]imidazole-4-carbonitrile, (4-phenoxyphenyl)methyl 2-amino-6-methyl-pyridine-3-carboxylate, N-methyl-4-[5-(trifluoromethyl)-1,2,4-oxadiazol-3-yl]benzenecarbothioamide; N-methyl-4-[5-(trifluoromethyl)-1,2,4-oxadiazol-3-yl]benzamide; (Z,2E)-5-[1-(2,4-dichlorophenyl)pyrazol-3-yl]oxy-2-methoxyimino-N,3-dimethyl-pent-3-enamide, (5-methyl-2-pyridyl)-[4-[5-(trifluoromethyl)-1,2,4-oxadiazol-3-yl]phenyl]methanone, (3-methylisoxazol-5-yl)-[4-[5-(trifluoromethyl)-1,2,4-oxadiazol-3-yl]phenyl]methanone, ethyl 1-[[5-[5-(trifluoromethyl)-1,2,4-oxadiazol-3-yl]-2-thienyl]methyl]pyrazole-4-carboxylate, 2,2-difluoro-N-methyl-2-[4-[5-(trifluoromethyl)-1,2,4-oxadiazol-3-yl]phenyl]acetamide, N—[(Z)-methoxyiminomethyl]-4-[5-(trifluoromethyl)-1,2,4-oxadiazol-3-yl]benzamide, N—[N-methoxy-C-methyl-carbonimidoyl]-4-[5-(trifluoromethyl)-1,2,4-oxadiazol-3-yl]benzamide, N-[3-(4-chlorophenyl)-4,5-dihydroisoxazol-5-yl]-5-methyl-1,2,4-oxadiazole-3-carboxamide, 2-(difluoromethyl)-N-(1,1-dimethyl-3-propyl-indan-4-yl)pyridine-3-carboxamide, [(1S,2S)-2-(4-fluoro-2-methyl-phenyl)-1,3-dimethyl-butyl] (2S)-2-[(3-acetoxy-4-methoxy-pyridine-2-carbonyl)amino]propanoate, [(1S,2S)-2-(4-fluoro-2-methyl-phenyl)-1,3-dimethyl-butyl] (2S)-2-[[3-(acetoxymethoxy)-4-methoxy-pyridine-2-carbonyl]amino]propanoate, cis-jasmone, potassium phosphonate, calcium phosphonate, glyphosate (including the diammonium, isopropylammonium and potassium salts thereof), 2,4-D (including the choline salt and 2-ethylhexyl ester thereof), dicamba (including the aluminium, aminopropyl, bis-aminopropylmethyl, choline, dichloroprop, diglycolamine, dimethylamine, dimethylammonium, potassium and sodium salts thereof), glufosinate (including the ammonium salt thereof), thiamethoxam, cyclobutrifluram, isocycloseram, spiropidion, abamectin, emamectin, cyantraniliprole, chlorantraniliprole, diafenthiuron, broflanilide, 2-chloro-N-cyclopropyl-5-(1-{2,6-dichloro-4-[1,2,2,2-tetrafluoro-1-(trifluoromethyl)ethyl]phenyl}-1H-pyrazol-4-yl)-N-methylnicotinamide and fluxametamide.

More preferably, component (B) is a compound selected from the group consisting of, bixafen, triclopyricarb, cyproconazole, difenoconazole, epoxicon-azole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile and 3-[2-(1-chlorocyclopropyl)-3-(3-chloro-2-fluoro-phenyl)-2-hydroxy-propyl]imidazole-4-carbonitrile.

Even more preferably, component (B) is a compound selected from the group consisting of, cyproconazole, difenoconazole, hexaconazole, prothioconazole, propiconazole, azoxystrobin, trifloxystrobin, picoxystrobin, pyraclostrobin, mancozeb, chlorothalonil, fluxapyroxad, benzovindiflupyr, isoflucypram and metyltetraprole.

Yet even more preferably, component (B) is a compound selected from the group consisting of cyproconazole, difenoconazole, hexaconazole, prothioconazole, propiconazole, azoxystrobin, trifloxystrobin, picoxystrobin, pyraclostrobin and metyltetraprole.

Yet furthermore more preferably still, component (B) is a compound selected from the group consisting of cyproconazole, difenoconazole, prothioconazole, azoxystrobin, trifloxystrobin, pyraclostrobin and metyltetraprole.

Furthermore preferably still, component (B) is azoxystrobin or trifloxystrobin.

Most preferably, component (B) is azoxystrobin.

In one embodiment, component (B) is a compound selected from the group consisting of cyproconazole, difenoconazole, hexaconazole, prothioconazole, propiconazole, fenpropidin, fenpropimorph, fludioxonil, azoxystrobin, trifloxystrobin, picoxystrobin, pyraclostrobin, mancozeb, folpet, chlorothalonil, fluxapyroxad, benzovindiflupyr, isoflucypram, pydiflumetofen, mefentrifluconazole, florylpicoxamid, metyltetraprole, N-(2-fluorophenyl)-4-[5-(trifluoromethyl)-1,2,4-oxadiazol-3-yl]benzamide and [(1S,2S)-1-methyl-2-(o-tolyl)propyl] (2S)-2-[(4-methoxy-3-propanoyloxy-pyridine-2-carbonyl)amino]propanoate.

Preferably, component (B) is a compound selected from the group consisting of cyproconazole, difenoconazole, prothioconazole, fenpropidin, fenpropimorph, fludioxonil, azoxystrobin, trifloxystrobin, pyraclostrobin, mancozeb, folpet, chlorothalonil, benzovindiflupyr, pydiflumetofen, mefentrifluconazole, florylpicoxamid, metyltetraprole, N-(2-fluorophenyl)-4-[5-(trifluoromethyl)-1,2,4-oxadiazol yl]benzamide and [(1S,2S)-1-methyl-2-(o-tolyl)propyl] (2S)-2-[(4-methoxy-3-propanoyloxy-pyridine carbonyl)amino]propanoate.

The component (B) compounds are referred to herein and above by a so-called "ISO common name" or another "common name" being used in individual cases or a trademark name. The component (B) compounds are known and are commercially available and/or can be prepared using procedures known in the art and/or procedures reported in the literature.

In a preferred composition according to the invention component (A) is compound no. X.01 methyl (Z)-2-(5-cyclobutyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxicon-azole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 15:1 to 1:50.

In another preferred composition according to the invention, component (A) is compound no. X.02 methyl (Z)-2-(5-cyclopentyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl] imidazole-4-carbonitrile and 3-[2-(1-chlorocyclopropyl)-3-(3-chloro fluoro-phenyl)-2-hydroxy-propyl]imidazole-4-carbonitrile, wherein the weight ratio of component (A) to component (B) is from 15:1 to 1:50.

In another preferred composition according to the invention, component (A) is compound no. X.03 methyl (Z)-2-(5-cyclopropyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl] imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 15:1 to 1:50.

In another preferred composition according to the invention, component (A) is compound no. X.04 methyl (Z)-2-(5-cyclohexyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl] imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 15:1 to 1:50.

In a more preferred composition according to the invention component (A) is compound no. X.01 methyl (Z)-2-(5-cyclobutyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 15:1 to 1:50.

In a more preferred composition according to the invention component (A) is compound no. X.02 methyl (Z)-2-(5-cyclopentyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 15:1 to 1:50.

In a more preferred composition according to the invention component (A) is compound no. X.03 methyl (Z)-2-(5-cyclopropyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 15:1 to 1:50.

In a more preferred composition according to the invention component (A) is compound no. X.04 methyl (Z)-2-(5-cyclohexyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 15:1 to 1:50.

In a preferred composition according to the invention component (A) is compound no. X.01 methyl (Z)-2-(5-cyclobutyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxicon-azole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 10:1 to 1:10 (or even more preferably, 7.5:1 to 1:7.5).

In another preferred composition according to the invention, component (A) is compound no. X.02 methyl (Z)-2-(5-cyclopentyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 10:1 to 1:10 (or even more preferably, 7.5:1 to 1:7.5).

In another preferred composition according to the invention, component (A) is compound no. X.03 methyl (Z)-2-(5-cyclopropyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 10:1 to 1:10 (or even more preferably, 7.5:1 to 1:7.5).

In another preferred composition according to the invention, component (A) is compound no. X.04 methyl (Z)-2-(5-cyclohexyl-2-methyl-phenoxy)-3-methoxy-prop-2-enoate or a salt or tautomer thereof, and component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin (jiaxiangjunzhi), mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl)propan-2-ol, 2-[6-(4-bromophenoxy)-2-(trifluoromethyl)-3-pyridyl]-1-(1,2,4-triazol-1-yl)propan-2-ol, 3-[2-(1-chlorocyclopropyl)-3-(2-fluorophenyl)-2-hydroxy-propyl]imidazole-4-carbonitrile and 3-[2-(1-chlorocyclopropyl)-3-(3-chloro-2-fluoro-phenyl)-2-hydroxy-propyl]imidazole-4-carbonitrile, wherein the weight ratio of component (A) to component (B) is from 10:1 to 1:10 (or even more preferably, 7.5:1 to 1:7.5).

In a preferred composition according to the invention component (A) is compound no. X.01 methyl (Z)-2-(5-cyclobutyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 10:1 to 1:10 (or even more preferably, 7.5:1 to 1:7.5).

In another preferred composition according to the invention, component (A) is compound no. X.02 methyl (Z)-2-(5-cyclopentyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 10:1 to 1:10 (or even more preferably, 7.5:1 to 1:7.5).

In another preferred composition according to the invention, component (A) is compound no. X.03 methyl (Z)-2-(5-cyclopropyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 10:1 to 1:10 (or even more preferably, 7.5:1 to 1:7.5).

In another preferred composition according to the invention, component (A) is compound no. X.04 methyl (Z)-2-(5-cyclohexyl-2-methyl-phenoxy)-3-methoxy-prop-2-enoate or a salt or tautomer thereof, and component (B) is a compound selected from the group consisting of cyproconazole, difenoconazole, hexaconazole, prothioconazole, propiconazole, azoxystrobin, trifloxystrobin, picoxystrobin, pyraclostrobin mancozeb, chlorothalonil, fluxapyroxad, benzovindiflupyr, isoflucypram and metyltetraprole, wherein the weight ratio of component (A) to component (B) is from 10:1 to 1:10 (or even more preferably, 7.5:1 to 1:7.5).

In a preferred composition according to the invention component (A) is compound no. X.01 methyl (Z)-2-(5-cyclobutyl-2-methyl-phenoxy)-3-methoxy-prop-2-enoate or a salt or tautomer thereof, and component (B) is a compound selected from the group consisting of cyproconazole, difenoconazole, prothioconazole, azoxystrobin, trifloxystrobin, pyraclostrobin and metyltetraprole, wherein the weight ratio of component (A) to component (B) is from 10:1 to 1:10 (or even more preferably, 7.5:1 to 1:7.5).

In another preferred composition according to the invention, component (A) is compound no. X.02 methyl (Z)-2-(5-cyclopentyl-2-methyl-phenoxy)-3-methoxy-prop-2-enoate or a salt or tautomer thereof, and component (B) is a compound selected from the group consisting of cyproconazole, difenoconazole, prothioconazole, azoxystrobin, trifloxystrobin, pyraclostrobin and metyltetraprole, wherein the weight ratio of component (A) to component (B) is from 10:1 to 1:10 (or even more preferably, 7.5:1 to 1:7.5).

In another preferred composition according to the invention, component (A) is compound no. X.03 methyl (Z)-2-(5-cyclopropyl-2-methyl-phenoxy)-3-methoxy-prop-2-enoate or a salt or tautomer thereof, and component (B) is a compound selected from the group consisting of cyproconazole, difenoconazole, prothioconazole, azoxystrobin, trifloxystrobin, pyraclostrobin and metyltetraprole, wherein the weight ratio of component (A) to component (B) is from 10:1 to 1:10 (or even more preferably, 7.5:1 to 1:7.5).

In another preferred composition according to the invention, component (A) is compound no. X.04 methyl (Z)-2-(5-cyclohexyl-2-methyl-phenoxy)-3-methoxy-prop-2-enoate or a salt or tautomer thereof, and component (B) is a compound selected from the group consisting of cyproconazole, difenoconazole, prothioconazole, azoxystrobin, trifloxystrobin, pyraclostrobin and metyltetraprole, wherein the weight ratio of component (A) to component (B) is from 10:1 to 1:10 (or even more preferably, 7.5:1 to 1:7.5).

In one embodiment of the invention there is provided a synergistic fungicidal composition comprising a mixture of components (A) and (B) as active ingredients, wherein component (A) is:

methyl (Z)-2-(5-cyclobutyl-2-methyl-phenoxy)-3-methoxy-prop-2-enoate (compound X.01),
methyl (Z)-2-(5-cyclopentyl-2-methyl-phenoxy)-3-methoxy-prop-2-enoate (compound X.02),
methyl (Z)-2-(5-cyclopropyl-2-methyl-phenoxy)-3-methoxy-prop-2-enoate (compound X.03), or
methyl (Z)-2-(5-cyclohexyl-2-methyl-phenoxy)-3-methoxy-prop-2-enoate (compound X.04),
or an agronomically acceptable salt thereof;
and
component (B) is a compound selected from the group consisting of:
cyproconazole, difenoconazole, prothioconazole, azoxystrobin, trifloxystrobin, pyraclostrobin and metyltetraprole.

Preferably, in an embodiment of the invention there is provided a synergistic fungicidal composition comprising a mixture of components (A) and (B) as active ingredients, wherein component (A) is:

methyl (Z)-2-(5-cyclopentyl-2-methyl-phenoxy)-3-methoxy-prop-2-enoate (compound X.02), or
methyl (Z)-2-(5-cyclohexyl-2-methyl-phenoxy)-3-methoxy-prop-2-enoate (compound X.04);
or an agronomically acceptable salt thereof;
and
component (B) is a compound selected from the group consisting of:
cyproconazole, difenoconazole, prothioconazole, azoxystrobin, trifloxystrobin, pyraclostrobin and metyltetraprole, wherein the weight ratio of component (A) to component (B) is from 10:1 to 1:10 (or even more preferably, 7.5:1 to 1:7.5).

More preferably, in an embodiment of the invention there is provided a synergistic fungicidal composition comprising a mixture of components (A) and (B) as active ingredients, wherein component (A) is:

methyl (Z)-2-(5-cyclopentyl-2-methyl-phenoxy)-3-methoxy-prop-2-enoate (compound X.02), or
methyl (Z)-2-(5-cyclohexyl-2-methyl-phenoxy)-3-methoxy-prop-2-enoate (compound X.04);
or an agronomically acceptable salt thereof;
and
component (B) is azoxystrobin or trifloxystrobin, wherein the weight ratio of component (A) to component (B) is from 10:1 to 1:10 (or even more preferably, 7.5:1 to 1:7.5).

Even more preferably, in an embodiment of the invention there is provided a synergistic fungicidal composition comprising a mixture of components (A) and (B) as active ingredients, wherein component (A) is:

methyl (Z)-2-(5-cyclopentyl-2-methyl-phenoxy)-3-methoxy-prop-2-enoate (compound X.02), or
methyl (Z)-2-(5-cyclohexyl-2-methyl-phenoxy)-3-methoxy-prop-2-enoate (compound X.04);
or an agronomically acceptable salt thereof;
and
component (B) is azoxystrobin, wherein the weight ratio of component (A) to component (B) is from 10:1 to 1:10 (or even more preferably, 7.5:1 to 1:7.5).

In another preferred embodiment of the invention there is provided a synergistic fungicidal composition comprising a mixture of components (A) and (B) as active ingredients, wherein component (A) is:

methyl (Z)-2-(5-cyclopentyl-2-methyl-phenoxy)-3-methoxy-prop-2-enoate (compound X.02), or
methyl (Z)-2-(5-cyclohexyl-2-methyl-phenoxy)-3-methoxy-prop-2-enoate (compound X.04);
or an agronomically acceptable salt thereof;
and
component (B) is a compound selected from the group consisting of cyproconazole, difenoconazole, hexaconazole, prothioconazole, propiconazole, fenpropidin, fenpropimorph, fludioxonil, azoxystrobin, trifloxystrobin, picoxystrobin, pyraclostrobin, mancozeb, folpet, chlorothalonil, fluxapyroxad, benzovindiflupyr, isoflucypram, pydiflumetofen, mefentrifluconazole, florylpicoxamid, metyltetraprole, N-(2-fluorophenyl)-4-[5-(trifluoromethyl)-1,2,4-oxadiazol-3-yl]benzamide and [(1S,2S)-1-methyl-2-(o-tolyl)propyl] (2S)-2-[(4-methoxy-3-propanoyloxy-pyridine-2-carbonyl)amino] propanoate (preferably, wherein the weight ratio of component (A) to component (B) is from 100:1 to 1:100).

Preferably, in this embodiment of the invention there is provided a synergistic fungicidal composition comprising a mixture of components (A) and (B) as active ingredients, wherein component (A) is:

methyl (Z)-2-(5-cyclopentyl-2-methyl-phenoxy)-3-methoxy-prop-2-enoate (compound X.02), or
methyl (Z)-2-(5-cyclohexyl-2-methyl-phenoxy)-3-methoxy-prop-2-enoate (compound X.04);
or an agronomically acceptable salt thereof;
and
component (B) is a compound selected from the group consisting of cyproconazole, difenoconazole, prothioconazole, fenpropidin, fenpropimorph, fludioxonil, azoxystrobin, trifloxystrobin, pyraclostrobin, mancozeb, folpet, chlorothalonil, benzovindiflupyr, pydiflumetofen, mefentrifluconazole, florylpicoxamid, metyltetraprole, N-(2-fluorophenyl)-4-[5-(trifluoromethyl)-1,2,4-oxadiazol-3-yl]benzamide and [(1S,2S)-1-methyl-2-(o-tolyl)propyl] (2S)-2-[(4-methoxy-3-propanoyloxy-pyridine-2-carbonyl)amino]propanoate, wherein the weight ratio of component (A) to component (B) is from 100:1 to 1:100 (preferably from 15:1 to 1:50, more preferably from 10:1 to 1:10)

The term "fungicide" as used herein means a compound that controls, modifies, or prevents the growth of fungi. The term "fungicidally effective amount" means the quantity of such a compound or combination of such compounds that is capable of producing an effect on the growth of fungi. Controlling or modifying effects include all deviation from natural development, such as killing, retardation and the like, and prevention includes barrier or other defensive formation in or on a plant to prevent fungal infection.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

The term "locus" as used herein means fields in or on which plants are growing, or where seeds of cultivated plants are sown, or where seed will be placed into the soil. It includes soil, seeds, and seedlings, as well as established vegetation.

Throughout this document the expression "composition" stands for the various mixtures or combinations of components (A) and (B) (including the above-defined embodiments), for example in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the components (A) and (B) is not essential for working the present invention.

The composition according to the invention is effective against harmful microorganisms, such as microorganisms, that cause phytopathogenic diseases, in particular against phytopathogenic fungi and bacteria.

The composition of the invention may be used to control plant diseases caused by a broad spectrum of fungal plant pathogens in the Basidiomycete, Ascomycete, Oomycete and/or Deuteromycete, Blasocladiomycete, Chrytidiomycete, Glomeromycete and/or Mucoromycete classes.

The composition is effective in controlling a broad spectrum of plant diseases, such as foliar pathogens of ornamental, turf, vegetable, field, cereal, and fruit crops.

These pathogens may include:

Oomycetes, including *Phytophthora* diseases such as those caused by *Phytophthora capsici, Phytophthora infestans, Phytophthora sojae, Phytophthora fragariae, Phytophthora nicotianae, Phytophthora cinnamomi, Phytophthora citricola, Phytophthora citrophthora* and *Phytophthora erythroseptica; Pythium* diseases such as those caused by *Pythium aphanidermatum, Pythium arrhenomanes, Pythium graminicola, Pythium irregulare* and *Pythium ultimum*; diseases caused by Peronosporales such as *Peronospora destructor, Peronospora parasitica, Plasmopara viticola, Plasmopara halstedii, Pseudoperonospora cubensis, Albugo candida, Sclerophthora macrospora* and *Bremia lactucae*; and others such as *Aphanomyces cochlioides, Labyrinthula zosterae, Peronosclerospora sorghi* and *Sclerospora graminicola;*

Ascomycetes, including blotch, spot, blast or blight diseases and/or rots for example those caused by Pleosporales such as *Stemphylium solani, Stagonospora tainanensis, Spilocaea oleaginea, Setosphaeria turcica, Pyrenochaeta lycoperisici, Pleospora herbarum, Phoma destructiva, Phaeosphaeria herpotrichoides, Phaeocryptocus gaeumannii, Ophiosphaerella graminicola, Ophiobolus graminis, Leptosphaeria maculans, Hendersonia creberrima, Helminthosporium triticirepentis, Setosphaeria turcica, Drechslera glycines, Didymella bryoniae, Cycloconium oleagineum, Corynespora cassiicola, Cochliobolus sativus, Bipolaris cactivora, Venturia inaequalis, Pyrenophora teres, Pyrenophora tritici-repentis, Alternaria alternata, Alternaria brassicicola, Alternaria solani* and *Alternaria tomatophila*, Capnodiales such as *Septoria tritici, Septoria nodorum, Septoria glycines, Cercospora arachidicola, Cercospora sojina, Cercospora zeae-maydis, Cercosporella capsellae* and *Cercosporella herpotrichoides, Cladosporium carpophilum, Cladosporium effusum, Passalora fulva, Cladosporium oxysporum, Dothistroma septosporum, Isariopsis clavispora, Mycosphaerella fijiensis, Mycosphaerella graminicola, Mycovellosiella koepkeii, Phaeoisariopsis bataticola, Pseudocercospora vitis, Pseudocercosporella herpotrichoides, Ramularia beticola, Ramularia collo-cygni*, Magnaporthales such as *Gaeumannomyces graminis, Magnaporthe grisea, Pyricularia oryzae*, Diaporthales such as *Anisogramma anomala, Apiognomonia errabunda, Cytospora platani, Diaporthe phaseolorum, Discula destructiva, Gnomonia fructicola, Greeneria uvicola, Melanconium juglandinum, Phomopsis viticola, Sirococcus clavigignenti-juglandacearum, Tubakia dryina, Dicarpella* spp., *Valsa ceratosperma*, and others such as *Actinothyrium graminis, Ascochyta pisi, Aspergillus flavus, Aspergillus fumigatus, Aspergillus nidulans, Asperisporium caricae, Blumeriella jaapfi, Candida* spp., *Capnodium ramosum, Cephaloascus* spp., *Cephalosporium gramineum, Ceratocystis paradoxa, Chaetomium* spp., *Hymenoscyphus pseudoalbidus, Coccidioides* spp., *Cylindrosporium padi, Diplocarpon malae, Drepanopeziza campestris, Elsinoe ampelina, Epicoccum nigrum, Epidermophyton* spp., *Eutypa lata, Geotrichum candidum, Gibellina cerealis, Gloeocercospora sorghi, Gloeodes pomigena, Gloeosporium perennans; Gloeotinia temulenta, Griphospaeria corticola, Kabatiella lini, Leptographium microsporum, Leptosphaerulinia crassiasca, Lophodermium seditiosum, Marssonina graminicola, Microdochium nivale, Monilinia fructicola, Monographella albescens, Monosporascus cannonballus, Naemacyclus* spp., *Ophiostoma novo-ulmi, Paracoccidioides brasiliensis,*

*Penicillium expansum, Pestalotia rhododendri, Petriellidium* spp., *Pezicula* spp., *Phialophora gregata, Phyllachora pomigena, Phymatotrichum omnivora, Physalospora abdita, Plectosporium tabacinum, Polyscytalum pustulans, Pseudopeziza medicaginis, Pyrenopeziza brassicae, Ramulispora sorghi, Rhabdocline pseudotsugae, Rhynchosporium secalis, Sacrocladium oryzae, Scedosporium* spp., *Schizothyrium pomi, Sclerotinia sclerotiorum, Sclerotinia minor; Sclerotium* spp., *Typhula ishikariensis, Seimatosporium mariae, Lepteutypa cupressi, Septocyta ruborum, Sphaceloma perseae, Sporonema phacidioides, Stigmina palmivora, Tapesia yallundae, Taphrina bullata, Thielviopsis basicola, Trichoseptoria fructigena, Zygophiala jamaicensis*; powdery mildew diseases for example those caused by Erysiphales such as *Blumeria graminis, Erysiphe polygoni, Uncinula necator, Sphaerotheca fuligena, Podosphaera leucotricha, Podospaera macularis Golovinomyces cichoracearum, Leveillula taurica, Microsphaera diffusa, Oidiopsis gossypfi, Phyllactinia guttata and Oidium arachidis*; molds for example those caused by Botryosphaeriales such as *Dothiorella aromatica, Diplodia seriata, Guignardia bidwellii, Botrytis cinerea, Botryotinia affii, Botryotinia fabae, Fusicoccum amygdali, Lasiodiplodia theobromae, Macrophoma theicola, Macrophomina phaseolina, Phyllosticta cucurbitacearum*; anthracnoses for example those caused by Glommerelales such as *Colletotrichum gloeosporioides, Colletotrichum lagenarium, Colletotrichum gossypfi, Glomerella cingulata*, and *Colletotrichum graminicola*; and wilts or blights for example those caused by Hypocreales such as *Acremonium strictum, Claviceps purpurea, Fusarium culmorum, Fusarium graminearum, Fusarium virguliforme, Fusarium oxysporum, Fusarium subglutinans, Fusarium oxysporum* f.sp. *cubense, Gerlachia nivale, Gibberella fujikuroi, Gibberella zeae, Gliocladium* spp., *Myrothecium verrucaria, Nectria ramulariae, Trichoderma viride, Trichothecium roseum*, and *Verticillium theobromae;*

Basidiomycetes, including smuts for example those caused by Ustilaginales such as *Ustilaginoidea virens, Ustilago nuda, Ustilago tritici, Ustilago zeae*, rusts for example those caused by Pucciniales such as *Cerotelium fici, Chrysomyxa arctostaphyli, Coleosporium ipomoeae, Hemileia vastatrix, Puccinia arachidis, Puccinia cacabata, Puccinia graminis, Puccinia recondita, Puccinia sorghi, Puccinia hordei, Puccinia striiformis* f.sp. *Hordei, Puccinia striiformis* f.sp. *Secalis, Pucciniastrum coryli*, or Uredinales such as *Cronartium ribicola, Gymnosporangium juniperi-viginianae, Melampsora medusae, Phakopsora pachyrhizi, Phragmidium mucronatum, Physopella ampelosidis, Tranzschelia discolor* and *Uromyces viciae-fabae*; and other rots and diseases such as those caused by *Cryptococcus* spp., *Exobasidium vexans, Marasmiellus inoderma, Mycena* spp., *Sphacelotheca reiliana, Typhula ishikariensis, Urocystis agropyri, Itersonilia perplexans, Corticium invisum, Laetisaria fuciformis, Waitea circinata, Rhizoctonia solani, Thanetephorus cucurmeris, Entyloma dahliae, Entylomella microspora, Neovossia moliniae* and *Tilletia caries;*

Blastocladiomycetes, such as *Physoderma maydis;*

Mucoromycetes, such as *Choanephora cucurbitarum.; Mucor* spp.; *Rhizopus arrhizus; as well as diseases caused by other species and genera closely related to those listed above. In addition to their fungicidal activity, the compositions may also have activity against bacteria such as Erwinia amylovora, Erwinia caratovora, Xanthomonas campestris, Pseudomonas syringae, Strptomyces* scabies and other related species as well as certain protozoa.

The composition according to the invention is particularly effective against phytopathogenic fungi belonging to the following classes: Ascomycetes (e.g. *Venturia, Podosphaera, Erysiphe, Monilinia, Mycosphaerella, Uncinula*); Basidiomycetes (e.g. the genus *Hemileia, Rhizoctonia, Phakopsora, Puccinia, Ustilago, Tilletia*); *Fungi imperfecti* (also known as *Deuteromycetes*; e.g. *Botrytis, Helminthosporium, Rhynchosporium, Fusarium, Septoria, Cercospora, Alternaria, Pyricularia* and *Pseudocercosporella*); *Oomycetes* (e.g. *Phytophthora, Peronospora, Pseudoperonospora, Albugo, Bremia, Pythium, Pseudosclerospora, Plasmopara*).

Crops of useful plants in which the composition according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and Zoysia grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides like bromoxynil or classes of herbicides such as ALS-, EPSPS-, GS-, HPPD- and PPO-inhibitors. An example of a crop that has been rendered tolerant to imidazolinones, e.g. imazamox, by conventional methods of breeding is Clearfield® summer canola. Examples of crops that have been rendered tolerant to herbicides by genetic engineering methods include e.g. glyphosate- and glufosinate-resistant maize varieties commercially available under the trade names RoundupReady®, Herculex I® and LibertyLink®.

Crops are also to be understood as being those which naturally are or have been rendered resistant to harmful insects. This includes plants transformed by the use of recombinant DNA techniques, for example, to be capable of synthesising one or more selectively acting toxins, such as are known, for example, from toxin-producing bacteria. Examples of toxins which can be expressed include 6-endotoxins, vegetative insecticidal proteins (Vip), insecticidal proteins of bacteria colonising nematodes, and toxins produced by scorpions, arachnids, wasps and fungi.

An example of a crop that has been modified to express the *Bacillus thuringiensis* toxin is the Bt maize KnockOut® (Syngenta Seeds). An example of a crop comprising more than one gene that codes for insecticidal resistance and thus expresses more than one toxin is VipCot® (Syngenta Seeds). Crops or seed material thereof can also be resistant to multiple types of pests (so-called stacked transgenic events when created by genetic modification). For example, a plant can have the ability to express an insecticidal protein while at the same time being herbicide tolerant, for example Herculex I® (Dow AgroSciences, Pioneer Hi-Bred International).

The compounds of Formula (I) (including any one of compounds X.01 to X.04) or fungicidal compositions according to the present invention comprising a compound of Formula (I) may be used in controlling or preventing phytopathogenic diseases, especially phytopathogenic fungi (such as *Phakopsora pachyrhizi*) on soy bean plants.

In particular, transgenic soybean plants expressing toxins, for example insecticidal proteins such as delta-endotoxins, e.g. Cry1Ac (Cry1Ac Bt protein). Accordingly, this may include transgenic soybean plants comprising event MON87701 (see U.S. Pat. No. 8,049,071 and related applications and patents, as well as WO 2014/170327 A1 (e.g., see paragraph [008] reference to Intacta RR2 PRO™ soybean)), event MON87751 (US. Patent Application Publication No. 2014/0373191) or event DAS-81419 (U.S. Pat. No. 8,632,978 and related applications and patents).

Other transgenic soybean plants may comprise event SYHT0H2-HPPD tolerance (U.S. Patent Application Publication No. 2014/0201860 and related applications and patents), event MON89788—glyphosate tolerance (U.S. Pat. No. 7,632,985 and related applications and patents), event MON87708—dicamba tolerance (U.S. Patent Application Publication No. US 2011/0067134 and related applications and patents), event DP-356043-5—glyphosate and ALS tolerance (U.S. Patent Application Publication No. US 2010/0184079 and related applications and patents), event A2704-12—glufosinate tolerance (U.S. Patent Application Publication No. US 2008/0320616 and related applications and patents), event DP-305423-1—ALS tolerance (U.S. Patent Application Publication No. US 2008/0312082 and related applications and patents), event A5547-127—glufosinate tolerance (U.S. Patent Application Publication No. US 2008/0196127 and related applications and patents), event DAS-40278-9—tolerance to 2,4-dichlorophenoxyacetic acid and aryloxyphenoxypropionate (see WO 2011/022469, WO 2011/022470, WO 2011/022471, and related applications and patents), event 127—ALS tolerance (WO 2010/080829 and related applications and patents), event GTS 40-3-2—glyphosate tolerance, event DAS-68416-4-2,4-dichlorophenoxyacetic acid and glufosinate tolerance, event FG72—glyphosate and isoxaflutole tolerance, event BPS-CV127-9—ALS tolerance and GU262—glufosinate tolerance or event SYHTO4R—HPPD tolerance.

The compounds of Formula (I) (including any one of compounds X.01 to X.04) or fungicidal compositions according to the present invention comprising a compound of Formula (I) may be used in controlling or preventing phytopathogenic diseases, especially phytopathogenic fungi (such as *Phakopsora pachyrhizi*) on soy bean plants. In particular, there are known in the scientific literature certain Elite soybean plant varieties where R-gene stacks, conferring a degree of immunity or resistance to specific *Phakopsora pachyrhizi*, have been introgressed in the plant genome, see for example: "Fighting Asian Soybean Rust", Langenbach C, et al, *Front Plant Science* 7(797) 2016).

An elite plant is any plant from an elite line, such that an elite plant is a representative plant from an elite variety. Non-limiting examples of elite soybean varieties that are commercially available to farmers or soybean breeders include: AG00802, A0868, AG0902, A1923, AG2403, A2824, A3704, A4324, A5404, AG5903, AG6202 AG0934; AG1435; AG2031; AG2035; AG2433; AG2733; AG2933; AG3334; AG3832; AG4135; AG4632; AG4934; AG5831; AG6534; and AG7231 (Asgrow Seeds, Des Moines, Iowa, USA); BPRO144RR, BPR 4077NRR and BPR 4390NRR (Bio Plant Research, Camp Point, Ill., USA); DKB17-51 and DKB37-51 (DeKalb Genetics, DeKalb, Ill., USA); DP 4546 RR, and DP 7870 RR (Delta & Pine Land Company, Lubbock, Tex., USA); JG 03R501, JG 32R606C ADD and JG 55R503C (JGL Inc., Greencastle, Ind., USA); NKS 13-K2 (NK Division of Syngenta Seeds, Golden Valley, Minn., USA); 90M01, 91M30, 92M33, 93M11, 94M30, 95M30, 97B52, P008T22R2; P16T17R2; P22T69R; P25T51R; P34T07R2; P35T58R; P39T67R; P47T36R; P46T21 R; and P56T03R2 (Pioneer Hi-Bred International, Johnston, Iowa, USA); SG4771NRR and SG5161NRR/STS (Soygenetics, LLC, Lafayette, Ind., USA); S00-K5, S11-L2, S28-Y2, 543-61, S53-A1, 576-L9, S78-G6, 50009-M2; 5007-Y4; 504-D3; S14-A6; S20-T6; S21-M7; S26-P3; S28-N6; S30-V6; S35-C3; S36-Y6; S39-C4; S47-K5; S48-D9; S52-Y2; S58-Z4; S67-R6; S73-S8; and S78-G6 (Syngenta Seeds, Henderson, Ky., USA); Richer (Northstar Seed Ltd. Alberta, CA); 14RD62 (Stine Seed Co. la., USA); or Armor 4744 (Armor Seed, LLC, Ar., USA).

Thus, in a further preferred embodiment, fungicidal compositions according to the present invention comprising a compound of formula (I) (including any one of compounds X.01 to X.04), are used to control *Phakopsora pachyrhizi*, (including fungicidally-resistant strains thereof, as outlined below) on Elite soybean plant varieties where R-gene stacks, conferring a degree of immunity or resistance to specific *Phakopsora pachyrhizi*, have been been introgressed in the plant genome. Numerous benefits may be expected to ensue from said use, e.g. improved biological activity, an advantageous or broader spectrum of activity (inc. sensitive and resistant strains of *Phakopsora pachyrhizi*), an increased safety profile, improved crop tolerance, synergistic interactions or potentiating properties, improved onset of action or a longer lasting residual activity, a reduction in the number of applications and/or a reduction in the application rate of the compounds and compositions required for effective control of the phytopathogen (*Phakopsora pachyrhizi*), thereby enabling beneficial resistance-management practices, reduced environmental impact and reduced operator exposure.

Under certain circumstances, fungicidal compositions according to the present invention comprising a compound of Formula (I) when used in controlling or preventing phytopathogenic diseases, especially phytopathogenic fungi (such as *Phakopsora pachyrhizi*) on soy bean plants (in particular any of the transgenic soybean plants as described above), may display a synergistic interaction between the active ingredients.

The fungicidal compositions according to the present invention comprising a compound of formula (I) (including any one of compounds X.01 to X.04) may be used in controlling or preventing phytopathogenic diseases, especially phytopathogenic fungi (in particular, *Phakopsora pachyrhizi*) on soybean plants.

Additionally, to date, no cross-resistance has been observed between the fungicidal compositions according to the present invention comprising a compound of formula (I) (including any one of compounds X.01 to X.04) and the current fungicidal solutions used to control *Phakopsora pachyrhizi.*

Indeed, fungicidal-resistant strains of *Phakopsora pachyrhizi* have been reported in the scientific literature, with strains resistant to one or more fungicides from at least each of the following fungicidal mode of action classes being observed: sterol demethylation-inhibitors (DMI), quinone-outside-inhibitors (QoI) and succinate dehydrogenase inhibitors (SDHI). See for example: "Sensitivity of *Phakopsora pachyrhizi* towards quinone-outside-inhibitors and demethylation-inhibitors, and corresponding resistance mechanisms." Schmitz H K et al, *Pest Manag Sci* (2014) 70: 378-388; "First detection of a SDH variant with reduced SDHI sensitivity in *Phakopsora pachyrhizi*" Simões K et al, *J Plant Dis Prot* (2018) 125: 21-2; "Competitive fitness of *Phakopsora pachyrhizi* isolates with mutations in the CYP51 and CYTB genes." Klosowski A C et al, *Phytopathology* (2016) 106: 1278-1284; "Detection of the F129L mutation in the cytochrome b gene in *Phakopsora pachyrhizi*." Klosowski A C et al, *Pest Manag Sci* (2016) 72: 1211-1215.

Thus, in a preferred embodiment, the fungicidal compositions according to the present invention comprising a compound of formula (I) (including any one of compounds X.01 to X.04), are used to control *Phakopsora pachyrhizi* which are resistant to one or more fungicides from any of the following fungicidal MoA classes: sterol demethylation-inhibitors (DMI), quinone-outside-inhibitors (QoI) and succinate dehydrogenase inhibitors (SDHI).

The compounds comprising component A of the present invention, wherein $R^1$, $R^2$, $R^3$ and $R^4$ are as defined for formula (I), can be made as shown in the following schemes.

The compounds of formula (I) wherein $R^1$, $R^2$, $R^3$ and $R^4$ are as defined above, can be obtained via cross coupling transformation between compounds of formula (II), wherein $R^1$, $R^2$ and $R^3$ are as defined for compounds of formula (I) and $R^{11}$ is a halide or pseudohalide such as chloro, bromo, iodo, $—OSO_2CF_3$ or $—OSO_2(CF_2)_3CF_3$, and compounds of formula (III), wherein $R^4$ is as defined for compounds of formula (I) and M is a metalloid species or pseudometalloid species (e.g. M includes but is not limited to MgCl, ZnCl or $B(OH)_2$), optionally in the presence of a metal salt such as LiCl or $ZnCl_2$, and a suitable metal catalyst complex, such as chloro(2-dicyclohexylphosphino-2',4',6'-triisopropyl-1,1'-biphenyl)[2-(2'-amino-1,1'-biphenyl)]palladium(II), in an organic solvent such as tetrahydrofuran or 1,4-dioxane at temperatures between 20° C.-150° C. For related examples, see: *Journal of Organic Chemistry,* 2010, 75, 6677-6680, *Journal of the American Chemical Society,* 2009, 131, 7532-7533, *European Journal of Medicinal Chemistry,* 2018, 147, 238-252, and "Cross-Coupling Reactions: A Practical Guide (Topics in Current Chemistry)", edited by Norio Miyaura and S. L. Buchwald (editions Springer), or "Metal-Catalyzed Cross-Coupling Reactions", edited by Armin de Meijere and François Diederich (editions WILEY-VCH). This is shown in scheme 1.

Scheme 1

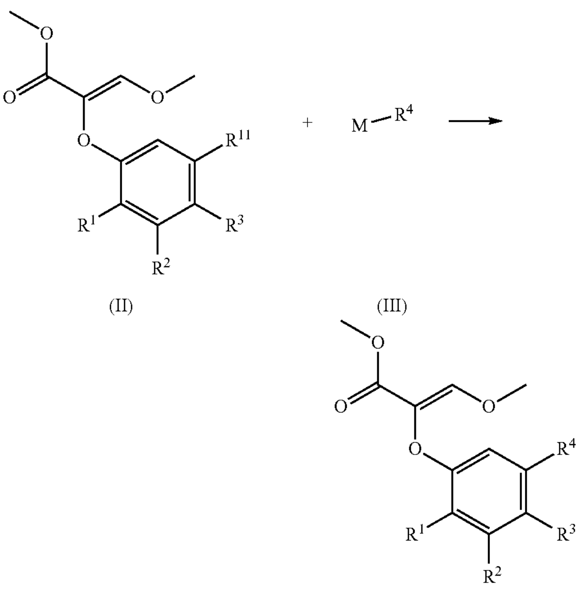

(II) (III) (I)

Alternatively compounds of formula (I) can be obtained by reacting compounds of formula (IV), wherein $R^1$, $R^2$ and $R^3$ are as defined for compounds of formula (I) and $R^{12}$ is a partially unsaturated, optionally substituted, $C_3$-$C_7$cycloalkenyl, via a reduction method, such as hydrogenation using a hydrogen source in the presence of a catalyst complex such as, palladium on carbon, in an organic solvent such as methanol, tetrahydrofuran or ethyl acetate at temperatures between 0° C.-150° C. For related examples, see: *ACS Medicinal Chemistry Letters,* 2016, 7, 508-51. 'Handbook of Heterogeneous Catalytic Hydrogenation for Organic Synthesis' by Shigeo Nishimura (published by Wiley-VCH), or 'The Handbook of Homogeneous Hydrogenation' ed. Johannes de Vries and Cornelis Elsevier (published by Wiley-VCH). This is shown in scheme 2.

Scheme 2

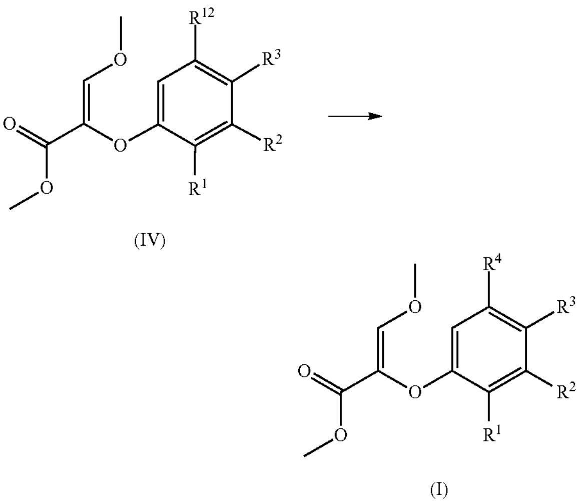

(IV) (I)

Compounds of formula (IV), wherein $R^1$, $R^2$ and $R^3$ are as defined for compounds of formula (I) and $R^{12}$ is a partially saturated, and optionally substituted, $C_3$-$C_7$cycloalkenyl, can be obtained via a cross coupling reaction between compounds of formula (II), wherein $R^{11}$ is a halide or pseudohalide such as chloro, bromo, iodo, —$OSO_2CF_3$ or —$OSO_2(CF_2)_3CF_3$, and compounds of formula (V), wherein M represents a metalloid or pseudometalloid species (e.g. M includes but is not limited to, $B(OH)_2$, BPin, $SnBu_3$) or hydrogen, using a suitable catalyst complex, such as palladium(tetrakistriphenylphosphine), in a solvent such as 1,4-dioxane, dimethylformamide or tetrahydrofuran at temperatures between 0° C.-150° C., and optionally in the presence of a base (e.g. potassium phosphate). For related examples, see: *ACS Medicinal Chemistry Letters,* 2016, 7, 508-513 and "Cross-Coupling Reactions: A Practical Guide (Topics in Current Chemistry)", edited by Norio Miyaura and S. L. Buchwald (editions Springer), or "Metal-Catalyzed Cross-Coupling Reactions", edited by Armin de Meijere and Francois Diederich (editions WILEY-VCH). This is shown in scheme 3.

Scheme 3

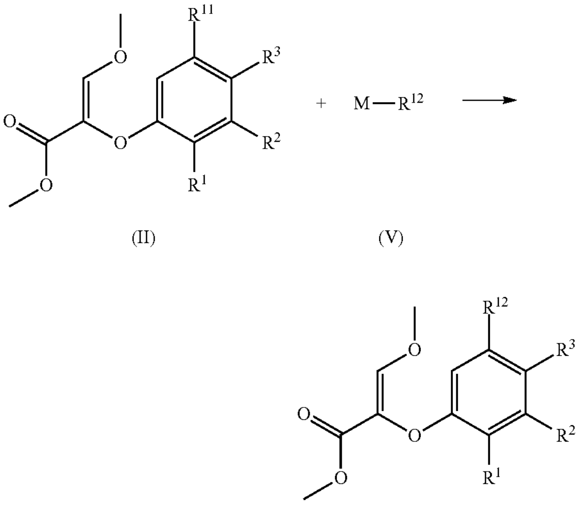
(II) (V)
(IV)

Compounds of formula (II), wherein $R^1$, $R^2$ and $R^3$ are as defined for compounds of formula (I) and $R^{11}$ is a halide or pseudohalide such as chloro, bromo, iodo, —$OSO_2CF_3$ or —$OSO_2(CF_2)_3CF_3$, can be obtained from compounds of formula (VI), wherein $R^1$, $R^2$ and $R^3$ are as defined for compounds of formula (I), $R^{11}$ is as defined above and $R^{13}$ is H or $C_1$-$C_4$alkyl, via treatment with a suitable base, such as sodium methoxide, and a formylating agent, such as methyl formate, optionally in a suitable solvent (e.g. tetrahydrofuran) to generate compounds of formula (Via), wherein $R^1$, $R^2$ and $R^3$ are as defined for compounds of formula (I), $R^{11}$ is as defined above and $R^{14}$ is H or methyl, followed by methylation with a reagent, such dimethyl sulfate, optionally in the presence of a base such as $K_2CO_3$. For related examples, see: *Journal of Agricultural and Food Chemistry,* 2007, 55, 5697-5700, *Molecules,* 2010, 15, 9024-9034 and *Organic Process Research and Development,* 2015, 19, 639-645. This is shown in scheme 4.

Scheme 4

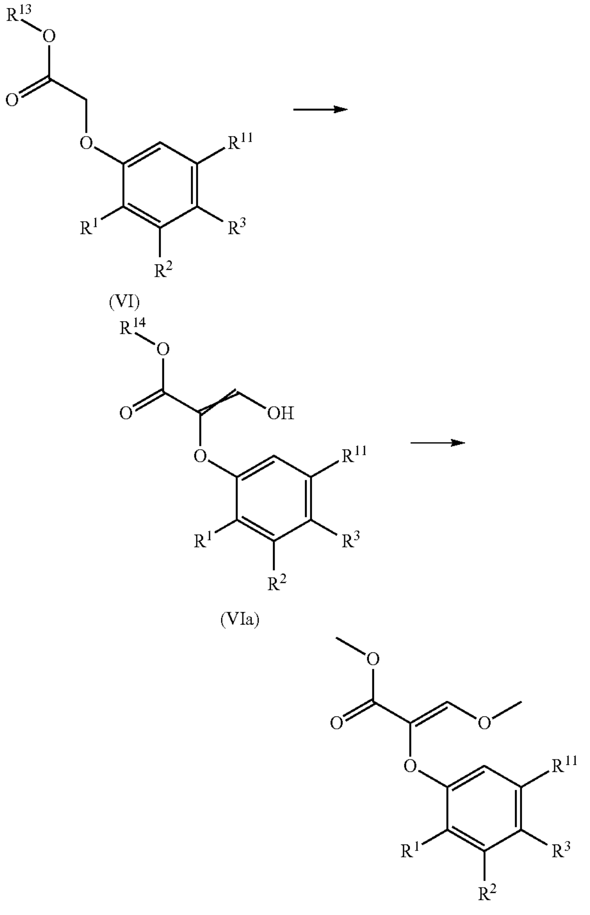
(VI)
(VIa)
(II)

Compounds of formula (VI), wherein $R^1$, $R^2$ and $R^3$ are as defined for compounds of formula (I), $R^{11}$ is as defined above and $R^{13}$ is H or $C_1$-$C_4$ alkyl, can be obtained from compounds of formula (VII) wherein $R^1$, $R^2$ and $R^3$ are as defined for compounds of formula (I) and $R^{11}$ is as defined above, by treatment with a base such as $K_2CO_3$ and an alkylation agent of formula (VIII), wherein $R^{13}$ is H or $C_1$-$C_4$ alkyl, in an organic solvent such as dimethylformamide or N-methyl pyrrolidone. Compounds of formula (VII) are commercially available or readily prepared from commercially available compounds by standard functional group transformations as described in *March's Advanced Organic Chemistry*, Smith and March, 6th edition, Wiley, 2007. This is shown in scheme 5.

Scheme 5

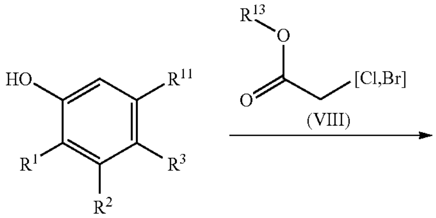
(VIII)

-continued

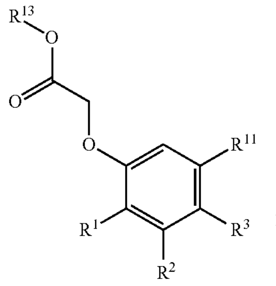

(VI)

Compounds of formula (I) wherein $R^1$, $R^2$, $R^3$ and $R^4$ are as defined for compounds of formula (I), can also be obtained from compounds of formula (IX) wherein $R^1$, $R^2$, $R^3$ and $R^4$ are as defined for compounds of formula (I) and $R^{13}$ is H or $C_1$-$C_4$ alkyl, by treatment with a base such as sodium methoxide and a formylating agent such as methyl formate to generate compounds of formula (X), wherein $R^1$, $R^2$, $R^3$ and $R^4$ are as defined for compounds of formula (I) and $R^{14}$ is H or methyl, followed by methylation with a reagent such dimethyl sulfate in the presence of a base such as $K_2CO_3$. For related examples, see: *Journal of Agricultural and Food Chemistry,* 2007, 55, 5697-5700, *Molecules,* 2010, 15, 9024-9034 and *Organic Process Research and Development,* 2015, 19, 639-645. This is shown in scheme 6.

Scheme 6

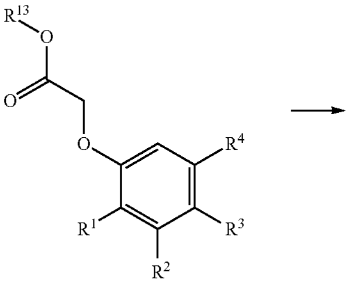

(IX)

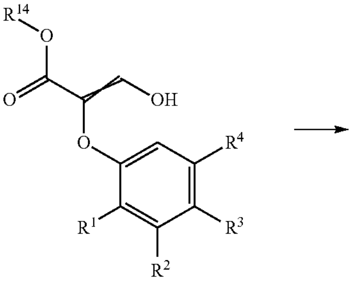

(X)

-continued

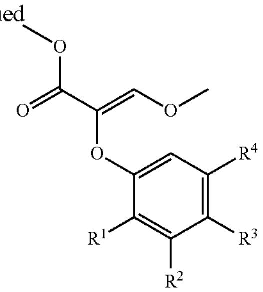

(I)

Compounds of formula (IX), wherein $R^1$, $R^2$ and $R^3$ are as defined for compounds of formula (I) and $R^4$ is an optionally substituted cyclopropyl group, can be prepared from compounds of formula (XI), wherein $R^1$, $R^2$ and $R^3$ are as defined for compounds of formula (I) and $R^{15}$ represents an optionally substituted alkenyl group, by treatment with diiodomethane with an organozinc reagent such as diethyl zinc, optionally in the presence of an acid source, such as trifluoroacetic acid, and in an organic solvent such as dichloromethane. For related examples, see: *Organic Reactions,* 2001, 58, 1. This is shown in scheme 7.

Scheme 7

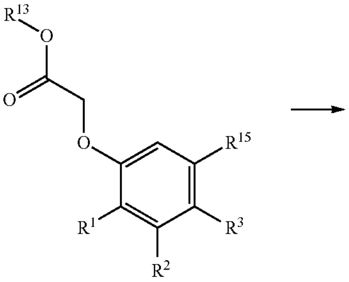

(XI)

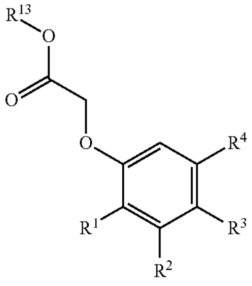

(IX)

Compounds of formula (XI), wherein $R^1$, $R^2$ and $R^3$ are as defined for compounds of formula (I), $R^{15}$ is as defined above and $R^{13}$ is H or $C_1$-$C_4$ alkyl, can be obtained from compounds of formula (XII) wherein $R^1$, $R^2$ and $R^3$ are as defined for compounds of formula (I) and $R^{15}$ is as defined above, by treatment with a base such as $K_2CO_3$ and an alkylation agent of formula (VIII), wherein $R^{13}$ is H or $C_1$-$C_4$ alkyl, in an organic solvent such as dimethylformamide or N-methyl pyrrolidone. This is shown in scheme 8. For related examples, see: *European Journal of Organic Chemistry,* 2015, 2197-2204. Compounds of formula (VIII) are commercially available or readily prepared from commercially available compounds by standard functional group transformations as described in *March's Advanced Organic Chemistry*, Smith and March, $6^{th}$ edition, Wiley, 2007.

Scheme 8

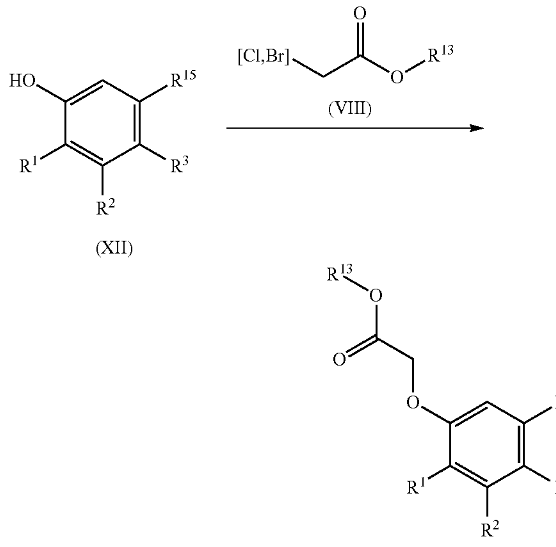

(XII) (VIII) (XI)

Compounds of formula (XII), wherein $R^1$, $R^2$ and $R^3$ are as defined for compounds of formula (I) and $R^{15}$ is as defined above, can be prepared via coupling transformation between compounds of formula (VII), wherein $R^1$, $R^2$ and $R^3$ are as defined for compounds of formula (I) and $R^{11}$ is a halide or pseudohalide such as chloro, bromo, iodo, $—OSO_2CF_3$ or $—OSO_2(CF_2)_3CF_3$, and compounds of formula (XIII), wherein $R^{15}$ is as defined above and M represents a metalloid species or pseudometalloid species (e.g. M includes but is not limited to, $B(OH)_2$, BPin, $SnBu_3$) or hydrogen, using a suitable catalyst complex, such as palladium(tetrakistriphenylphosphine), in a suitable solvent such as dioxane, dimethylformamide or tetrahydrofuran at temperatures between 0° C.-150° C. and optionally a base, such as potassium phosphate or potassium carbonate. For related examples, see: *Journal of Medicinal Chemistry,* 2015, 58, 9258-9272 and *Journal of Medicinal Chemistry,* 2014, 57, 1252-1275. This is shown in scheme 9.

Scheme 9

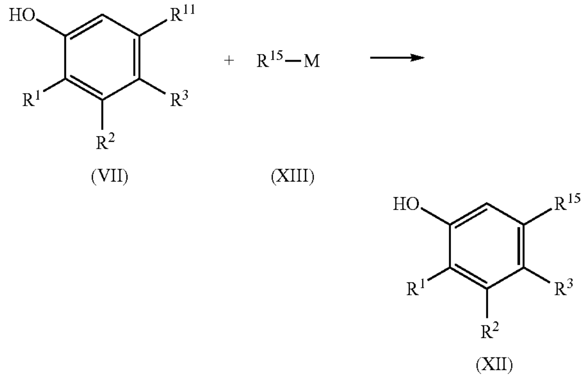

(VII) (XIII) (XII)

Functional group interconversions as described in the previous schemes are known to the persons skilled in the art. Extensive lists of reaction conditions can be found in: *Comprehensive Organic Functional Group Transformations*, Edited by A. R. Katritzky, O. Meth-Cohn and C. W. Rees. Pergamon Press (Elsevier Science Ltd.), Tarrytown, N.Y. 1995; or in: *Comprehensive Organic Transformations: A Guide to Functional Group Preparations*, Edited by Richard C. Larock, Wiley-VCH, New York 1999.

If the synthesis yields mixtures of isomers, a separation is generally not necessarily required because in some cases the individual isomers can be interconverted during work-up for use or during application (e.g. under the action of light, acids or bases). Such conversions may also take place after use, e.g. in the treatment of plants in the treated plant, or in the harmful fungus to be controlled.

Compositions of this invention, including all of the above disclosed embodiments and preferred examples thereof, can be mixed with one or more further pesticides including further fungicides, insecticides, nematocides, bactericides, acaricides, growth regulators, chemosterilants, semiochemicals, repellents, attractants, pheromones, feeding stimulants or other biologically active compounds to form a multi-component pesticide giving an even broader spectrum of agricultural protection.

Examples of such agricultural protectants with which the composition of this invention can be formulated are:

Fungicides such as etridiazole, fluazinam, benalaxyl, benalaxyl-M (kiralaxyl), furalaxyl, metalaxyl, metalaxyl-M (mefenoxam), dodicin, N'-(2,5-dimethyl-4-phenoxy-phenyl)-N-ethyl-N-methyl-formamidine, N'-[4-(4,5-dichloro-thiazol-2-yloxy)-2,5-dimethyl-phenyl]-N-ethyl-N-methyl-formamidine, N'-[4-[[3-[(4-chlorophenyl)methyl]-1,2,4-thiadiazol-5-yl]oxy]-2,5-dimethyl-phenyl]-N-ethyl-N-methyl-formamidine, ethirimol, 3'-chloro-2-methoxy-N-[(3RS)-tetrahydro-2-oxofuran-3-yl]acet-2',6'-xylidide (clozylacon), cyprodinil, mepanipyrim, pyrimethanil, dithianon, aureofungin, blasticidin-S, biphenyl, chloroneb, dicloran, benzovindiflupyr, pydiflumetofen, hexachlorobenzene, quintozene, tecnazene, (TCNB), tolclofos-methyl, metrafenone, 2,6-dichloro-N-(4-trifluoromethylbenzyl)-benzamide, fluopicolide (flupicolide), tioxymid, flusulfamide, benomyl, carbendazim, carbendazim chlorhydrate, chlorfenazole, fuberidazole, thiabendazole, thiophanate-methyl, benthiavalicarb, chlobenthiazone, probenazole, acibenzolar, bethoxazin, pyriofenone (IKF-309), acibenzolar-S-methyl, pyribencarb (KIF-7767), butylamine, 3-iodo-2-propinyl n-butylcarbamate (IPBC), iodocarb (isopropanyl butylcarbamate), isopropanyl butylcarbamate (iodocarb), picarbutrazox, polycarbamate, propamocarb, tolprocarb, 3-(difluoromethyl)-N-(7-fluoro-1,1,3,3-tetramethyl-indan-4-yl)-1-methyl-pyrazole-4-carboxamide diclocymet, N-[(5-chloro-2-isopropyl-phenyl)methyl]-N-cyclopropyl-3-(difluoromethyl)-5-fluoro-1-methyl-pyrazole-4-carboxamide N-cyclopropyl-3-(difluoromethyl)-5-fluoro-N-[(2-isopropylphenyl)methyl]-1-methyl-pyrazole-4-carboxamide carpropamid, chlorothalonil, flumorph, oxine-copper, cymoxanil, phenamacril, cyazofamid, flutianil, thicyofen, chlozolinate, iprodione, procymidone, vinclozolin, bupirimate, dinocton, dinopenton, dinobuton, dinocap, meptyldinocap, diphenylamine, phosdiphen, 2,6-dimethyl-[1,4]dithiino[2,3-c:5,6-c]dipyrrole-1,3,5,7(2H,6H)-tetraone, azithiram, etem, ferbam, mancozeb, maneb, metam, metiram (polyram), metiram-zinc, nabam, propineb, thiram, vapam (metam sodium), zineb, ziram, dithioether, isoprothiolane, ethaboxam, fosetyl, phosetyl-Al (fosetyl-al), methyl bromide, methyl iodide, methyl isothiocyanate, cyclafuramid, fenfuram, validamycin, streptomycin, (2RS)-2-bromo-2-(bromomethyl)glutaronitrile (bromothalonil), dodine, doguadine, guazatine, iminoctadine, iminoctadine triacetate, 2,4-D, 2,4-DB, kasugamycin, dimethirimol, fenhexamid, hymexazole, hydroxyisoxazole imazalil, imazalil sulphate, oxpoconazole, pefurazoate, prochloraz, triflumizole, fenamidone, Bordeaux mixture, calcium polysulfide, copper acetate, copper carbonate, copper hydroxide, copper naphthenate, copper oleate, copper oxychloride, copper oxyquinolate, copper silicate, copper sulphate, copper tallate, cuprous oxide, sulphur, carbaryl, phthalide (fthalide), dingjunezuo (Jun Si Qi), oxathiapiprolin, fluoroimide, mandipropamid, KSF-1002, benzamorf, dimethomorph, fenpropimorph, tridemorph, dodemorph, diethofencarb, fentin acetate, fentin hydroxide, carboxin, oxycarboxin, drazoxolon, famoxadone, m-phenylphenol, p-phenylphenol, tribromophenol (TBP), 2-[2-[(7,8-difluoro-2-methyl-3-quinolyl) oxy]-6-fluoro-phenyl]propan-2-ol 2-[2-fluoro-6-[(8-fluoro-2-methyl-3-quinolyl)oxy]phenyl]propan-2-ol cyflufenamid, ofurace, oxadixyl, flutolanil, mepronil, isofetamid, fenpiclonil, fludioxonil, pencycuron, edifenphos, iprobenfos, pyrazophos, phosphorus acids, tecloftalam, captafol, captan, ditalimfos, triforine, fenpropidin, piperalin, osthol, 1-methylcyclopropene, 4-CPA, chlormequat, clofencet, dichlorprop, dimethipin, endothal, ethephon, flumetralin, forchlorfenuron, gibberellic acid, gibberellins, hymexazol, maleic hydrazide, mepiquat, naphthalene acetamide, paclobutrazol, prohexadione, prohexadione-calcium, thidiazuron, tribufos (tributyl phosphorotrithioate), trinexapac, uniconazole, α-naphthalene acetic acid, polyoxin D (polyoxrim), BLAD, chitosan, fenoxanil, folpet, 3-(difluoromethyl)-N-methoxy-1-methyl-N-[1-methyl-2-(2,4,6-trichlorophenyl)ethyl]pyrazole carboxamide, bixafen, fluxapyroxad, furametpyr, isopyrazam, penflufen, penthiopyrad, sedaxane, fenpyrazamine, diclomezine, pyrifenox, boscalid, fluopyram, diflumetorim, fenarimol, 5-fluoro-2-(p-tolylmethoxy)pyrimidin-4-amine ferimzone, dimetachlone (dimethaclone), pyroquilon, proquinazid, ethoxyquin, quinoxyfen, 4,4,5-trifluoro-3,3-dimethyl-1-(3-quinolyl)isoquinoline, 4,4-difluoro-3,3-dimethyl-1-(3-quinolyl)isoquinoline 5-fluoro-3,3,4,4-tetramethyl-1-(3-quinolyl)isoquinoline 9-fluoro-2,2-dimethyl-5-(3-quinolyl)-3H-1,4-benzoxazepine, tebufloquin, oxolinic acid, chinomethionate (oxythioquinox, quinoxymethionate), spiroxamine, (E)-N-methyl-2-[2-(2, 5-dimethylphenoxymethyl) phenyl]-2-methoxy-iminoacetamide, (mandestrobin), azoxystrobin, coumoxystrobin, dimoxystrobin, enestroburin, enoxastrobin, fenamistrobin, flufenoxystrobin, fluoxastrobin, kresoxim-methyl, mandestrobin, metaminostrobin, metominostrobin, orysastrobin, picoxystrobin, pyraclostrobin, pyrametostrobin, pyraoxystrobin, triclopyricarb, trifloxystrobin, amisulbrom, dichlofluanid, tolylfluanid, but-3-ynyl N-[6-[[(Z)-[(1-methyltetrazol-5-yl)-phenyl-methylene]amino] oxymethyl]-2-pyridyl]carbamate, dazomet, isotianil, tiadinil, thifluzamide, benthiazole (TCMTB), silthiofam, zoxamide, anilazine, tricyclazole, (.+-.)-cis-1-(4-chlorophenyl)-2-(1H-1,2,4-triazol-1-yl)-cycloheptanol (huanjunzuo), 1-(5-bromo-2-pyridyl)-2-(2,4-difluorophenyl)-1,1-difluoro-3-(1,2,4-triazol-1-yl)propan-2-ol 2-(1-tert-butyl)-1-(2-chlorophenyl)-3-(1,2,4-triazol-1-yl)-propan-2-ol (TCDP), azaconazole, bitertanol (biloxazol), bromuconazole, climbazole, cyproconazole, difenoconazole, dimetconazole, diniconazole, diniconazole-M, epoxiconazole, etaconazole, fenbuconazole, fluquinconazole, flusilazole, flutriafol, hexaconazole, imibenconazole, ipconazole, ipfentrifluconazole, metconazole, myclobutanil, penconazole, propiconazole, prothioconazole, simeconazole, tebuconazole, tetraconazole, triadimefon, triadimenol, triazoxide, triticonazole, mefentrifluconazole, 2-[[(1R,5S)-5-[(4-fluorophenyl) methyl]-1-hydroxy-2,2-dimethyl-cyclopentyl]methyl]-4H-1,2,4-triazole-3-thione, 2-[[3-(2-chlorophenyl)-2-(2,4-difluorophenyl)oxiran-2-yl]methyl]-4H-1,2,4-triazole-3-thione, ametoctrad in (imidium), iprovalicarb, valifenalate, 2-benzyl-4-chlorophenol (Chlorophene), allyl alcohol, azafenidin, benzalkonium chloride, chloropicrin, cresol, daracide, dichlorophen (dichlorophene), difenzoquat, dipyrithione, N-(2-p-chlorobenzoylethyl)-hexaminium chloride, NNF-0721, octhilinone, oxasulfuron, propamidine and propionic acid.

Insecticides such as abamectin, acephate, acetamiprid, amidoflumet (S-1955), avermectin, azadirachtin, azinphos-methyl, bifenthrin, bifenazate, buprofezin, carbofuran, cartap, chlorantraniliprole (DPX-E2Y45), chlorfenapyr, chlorfluazuron, chlorpyrifos, chlorpyrifos-methyl, chromafenozide, clothianidin, cyflumetofen, cyfluthrin, beta-cyfluthrin, cyhalothrin, lambda-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim (UR-50701), flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, nitenpyram, nithiazine, novaluron, noviflumuron (XDE-007), oxamyl, parathion, parathion-methyl, permethrin, phorate, phosalone, phosmet, phosphamidon, pirimicarb, profenofos, profluthrin, pymetrozine, pyrafluprole, pyrethrin, pyridalyl, pyrifluquinazon, pyriprole, pyriproxyfen, rotenone, ryanodine, spinetoram, spinosad, spirodiclofen, spiromesifen (BSN 2060), spirotetramat, sulprofos, tebufenozide, teflubenzuron, tefluthrin, terbufos, tetrachlorvinphos, thiacloprid, thiamethoxam, thiodicarb, thiosultap-sodium, tralomethrin, triazamate, trichlorfon and triflumuron;

Bactericides such as streptomycin;

Acaricides such as amitraz, chinomethionat, chlorobenzilate, cyenopyrafen, cyhexatin, dicofol, dienochlor, etoxazole, fenazaquin, fenbutatin oxide, fenpropathrin, fenpyroximate, hexythiazox, propargite, pyridaben and tebufenpyrad; and Biological agents such as *Bacillus thuringiensis, Bacillus thuringiensis* delta endotoxin, baculovirus, and entomopathogenic bacteria, virus and fungi.

Other examples of "reference" mixture compositions are as follows (wherein the term "TX" represents a compound (according to the definition of component (A) of the compositions of the present invention) selected from compound no. X.01, X.02, X.03 or X.04 as defined in the Table X above): a compound selected from the group of substances consisting of petroleum oils+TX, 1,1-bis(4-chloro-phenyl)-2-ethoxyethanol+TX, 2,4-dichlorophenyl benzenesulfonate+TX, 2-fluoro-N-methyl-N-1-naphthylacetamide+TX, 4-chlorophenyl phenyl sulfone+TX, acetoprole+TX, aldoxycarb+TX, amidithion+TX, amidothioate+TX, amiton+TX, amiton hydrogen oxalate+TX, amitraz+TX, aramite+TX, arsenous oxide+TX, azobenzene+TX, azothoate+TX, benomyl+TX, benoxa-fos+TX, benzyl benzoate+TX, bixafen+TX, brofenvalerate+TX, broflanilide+TX, bromo-cyclen+TX, bromophos+TX, bromopropylate+TX, buprofezin+TX, butocarboxim+TX, butoxycarboxim+TX, butylpyridaben+TX, calcium polysulfide+TX, camphechlor+TX, carbanolate+TX, carbophenothion+TX, cymiazole+TX, chino-methionat+TX, chlorbenside+TX, chlordimeform+TX, chlordimeform hydrochloride+TX, chlorfenethol+TX, chlorfenson+TX, chlorfensulfide+TX, chlorobenzilate+TX, chloromebuform+TX, chloromethiuron+TX, chloropropylate+TX, chlorthiophos+TX, cinerin I+TX, cinerin II+TX, cinerins+TX, closantel+TX, coumaphos+TX, crotamiton+TX, crotoxyphos+TX, cufraneb+TX, cyanthoate+TX, DCPM+TX, DDT+TX, demephion+TX, demephion-O+TX, demephion-S+TX, demeton-methyl+TX, demeton-O+TX, demeton-O-methyl+TX, demeton-S+TX, demeton-S-methyl+TX, demeton-S-methylsulfon+TX, dichlofluanid+TX, dichlorvos+TX, dicliphos+TX, dienochlor+TX, dimefox+TX, dinex+TX, dinex-diclexine+TX, dinocap-4+TX, dinocap-6+TX, dinocton+TX, dino-penton+TX, dinosulfon+TX, dinoterbon+TX, dioxathion+TX, diphenyl sulfone+TX, disulfiram+TX, DNOC+TX, dofenapyn+TX, doramectin+TX, endothion+TX, eprinomectin+TX, ethoate-methyl+TX, etrimfos+TX, fenazaflor+TX, fenbutatin oxide+TX, fenothiocarb+TX, fenpyrad+TX, fen-pyroximate+TX, fenpyrazamine+TX, fenson+TX, fentrifanil+TX, flubenzimine+TX, flucycloxuron+TX, fluenetil+TX, fluorbenside+TX, FMC 1137+TX, formetanate+TX, formetanate hydrochloride+TX, formparanate+TX, gamma-HCH+TX, glyodin+TX, halfenprox+TX, hexadecyl cyclopropanecarboxylate+TX, isocarbophos+TX, jasmolin I+TX, jasmolin II+TX, jodfenphos+TX, lindane+TX, malonoben+TX, mecarbam+TX, mephosfolan+TX, mesulfen+TX, methacrifos+TX, methyl bromide+TX, metolcarb+TX, mexacarbate+TX, milbemycin oxime+TX, mipafox+TX, monocrotophos+TX, morphothion+TX, moxidectin+TX, naled+TX, 4-chloro-2-(2-chloro-2-methyl-propyl)-5-[(6-iodo-3-pyridyl)methoxy]pyridazin-3-one+TX, nifluridide+TX, nikkomycins+TX, nitrilacarb+TX, nitrilacarb 1:1 zinc chloride complex+TX, omethoate+TX, oxydeprofos+TX, oxydisulfoton+TX, pp'-DDT+TX, parathion+TX, permethrin+TX, phenkapton+TX, phosalone+TX, phosfolan+TX, phosphamidon+TX, polychloroterpenes+TX, polynactins+TX, proclonol+TX, promacyl+TX, propoxur+TX, prothidathion+TX, prothoate+TX, pyrethrin I+TX, pyrethrin II+TX, pyrethrins+TX, pyridaphenthion+TX, pyrimitate+TX, quinalphos+TX, quintiofos+TX, R-1492+TX, phosglycin+TX, rotenone+TX, schradan+TX, sebufos+TX, selamectin+TX, sophamide+TX, SSI-121+TX, sulfiram+TX, sulfluramid+TX, sulfotep+TX, sulfur+TX, diflovidazin+TX, tau-fluvalinate+TX, TEPP+TX, terbam+TX, tetradifon+TX, tetrasul+TX, thiafenox+TX, thiocarboxime+TX, thiofanox+TX, thiometon+TX, thioquinox+TX, thuringiensin+TX, triamiphos+TX, triarathene+TX, triazophos+TX, triazuron+TX, trifenofos+TX, trinactin+TX, vamidothion+TX, vaniliprole+TX, bethoxazin+TX, copper dioctanoate+TX, copper sulfate+TX, cybutryne+TX, dichlone+TX, dichlorophen+TX, endothal+TX, fentin+TX, hydrated lime+TX, nabam+TX, quinoclamine+TX, quinonamid+TX, simazine+TX, triphenyltin acetate+TX, triphenyltin hydroxide+TX, crufomate+TX, piperazine+TX, thiophanate+TX, chloralose+TX, fenthion+TX, pyridin-4-amine+TX, strychnine+TX, 1-hydroxy-1H-pyridine-2-thione+TX, 4-(quinoxalin-2-ylamino)benzenesulfonamide+TX, 8-hydroxyquinoline sulfate+TX, bronopol+TX, copper hydroxide+TX, cresol+TX, dipyrithione+TX, dodicin+TX, fenaminosulf+TX, formaldehyde+TX, hydrargaphen+TX, kasugamycin+TX, kasugamycin hydrochloride hydrate+TX, nickel bis(dimethyldithiocarbamate)+TX, nitrapyrin+TX, octhilinone+TX, oxolinic acid+TX, oxytetracycline+TX, potassium hydroxyquinoline sulfate+TX, probenazole+TX, streptomycin+TX, streptomycin sesquisulfate+TX, tecloftalam+TX, thiomersal+TX, *Adoxophyes orana* GV+TX, *Agrobacterium radiobacter*+TX, *Amblyseius* spp.+TX, *Anagrapha falcifera* NPV+TX, *Anagrus atomus*+TX, *Aphelinus abdominalis*+TX, *Aphidius colemani*+TX, *Aphidoletes aphidimyza*+TX, *Autographa californica* NPV+TX, *Bacillus sphaericus* Neide+TX, *Beauveria brongniartii*+TX, *Chrysoperla carnea*+TX, *Cryptolaemus montrouzieri*+TX, *Cydia pomonella* GV+TX, *Dacnusa sibirica*+TX, *Diglyphus isaea*+TX, *Encarsia formosa*+TX, *Eretmocerus eremicus*+TX, *Heterorhabditis bacteriophora* and *H. megidis*+TX, *Hippodamia convergens*+TX, *Leptomastix dactylopii*+TX, *Macrolophus caliginosus*+TX, *Mamestra brassicae* NPV+TX, *Metaphycus helvolus*+TX, *Metarhizium anisopliae* var. *acridum*+TX, *Metarhizium anisopliae* var. *anisopliae*+TX, *Neodiprion sertifer* NPV and *N. lecontei* NPV+TX, *Orius* spp.+TX, *Paecilomyces fumosoroseus*+TX, *Phytoseiulus persimilis*+TX, *Steinernema bibionis*+TX, *Steinernema carpocapsae*+TX, *Steinernema feltiae*+TX, *Steinernema glaseri*+TX, *Steinernema riobrave*+TX, *Steinernema riobravis*+TX, *Steinernema scapterisci*+TX, *Steinernema* spp.+TX, *Trichogramma* spp.+TX, *Typhlodromus occidentalis*+TX, *Verticillium lecanii*+TX, apholate+TX, bisazir+TX, busulfan+TX, dimatif+TX, hemel+TX, hempa+TX, metepa+TX, methiotepa+TX, methyl apholate+TX, morzid+TX, penfluron+TX, tepa+TX, thiohempa+TX, thiotepa+TX, tretamine+TX, uredepa+TX, (E)-dec-5-en-1-yl acetate with (E)-dec-5-en-1-ol+TX, (E)-tridec-4-en-1-yl acetate+TX, (E) methylhept-2-en-4-ol+TX, (E,Z)-tetradeca-4,10-dien-1-yl acetate+TX, (Z)-dodec-7-en-1-yl acetate+TX, (Z)-hexadec-11-enal+TX, (Z)-hexadec-11-en-1-yl acetate+TX, (Z)-hexadec-13-en-11-yn-1-yl acetate+TX, (Z)-icos-13-en-10-one+TX, (Z)-tetradec-7-en-1-al+TX, (Z)-tetradec-9-en-1-ol+TX, (Z)-tetradec-9-en-1-yl acetate+TX, (7E,9Z)-dodeca-7,9-dien-1-yl acetate+TX, (9Z,11E)-tetradeca-9,11-dien-1-ylacetate+TX, (9Z,12E)-tetradeca-9,12-dien-1-yl acetate+TX, 14-methyloctadec-1-ene+TX, 4-methylnonan-5-ol with 4-methylnonan-5-one+TX, alpha-multistriatin+TX, brevicomin+TX, codlelure+TX, codlemone+TX, cuelure+TX, disparlure+TX, dodec-8-en-1-yl acetate+TX, dodec-9-en-1-yl acetate+TX, dodeca-8+TX, 10-dien-1-yl acetate+TX, dominicalure+TX, ethyl 4-methyloctanoate+TX, eugenol+TX, frontalin+TX, grandlure+TX, grandlure 1+TX, grandlure II+TX, grandlure III+TX, grandlure IV+TX, hexalure+TX, ipsdienol+TX, ipsenol+TX, japonilure+TX, lineatin+TX, litlure+TX, looplure+TX, medlure+TX, megatomoic acid+TX, methyl eugenol+TX, muscalure+TX, octadeca-2,13-dien-1-yl acetate+TX, octadeca-3,13-dien-1-yl acetate+TX, orfralure+TX, oryctalure+TX, ostramone+TX, siglure+TX, sordidin+TX, sulcatol+TX, tetradec-11-en-1-yl acetate+TX, trimedlure+TX, trimedlure A+TX, trimedlure $B_1$+TX, trimedlure $B_2$+TX, trimedlure C+TX, trunc-call+TX, 2-(octylthio)-ethanol+TX, butopyronoxyl+TX, butoxy(polypropylene glycol)+TX, dibutyl adipate+TX, dibutyl phthalate+TX, dibutyl succinate+TX, diethyltoluamide+TX, dimethyl carbate+TX, dimethyl phthalate+TX, ethyl hexanediol+TX, hexamide+TX, methoquin-butyl+TX, methylneodecanamide+TX, oxamate+TX, picaridin+TX, 1-dichloro-1-nitroethane+TX, 1,1-dichloro-2,2-bis(4-ethylphenyl)-ethane+TX, 1,2-dichloropropane with 1,3-dichloropropene+TX, 1-bromo-2-chloroethane+TX, 2,2,2-trichloro-1-(3,4-dichloro-phenyl)ethyl acetate+TX, 2,2-dichlorovinyl 2-ethylsulfinylethyl methyl phosphate+TX, 2-(1,3-dithiolan-2-yl) phenyl dimethylcarbamate+TX, 2-(2-butoxyethoxy)ethyl thiocyanate+TX, 2-(4,5-dimethyl-1,3-dioxolan-2-yl)phenyl methylcarbamate+TX, 2-(4-chloro-3,5-xylyloxy)ethanol+TX, 2-chlorovinyl diethyl phosphate+TX, 2-imidazolidone+TX, 2-isovalerylindan-1,3-dione+TX, 2-methyl(prop-2- ynyl)aminophenyl methylcarbamate+TX, 2-thiocyanatoethyl laurate+TX, 3-bromo-1-chloroprop-1-ene+TX, 3-methyl-1-phenylpyrazol-5-yl dimethyl-carbamate+TX, 4-methyl(prop-2-ynyl)amino-3,5-xylyl methylcarbamate+TX, 5,5-dimethyl-3-oxocyclohex-1-enyl dimethylcarbamate+TX, acethion+TX, acrylonitrile+TX, aldrin+TX, allosamidin+TX, allyxycarb+TX, alpha-ecdysone+TX, aluminium phosphide+TX, aminocarb+TX, anabasine+TX, athidathion+TX, azamethiphos+TX, *Bacillus thuringiensis* delta endotoxins+TX, barium hexafluorosilicate+TX, barium polysulfide+TX, barthrin+TX, Bayer 22/190+TX, Bayer 22408+TX, beta-cyfluthrin+TX, beta-cypermethrin+TX, bioethanomethrin+TX, biopermethrin+TX, bis(2-chloroethyl) ether+TX, borax+TX, bromfenvinfos+TX, bromo-DDT+TX, bufencarb+TX, butacarb+TX, butathiofos+TX, butonate+TX, calcium arsenate+TX, calcium cyanide+TX, carbon disulfide+TX, carbon tetrachloride+TX, cartap hydrochloride+TX, cevadine+TX, chlorbicyclen+TX, chlordane+TX, chlordecone+TX, chloroform+TX, chloropicrin+TX, chlorphoxim+TX, chlorprazophos+TX, cis-resmethrin+TX, cismethrin+TX, clocythrin+TX, copper acetoarsenite+TX, copper arsenate+TX, copper oleate+TX, coumithoate+TX, cryolite+TX, CS 708+TX, cyanofenphos+TX, cyanophos+TX, cyclethrin+TX, cythioate+TX, d-tetramethrin+TX, DAEP+TX, dazomet+TX, decarbofuran+TX, diamidafos+TX, dicapthon+TX, dichlofenthion+TX, dicresyl+TX, dicyclanil+TX, dieldrin+TX, diethyl 5-methylpyrazol-3-yl phosphate+TX, dilor+TX, dimefluthrin+TX, dimetan+TX, dimethrin+TX, dimethylvinphos+TX, dimetilan+TX, dinoprop+TX, dinosam+TX, dinoseb+TX, diofenolan+TX, dioxabenzofos+TX, dithicrofos+TX, DSP+TX, ecdysterone+TX, EI 1642+TX, EMPC+TX, EPBP+TX, etaphos+TX, ethiofencarb+TX, ethyl formate+TX, ethylene dibromide+TX, ethylene dichloride+TX, ethylene oxide+TX, EXD+TX, fenchlorphos+TX, fenethacarb+TX, fenitrothion+TX, fenoxacrim+TX, fenpirithrin+TX, fensulfothion+TX, fenthion-ethyl+TX, flucofuron+TX, fosmethilan+TX, fospirate+TX, fosthietan+TX, furathiocarb+TX, furethrin+TX, guazatine+TX, guazatine acetates+TX, sodium tetrathiocarbonate+TX, halfenprox+TX, HCH+TX, HEOD+TX, heptachlor+TX, heterophos+TX, HHDN+TX, hydrogen cyanide+TX, hyquincarb+TX, IPSP+TX, isazofos+TX, isobenzan+TX, isodrin+TX, isofenphos+TX, isolane+TX, isoprothiolane+TX, isoxathion+TX, juvenile hormone I+TX, juvenile hormone II+TX, juvenile hormone III+TX, kelevan+TX, kinoprene+TX, lead arsenate+TX, leptophos+TX, lirimfos+TX, lythidathion+TX, m-cumenyl methylcarbamate+TX, magnesium phosphide+TX, mazidox+TX, mecarphon+TX, menazon+TX, mercurous chloride+TX, mesulfenfos+TX, metam+TX, metam-potassium+TX, metam-sodium+TX, methanesulfonyl fluoride+TX, methocrotophos+TX, methoprene+TX, methothrin+TX, methoxychlor+TX, methyl isothiocyanate+TX, methylchloroform+TX, methylene chloride+TX, metoxadiazone+TX, mirex+TX, naftalofos+TX, naphthalene+TX, NC-170+TX, nicotine+TX, nicotine sulfate+TX, nithiazine+TX, nornicotine+TX, 0-5-dichloro-4-iodophenyl O-ethyl ethylphosphonothioate+TX, O,O-diethyl O-4-methyl-2-oxo-2H-chromen-7-yl phosphorothioate+TX, O,O-diethyl O-6-methyl-2-propylpyrimidin-4-yl phosphorothioate+TX, O,O,O',O'-tetrapropyl dithiopyrophosphate+TX, oleic acid+TX, para-dichlorobenzene+TX, parathion-methyl+TX, pentachlorophenol+TX, pentachlorophenyl laurate+TX, PH 60-38+TX, phenkapton+TX, phosnichlor+TX, phosphine+TX, phoxim-methyl+TX, pirimetaphos+TX, polychlorodicyclopentadiene isomers+TX, potassium arsenite+TX, potassium thiocyanate+TX, precocene I+TX, precocene II+TX, precocene III+TX, primidophos+TX, profluthrin+TX, promecarb+TX, prothiofos+TX, pyrazophos+TX, pyresmethrin+TX, quassia+TX, quinalphos-methyl+TX, quinothion+TX, rafoxanide+TX, resmethrin+TX, rotenone+TX, kadethrin+TX, ryania+TX, ryanodine+TX, sabadilla)+TX, schradan+TX, sebufos+TX, SI-0009+TX, thiapronil+TX, sodium arsenite+TX, sodium cyanide+TX, sodium fluoride+TX, sodium hexafluorosilicate+TX, sodium pentachlorophenoxide+TX, sodium selenate+TX, sodium thiocyanate+TX, sulcofuron+TX, sulcofuron-sodium+TX, sulfuryl fluoride+TX, sulprofos+TX, tar oils+TX, tazimcarb+TX, TDE+TX, tebupirimfos+TX, temephos+TX, terallethrin+TX, tetrachloroethane+TX, thicrofos+TX, thiocyclam+TX, thiocyclam hydrogen oxalate+TX, thionazin+TX, thiosultap+TX, thiosultap-sodium+TX, tralomethrin+TX, transpermethrin+TX, triazamate+TX, trichlormetaphos-3+TX, trichloronat+TX, trimethacarb+TX, tolprocarb+TX, triclopyricarb+TX, triprene+TX, veratridine+TX, veratrine+TX, XMC+TX, zetamethrin+TX, zinc phosphide+TX, zolaprofos+TX, and meperfluthrin+TX, tetramethylfluthrin+TX, bis(tributyltin) oxide+TX, bromoacetamide+TX, ferric phosphate+TX, niclosamide-olamine+TX, tributyltin oxide+TX, pyrimorph+TX, trifenmorph+TX, 1,2-dibromo-3-chloropropane+TX, 1,3-dichloropropene+TX, 3,4-dichlorotetrahydrothio-phene 1,1-dioxide+TX, 3-(4-chlorophenyl)-5-methylrhodanine+TX, 5-methyl-6-thioxo-1,3,5-thiadiazinan-3-ylacetic acid+TX, 6-isopentenylaminopurine+TX, 2-fluoro-N-(3-methoxyphenyl)-9H-purin-6-amine+TX, benclothiaz+TX, cytokinins+TX, DCIP+TX, furfural+TX, isamidofos+TX, kinetin+TX, *Myrothecium* verrucaria composition+TX, tetrachlorothiophene+TX, xylenols+TX, zeatin+TX, potassium ethylxanthate+TX,acibenzolar+TX, acibenzolar-S-methyl+TX, *Reynoutria sachalinensis* extract+TX, alpha-chlorohydrin+TX, antu+TX, barium carbonate+TX, bisthiosemi+TX, brodifacoum+TX, bromadiolone+TX, bromethalin+TX, chlorophacinone+TX, cholecalciferol+TX, coumachlor+TX, coumafuryl+TX, coumatetralyl+TX, crimidine+TX, difenacoum+TX, difethialone+TX, diphacinone+TX, ergocalciferol+TX, flocoumafen+TX, fluoroacetamide+TX, flupropadine+TX, flupropadine hydrochloride+TX, norbormide+TX, phosacetim+TX, phosphorus+TX, pindone+TX, pyrinuron+TX, scilliroside+TX, -sodium fluoroacetate+TX, thallium sulfate+TX, warfarin+TX, -2-(2-butoxyethoxy)ethyl piperonylate+TX, 5-(1,3-benzodioxol-5-yl)-3-hexylcyclohex-2-enone+TX, farnesol with nerolidol+TX, verbutin+TX, MGK 264+TX, piperonyl butoxide+TX, piprotal+TX, propyl isomer+TX, S421+TX, sesamex+TX, sesasmolin+TX, sulfoxide+TX, anthraquinone+TX, copper naphthenate+TX, copper oxychloride+TX, dicyclopentadiene+TX, thiram+TX, zinc naphthenate+TX, ziram+TX, imanin+TX, ribavirin+TX, chloroinconazide+TX, mercuric oxide+TX, thiophanate-methyl+TX, azaconazole+TX, bitertanol+TX, bromuconazole+TX, cyproconazole+TX, difenoconazole+TX, diniconazole-+TX, epoxiconazole+TX, fenbuconazole+TX, fluquinconazole+TX, flusilazole+TX, flutriafol+TX, furametpyr+TX, hexaconazole+TX, imazalil-+TX, imiben-conazole+TX, ipconazole+TX, metconazole+TX, myclobutanil+TX, paclobutrazole+TX, pefurazoate+TX, penconazole+TX, prothioconazole+TX, pyrifenox+TX, prochloraz+TX, propiconazole+TX, pyrisoxazole+TX, -simeconazole+TX, tebuconazole+TX, tetraconazole+TX, triadimefon+TX, triadimenol+TX, triflumizole+TX, triticonazole+TX, ancymidol+TX, fenarimol+TX, nuarimol+TX, bupirimate+TX, dimethirimol+TX, ethirimol+TX, dodemorph+TX, fenpropidin+TX, fenpropimorph+TX, spiroxamine+TX, tridemorph+TX, cyprodinil+TX, mepanipyrim+TX, pyrimethanil+TX, fenpiclonil+TX, fludioxonil+TX, benalaxyl+TX, furalaxyl+TX, -metalaxyl-+TX, Rmetalaxyl+TX, ofurace+TX, oxadixyl+TX, carbendazim+TX, debacarb+TX, fuberidazole-+TX, thiabendazole+TX, chlozolinate+TX, dichlozoline+TX, myclozoline-+TX, procymidone+TX, vinclozoline+TX, boscalid+TX, carboxin+TX, fenfuram+TX, flutolanil+TX, mepronil+TX, oxycarboxin+TX, penthiopyrad+TX, thifluzamide+TX, dodine+TX, iminoctadine+TX, azoxystrobin+TX, dimoxystrobin+TX, enestroburin+TX, fenaminstrobin+TX, flufenoxystrobin+TX, fluoxastrobin+TX, kresoxim-methyl+TX, metominostrobin+TX, trifloxystrobin+TX, orysastrobin+TX, picoxystrobin+TX, pyraclostrobin+TX, pyrametostrobin+TX, pyraoxystrobin+TX, ferbam+TX, mancozeb+TX, maneb+TX, metiram+TX, propineb+TX, zineb+TX, captafol+TX, captan+TX, fluoroimide+TX, folpet+TX, tolylfluanid+TX, bordeaux mixture+TX, copper oxide+TX, mancopper+TX, oxine-copper+TX, nitrothal-isopropyl+TX, edifenphos+TX, iprobenphos+TX, phosdiphen+TX, tolclofos-methyl+TX, anilazine+TX, benthiavalicarb+TX, blasticidin-S+TX, chloroneb-+TX, chloro-thalonil+TX, cyflufenamid+TX, cymoxanil+TX, cyclobutrifluram+TX, diclocymet+TX, diclomezine-+TX, dicloran+TX, diethofencarb+TX, dimethomorph-+TX, flumorph+TX, dithianon+TX, ethaboxam+TX, etridiazole+TX, famoxadone+TX, fenamidone+TX, fenoxanil+TX, ferimzone+TX, fluazinam+TX, fluopicolide+TX, flusulfamide+TX, fluxapyroxad+TX, −fenhexamid+TX, fosetyl-aluminium-+TX, hymexazol+TX, iprovalicarb+TX, cyazofamid+TX, methasulfocarb+TX, metrafenone+TX, pencycuron+TX, phthalide+TX, polyoxins+TX, propamocarb+TX, pyribencarb+TX, proquinazid+TX, pyroquilon+TX, pyriofenone+TX, quinoxyfen+TX, quintozene+TX, tiadinil+TX, triazoxide+TX, tricyclazole+TX, triforine+TX, validamycin+TX, valifenalate+TX, zoxamide+TX, mandipropamid+TX, flubeneteram+TX, isopyrazam+TX, sedaxane+TX, benzovindiflupyr+TX, pydiflumetofen+TX, 3-difluoromethyl-1-methyl-1H-pyrazole-4-carboxylic acid (3',4',5'-trifluoro-biphenyl-2-yl)-amide+TX, isoflucypram+TX, isotianil+TX, dipymetitrone+TX, 6-ethyl-5,7-dioxo-pyrrolo[4,5][1,4]dithiino[1,2-c]isothiazole-3-carbonitrile+TX, 2-(difluoromethyl)-N-[3-ethyl-1,1-dimethyl-indan-4-yl]pyridine-3-carboxamide+TX, 4-(2,6-difluorophenyl)-6-methyl-5-phenyl-pyridazine-3-carbonitrile+TX, (R)-3-(difluoromethyl)-1-methyl-N-[1,1,3-trimethylindan-4-yl]pyrazole-4-carboxamide+TX, 4-(2-bromo-4-fluoro-phenyl)-N-(2-chloro-6-fluoro-phenyl)-2,5-dimethyl-pyrazol-3-amine+TX, 4-(2-bromo-4-fluorophenyl)-N-(2-chloro-6-fluorophenyl)-1,3-dimethyl-1H-pyrazol-5-amine+TX, fluindapyr+TX, coumethoxystrobin (jiaxiangjunzhi)+TX, lvbenmixianan+TX, dichlobentiazox+TX, mandestrobin+TX, 3-(4,4-difluoro-3,4-dihydro-3,3-dimethylisoquinolin-1-yl)quinolone+TX, 2-[2-fluoro-6-[(8-fluoro-2-methyl-3-quinolyl)oxy]phenyl]propan-2-ol+TX, oxathiapiprolin+TX, tert-butyl N-[6-[[[(1-methyltetrazol-5-yl)-phenyl-methylene]amino]oxymethyl]-2-pyridyl]carbamate+TX, pyraziflumid+TX, inpyrfluxam+TX, trolprocarb+TX, mefentrifluconazole+TX, ipfentrifluconazole+TX, 2-(difluoromethyl)-N-[(3R)-3-ethyl-1,1-dimethyl-indan-4-yl]pyridine-3-carboxamide+TX, N'-(2,5-dimethyl-4-phenoxy-phenyl)-N-ethyl-N-methyl-formamidine+TX, N'-[4-(4,5-dichlorothiazol-2-yl)oxy-2,5-dimethyl-phenyl]-N-ethyl-N-methyl-formamidine+TX, [2-[3-[2-[1-[2-[3,5-bis(difluoromethyl)pyrazol-1-yl]acetyl]-4-piperidyl]thiazol-4-yl]-4,5-dihydroisoxazol-5-yl]-3-chloro-phenyl] methanesulfonate+TX, but-3-ynyl N-[6-[[(Z)-[(1-methyltetrazol-5-yl)-phenyl-methylene]amino]oxymethyl]-2-pyridyl]carbamate+TX, methyl N-[[5-[4-(2,4-dimethylphenyl)triazol-2-yl]-2-methyl-phenyl]methyl]carbamate TX, 3-chloro-6-methyl-5-phenyl-4-(2,4,6-trifluorophenyl)pyridazine+TX, pyridachlometyl+TX, 3-(difluoromethyl)-1-methyl-N-[1,1,3-trimethylindan-4-yl]pyrazole-4-carboxamide+TX, 1-[2-[[1-(4-chlorophenyl)pyrazol-3-yl]oxymethyl]-3-methyl-phenyl]-4-methyl-tetrazol-5-one+TX, 1-methyl-4-[3-methyl-2-[[2-methyl-4-(3,4,5-trimethylpyrazol-1-yl)phenoxy]methyl]phenyl]tetrazol-5-one+TX, aminopyrifen+TX, ametoctradin+TX, amisulbrom+TX, penflufen+TX, (Z,2E)-5-[1-(4-chlorophenyl)pyrazol-3-yl]oxy-2-methoxyimino-N,3-dimethyl-pent-3-enamide+TX, florylpicoxamid+TX, fenpicoxamid+TX, tebufloquin+TX, ipflufenoquin+TX, quinofumelin+TX, isofetamid+TX, N-[2-[2,4-dichloro-phenoxy]phenyl]-3-(difluoromethyl)-1-methyl-pyrazole-4-carboxamide TX, N-[2-[2-chloro-4-(trifluoromethyl)phenoxy]phenyl]-3-(difluoromethyl)-1-methyl-pyrazole-4-carboxamide TX, benzothiostrobin+TX, phenamacril+TX, 5-amino-1,3,4-thiadiazole-2-thiol zinc salt (2:1)+TX, fluopyram+TX, flutianil+TX, fluopimomide+TX, pyrapropoyne+TX, picarbutrazox+TX, 2-(difluoromethyl)-N-(3-ethyl-1,1-dimethyl-indan-4-yl)pyridine-3-carboxamide+TX, 2-(difluoromethyl)-N-((3R)-1,1,3-trimethylindan-4-yl)pyridine-3-carboxamide+TX, 4-[[6-[2-(2,4-difluorophenyl)-1,1-difluoro-2-hydroxy-3-(1,2,4-triazol-1-yl)propyl]-3-pyridyl]oxy]benzonitrile+TX, metyltetraprole+TX, 2-(difluoromethyl)-N-((3R)-1,1,3-trimethylindan-4-yl) pyridine-3-carboxamide+TX, α-(1,1-dimethylethyl)-α-[4''-(trifluoromethoxy) [1, 1''-biphenyl]-4-yl]-5-pyrimidinemethanol+TX, fluoxapiprolin+TX, enoxastrobin+TX, 4-[[6-[2-(2,4-difluorophenyl)-1,1-difluoro-2-hydroxy-3-(1,2,4-triazol-1-yl)propyl]-3-pyridyl]oxy]benzonitrile+TX, 4-[[6-[2-(2,4-difluorophenyl)-1,1-difluoro-2-hydroxy-3-(5-sulfanyl-1,2,4-triazol-1-yl)propyl]-3-pyridyl]oxy] benzonitrile+TX, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile+TX, trinexapac+TX, coumoxystrobin+TX, zhongshengmycin+TX, thiodiazole copper+TX, zinc thiazole+TX, amectotractin+TX, iprodione+TX, N-octyl-N'-[2-(octylamino)ethyl]ethane-1,2-diamine+TX; N'-[5-bromo-2-methyl-6-[(1S)-1-methyl-2-propoxy-ethoxy]-3-pyridyl]-N-ethyl-N-methyl-formamidine+TX, N'-[5-bromo-2-methyl-6-[(1R)-1-methyl-2-propoxy-ethoxy]-3-pyridyl]-N-ethyl-N-methyl-formamidine+TX, N'-[5-bromo-2-methyl-6-(1-methyl-2-propoxy-ethoxy)-3-pyridyl]-N-ethyl-N-methyl-formamidine+TX, N'-[5-chloro-2-methyl-6-(1-methyl-2-propoxy-ethoxy)-3-pyridyl]-N-ethyl-N-methyl-formamidine+TX, N'-[5-bromo-2-methyl-6-(1-methyl-2-propoxy-ethoxy)-3-pyridyl]-N-isopropyl-N-methyl-formamidine+TX (these compounds may be prepared from the methods described in WO2015/155075); N'-[5-bromo-2-methyl-6-(2-propoxypropoxy)-3-pyridyl]-N-ethyl-N-methyl-formamidine+TX (this compound may be prepared from the methods described in IPCOM000249876D); N-isopropyl-N'-[5-methoxy-2-methyl-4-(2,2,2-trifluoro-1-hydroxy-1-phenyl-ethyl)phenyl]-N-methyl-formamidine+TX, N'-[4-(1-cyclopropyl-2,2,2-trifluoro-1-hydroxy-ethyl)-5-methoxy-2-methyl-phenyl]-N-isopropyl-N-methyl-formamidine+TX (these compounds may be prepared from the methods described in WO2018/228896); N-ethyl-N'-[5-methoxy-2-methyl-4-[2-trifluoromethyl)oxetan-2-yl]phenyl]-N-methyl-formamidine+TX, N-ethyl-N'-[5-methoxy-2-methyl-4-[2-trifuoromethyl)tetrahydrofuran-2-yl]phenyl]-N-methyl-formamidine+TX (these compounds may be prepared from the methods described in WO2019/110427);

N-[(1R)-1-benzyl-3-chloro-1-methyl-but-3-enyl]-8-fluoro-quinoline-3-carboxamide+TX, N-[(1S)-1-benzyl-3-chloro-1-methyl-but-3-enyl]-8-fluoro-quinoline-3-carboxamide+TX, N-[(1R)-1-benzyl-3,3,3-trifluoro-1-methyl-propyl]-8-fluoro-quinoline-3-carboxamide+TX, N-[(1S)-1-benzyl-3,3,3-trifluoro-1-methyl-propyl]-8-fluoro-quinoline-3-carboxamide+TX, N-[(1R)-1-benzyl-1,3-dimethyl-butyl]-7,8-difluoro-quinoline-3-carboxamide+TX, N-[(1S)-1-benzyl-1,3-dimethyl-butyl]-7,8-difluoro-quinoline-3-carboxamide+TX, 8-fluoro-N-[(1R)-1-[(3-fluorophenyl)methyl]-1,3-dimethyl-butyl]quinoline-3-carboxamide+TX, 8-fluoro-N-[(1S)-1-[(3-fluorophenyl)methyl]-1,3-dimethyl-butyl]quinoline-3-carboxamide+TX, N-[(1R)-1-benzyl-1,3-dimethyl-butyl]-8-fluoro-quinoline-3-carboxamide+TX, N-[(1S)-1-benzyl-1,3-dimethyl-butyl]-8-fluoro-quinoline-3-carboxamide+TX, N-((1R)-1-benzyl-3-chloro-1-methyl-but-3-enyl)-8-fluoro-quinoline-3-carboxamide+TX, N-((1S)-1-benzyl-3-chloro-1-methyl-but-3-enyl)-8-fluoro-quinoline-3-carboxamide+TX (these compounds may be prepared from the methods described in WO2017/153380);

1-(6,7-dimethylpyrazolo[1,5-a]pyridin-3-yl)-4,4,5-trifluoro-3,3-dimethyl-isoquinoline+TX, 1-(6,7-dimethylpyrazolo[1,5-a]pyridin-3-yl)-4,4,6-trifluoro-3,3-dimethyl-isoquinoline+TX, 4,4-difluoro-3,3-dimethyl-1-(6-methylpyrazolo[1,5-a]pyridin-3-yl)isoquinoline+TX, 4,4-difluoro-3,3-dimethyl-1-(7-methylpyrazolo[1,5-a]pyridin-3-yl)isoquinoline+TX, 1-(6-chloro-7-methyl-pyrazolo[1,5-a]pyridin-3-yl)-4,4-difluoro-3,3-dimethyl-isoquinoline+TX (these compounds may be prepared from the methods described in WO2017/025510); 1-(4,5-dimethylbenzimidazol-1-yl)-4,4,5-trifluoro-3,3-dimethyl-isoquinoline+TX, 1-(4,5-dimethylbenzimidazol-1-yl)-4,4-difluoro-3,3-dimethyl-isoquinoline+TX, 6-chloro-4,4-difluoro-3,3-dimethyl-1-(4-methylbenzimidazol-1-yl)isoquinoline+TX, 4,4-difluoro-1-(5-fluoro-4-methyl-benzimidazol-1-yl)-3,3-dimethyl-isoquinoline+TX, 3-(4,4-difluoro-3,3-dimethyl isoquinolyl)-7,8-dihydro-6H-cyclopenta[e]benzimidazole+TX (these compounds may be prepared from the methods described in WO2016/156085); [(1S,2S)-1-methyl-2-(o-tolyl)propyl] (2S)-2-[(3-hydroxy methoxy-pyridine-2-carbonyl)amino]propanoate+TX, [(1S,2S)-1-methyl-2-(o-tolyl)propyl] (2S)-2-[(3-acetoxy-4-methoxy-pyridine-2-carbonyl)amino]propanoate+TX, [(1S,2S)-1-methyl-2-(o-tolyl)propyl] (2S)-2-[(4-methoxy-3-propanoyloxy-pyridine-2-carbonyl)amino]propanoate+TX, [(1S,2S)-2-(4-fluoro-2-methyl-phenyl)-1,3-dimethyl-butyl] (2S)-2-[(3-hydroxy-4-methoxy-pyridine carbonyl)amino]propanoate+TX, [(1S,2S)-2-(4-fluoro-2-methyl-phenyl)-1,3-dimethyl-butyl] (2S)-2-[(3-acetoxy-4-methoxy-pyridine-2-carbonyl)amino] propanoate+TX, [(1S,2S)-2-(4-fluoro-2-methyl-phenyl)-1,3-dimethyl-butyl] (2S)-2-[(4-methoxy-3-propanoyloxy-pyridine-2-carbonyl)amino]propanoate+TX, N-methoxy-N-[[4-[5-(trifluoromethyl)-1,2,4-oxadiazol-3-yl]phenyl]methyl]cyclopropanecarboxamide+TX, N,2-dimethoxy-N-[[4-[5-(trifluoromethyl)-1,2,4-oxadiazol-3-yl]phenyl]methyl]propanamide+TX, N-ethyl-2-methyl-N-[[4-[5-(trifluoromethyl)-1,2,4-oxadiazol-3-yl]phenyl]methyl]propanamide+TX, 1-methoxy-3-methyl-1-[[4-[5-(trifluoromethyl)-1,2,4-oxadiazol-3-yl]phenyl]methyl]urea+TX, 1,3-dimethoxy-1-[[4-[5-(trifluoromethyl)-1,2,4-oxadiazol-3-yl]phenyl]methyl]urea+TX, 3-ethyl-1-methoxy-1-[[4-[5-(trifluoromethyl)-1,2,4-oxadiazol-3-yl]phenyl]methyl]urea+TX, N-[[4-[5-(trifluoromethyl)-1,2,4-oxadiazol-3-yl]phenyl]methyl]propanamide+TX, 4,4-dimethyl-2-[[4-[5-(trifluoromethyl)-1,2,4-oxadiazol-3-yl]phenyl]methyl]isoxazolidin-3-one+TX, 5,5-dimethyl-2-[[4-[5-(trifluoromethyl)-1,2,4-oxadiazol-3-yl]phenyl]methyl]isoxazolidin-3-one+TX, ethyl 1-[[4-[5-(trifluoromethyl)-1,2,4-oxadiazol-3-yl]phenyl]methyl]pyrazole-4-carboxylate+TX, N,N-dimethyl-1-[[4-[5-(trifluoromethyl)-1,2,4-oxadiazol-3-yl]phenyl]methyl]-1,2,4-triazol-3-amine+TX. The compounds in this paragraph may be prepared from the methods described in WO 2017/055473, WO 2017/055469, WO 2017/093348 and WO 2017/118689; 2-[6-(4-chlorophenoxy)-2-(trifluoromethyl)-3-pyridyl]-1-(1,2,4-triazol-1-yl)propan-2-ol+TX (this compound may be prepared from the methods described in WO 2017/029179); 2-[6-(4-bromophenoxy)-2-(trifluoromethyl)-3-pyridyl]-1-(1,2,4-triazol-1-yl)propan-2-ol+TX (this compound may be prepared from the methods described in WO 2017/029179); 3-[2-(1-chlorocyclopropyl)-3-(2-fluorophenyl)-2-hydroxy-propyl]imidazole-4-carbonitrile+TX (this compound may be prepared from the methods described in WO 2016/156290); 3-[2-(1-chlorocyclopropyl)-3-(3-chloro-2-fluoro-phenyl)-2-hydroxy-propyl]imidazole-4-carbonitrile+TX (this compound may be prepared from the methods described in WO 2016/156290); (4-phenoxyphenyl)methyl 2-amino-6-methyl-pyridine-3-carboxylate+TX (this compound may be prepared from the methods described in WO 2014/006945); 2,6-Dimethyl-1H,5H-[1,4]dithiino[2,3-c:5,6-c']dipyrrole-1,3,5,7(2H,6H)-tetrone+TX (this compound may be prepared from the methods described in WO 2011/138281); N-methyl-4-[5-(trifluoromethyl)-1,2,4-oxadiazol-3-yl]benzenecarbothioamide+TX; N-methyl-4-[5-(trifluoromethyl)-1,2,4-oxadiazol-3-yl]benzamide+TX; (Z,2E)-5-[1-(2,4-dichlorophenyl)pyrazol-3-yl]oxy-2-methoxyimino-N,3-dimethyl-pent-3-enamide+TX (this compound may be prepared from the methods described in WO 2018/153707); N'-(2-chloro-5-methyl-4-phenoxy-phenyl)-N-ethyl-N-methyl-formamidine+TX; N'-[2-chloro-4-(2-fluorophenoxy)-5-methyl-phenyl]-N-ethyl-N-methyl-formamidine+TX (this compound may be prepared from the methods described in WO 2016/202742); 2-(difluoromethyl)-N-[(3S)-3-ethyl-1,1-dimethyl-indan-4-yl]pyridine carboxamide+TX (this compound may be prepared from the methods described in WO 2014/095675); (5-methyl-2-pyridyl)-[4-[5-(trifluoromethyl)-1,2,4-oxadiazol-3-yl]phenyl]methanone+TX, (3-methylisoxazol-5-yl)-[4-[5-(trifluoromethyl)-1,2,4-oxadiazol-3-yl]phenyl]methanone+TX (these compounds may be prepared from the methods described in WO 2017/220485); 2-oxo-N-propyl-2-[4-[5-(trifluoromethyl)-1,2,4-oxadiazol-3-yl]phenyl]acetamide+TX (this compound may be prepared from the methods described in WO 2018/065414); ethyl 1-[[5-[5-(trifluoromethyl)-1,2,4-oxadiazol-3-yl] thienyl]methyl]pyrazole-4-carboxylate+TX (this compound may be prepared from the methods described in WO 2018/158365); 2,2-difluoro-N-methyl-2-[4-[5-(trifluoromethyl)-1,2,4-oxadiazol-3-yl]phenyl]acetamide+TX, N-[(E)-methoxyiminomethyl]-4-[5-(trifluoromethyl)-1,2,4-oxadiazol-3-yl]benzamide+TX, N—[(Z)-methoxyiminomethyl]-4-[5-(trifluoromethyl)-1,2,4-oxadiazol-3-yl]benzamide+TX, N—[N-methoxy-C-methyl-carbonimidoyl]-4-[5-(trifluoromethyl)-1,2,4-oxadiazol-3-yl]benzamide+TX (these compounds may be prepared from the methods described in WO 2018/202428), a biostimulant comprising organic carbon, nutrients and amino acids (Quantis™)+TX.

The references in brackets behind the active ingredients, e.g. [3878-19-1] refer to the Chemical Abstracts Registry number. The above described mixing partners are known. Where the active ingredients are included in "The Pesticide Manual" [The Pesticide Manual—A World Compendium; Thirteenth Edition; Editor: C. D. S. TomLin; The British Crop Protection Council], they are described therein under the entry number given in round brackets hereinabove for the particular compound; for example, the compound "abamectin" is described under entry number (1). Where "[CCN]" is added hereinabove to the particular compound, the compound in question is included in the "*Compendium of Pesticide Common Names*", which is accessible on the internet [A. Wood; *Compendium of Pesticide Common Names*, Copyright © 1995-2004]; for example, the compound "acetoprole" is described under the internet address http://www.alanwood.net/pesticides/acetoprole.html Most of the active ingredients described above are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "development code" is used or, if neither one of those designations nor a "common name" is used, an "alternative name" is employed. "CAS Reg. No" means the Chemical Abstracts Registry Number.

In the "reference" mixture compositions the mixtures of compounds of formula (I) (selected from Table X (above)) with active ingredients described above comprise a compound selected from Table X (above) and an active ingredient as described above preferably in a mixing ratio of from 100:1 to 1:100, especially from 50:1 to 1:50, more especially in a ratio of from 20:1 to 1:20, even more especially from 10:1 to 1:10, yet even more especially from 7.5:1 to 1:7.5, very especially from 5:1 and 1:5, special preference being given to a ratio of from 2:1 to 1:2, and a ratio of from 4:1 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are by weight.

The mixture compositions as described above (both according to the invention and the "reference" mixture compositions) can be used in a method for controlling pests, which comprises applying a composition comprising a mixture as described above to the pests or their environment.

The mixtures comprising a compound of formula (I) selected from Table X (above) and one or more active ingredients as described above can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compounds of formula (I) selected from Table X (above) and the active ingredients as described above is not essential for working the present invention.

The compositions of the present invention may also be used in crop enhancement. According to the present invention, 'crop enhancement' means an improvement in plant vigour, an improvement in plant quality, improved tolerance to stress factors, and/or improved input use efficiency.

According to the present invention, an 'improvement in plant vigour' means that certain traits are improved qualitatively or quantitatively when compared with the same trait in a control plant which has been grown under the same conditions in the absence of the method of the invention. Such traits include, but are not limited to, early and/or improved germination, improved emergence, the ability to use less seeds, increased root growth, a more developed root system, increased root nodulation, increased shoot growth, increased tillering, stronger tillers, more productive tillers, increased or improved plant stand, less plant verse (lodging), an increase and/or improvement in plant height, an increase in plant weight (fresh or dry), bigger leaf blades, greener leaf colour, increased pigment content, increased photosynthetic activity, earlier flowering, longer panicles, early grain maturity, increased seed, fruit or pod size, increased pod or ear number, increased seed number per pod or ear, increased seed mass, enhanced seed filling, less dead basal leaves, delay of senescence, improved vitality of the plant, increased levels of amino acids in storage tissues and/or less inputs needed (e.g. less fertiliser, water and/or labour needed). A plant with improved vigour may have an increase in any of the aforementioned traits or any combination or two or more of the aforementioned traits.

According to the present invention, an 'improvement in plant quality' means that certain traits are improved qualitatively or quantitatively when compared with the same trait in a control plant which has been grown under the same conditions in the absence of the method of the invention. Such traits include, but are not limited to, improved visual appearance of the plant, reduced ethylene (reduced production and/or inhibition of reception), improved quality of harvested material, e.g. seeds, fruits, leaves, vegetables (such improved quality may manifest as improved visual appearance of the harvested material), improved carbohydrate content (e.g. increased quantities of sugar and/or starch, improved sugar acid ratio, reduction of reducing sugars, increased rate of development of sugar), improved protein content, improved oil content and composition, improved nutritional value, reduction in anti-nutritional compounds, improved organoleptic properties (e.g. improved taste) and/or improved consumer health benefits (e.g. increased levels of vitamins and anti-oxidants)), improved post-harvest characteristics (e.g. enhanced shelf-life and/or storage stability, easier processability, easier extraction of compounds), more homogenous crop development (e.g. synchronised germination, flowering and/or fruiting of plants), and/or improved seed quality (e.g. for use in following seasons). A plant with improved quality may have an increase in any of the aforementioned traits or any combination or two or more of the aforementioned traits.

According to the present invention, an 'improved tolerance to stress factors' means that certain traits are improved qualitatively or quantitatively when compared with the same trait in a control plant which has been grown under the same conditions in the absence of the method of the invention. Such traits include, but are not limited to, an increased tolerance and/or resistance to abiotic stress factors which cause sub-optimal growing conditions such as drought (e.g. any stress which leads to a lack of water content in plants, a lack of water uptake potential or a reduction in the water supply to plants), cold exposure, heat exposure, osmotic stress, UV stress, flooding, increased salinity (e.g. in the soil), increased mineral exposure, ozone exposure, high light exposure and/or limited availability of nutrients (e.g. nitrogen and/or phosphorus nutrients). A plant with improved tolerance to stress factors may have an increase in any of the aforementioned traits or any combination or two or more of the aforementioned traits. In the case of drought and nutrient stress, such improved tolerances may be due to, for example, more efficient uptake, use or retention of water and nutrients.

According to the present invention, an 'improved input use efficiency' means that the plants are able to grow more effectively using given levels of inputs compared to the grown of control plants which are grown under the same conditions in the absence of the method of the invention. In particular, the inputs include, but are not limited to fertiliser (such as nitrogen, phosphorous, potassium, micronutrients), light and water. A plant with improved input use efficiency may have an improved use of any of the aforementioned inputs or any combination of two or more of the aforementioned inputs.

Other crop enhancements of the present invention include a decrease in plant height, or reduction in tillering, which are beneficial features in crops or conditions where it is desirable to have less biomass and fewer tillers.

Any or all of the above crop enhancements may lead to an improved yield by improving e.g. plant physiology, plant growth and development and/or plant architecture. In the context of the present invention 'yield' includes, but is not limited to, (i) an increase in biomass production, grain yield, starch content, oil content and/or protein content, which may result from (a) an increase in the amount produced by the plant per se or (b) an improved ability to harvest plant matter, (ii) an improvement in the composition of the harvested material (e.g. improved sugar acid ratios, improved oil composition, increased nutritional value, reduction of anti-nutritional compounds, increased consumer health benefits) and/or (iii) an increased/facilitated ability to harvest the crop, improved processability of the crop and/or better storage stability/shelf life. Increased yield of an agricultural plant means that, where it is possible to take a quantitative measurement, the yield of a product of the respective plant is increased by a measurable amount over the yield of the same product of the plant produced under the same conditions, but without application of the present invention. According to the present invention, it is preferred that the yield be increased by at least 0.5%, more preferred at least 1%, even more preferred at least 2%, still more preferred at least 4%, preferably 5% or even more.

Any or all of the above crop enhancements may also lead to an improved utilisation of land, i.e. land which was previously unavailable or sub-optimal for cultivation may become available. For example, plants which show an increased ability to survive in drought conditions, may be able to be cultivated in areas of sub-optimal rainfall, e.g. perhaps on the fringe of a desert or even the desert itself.

In one aspect of the present invention, crop enhancements are made in the substantial absence of pressure from pests and/or diseases and/or abiotic stress. In a further aspect of the present invention, improvements in plant vigour, stress tolerance, quality and/or yield are made in the substantial absence of pressure from pests and/or diseases. For example pests and/or diseases may be controlled by a pesticidal treatment that is applied prior to, or at the same time as, the method of the present invention. In a still further aspect of the present invention, improvements in plant vigour, stress tolerance, quality and/or yield are made in the absence of pest and/or disease pressure. In a further embodiment, improvements in plant vigour, quality and/or yield are made in the absence, or substantial absence, of abiotic stress.

The compositions of the present invention may also be used in the field of protecting storage goods against attack of fungi. According to the present invention, the term "storage goods" is understood to denote natural substances of vegetable and/or animal origin and their processed forms, which have been taken from the natural life cycle and for which long-term protection is desired. Storage goods of vegetable origin, such as plants or parts thereof, for example stalks, leafs, tubers, seeds, fruits or grains, can be protected in the freshly harvested state or in processed form, such as pre-dried, moistened, comminuted, ground, pressed or roasted. Also falling under the definition of storage goods is timber, whether in the form of crude timber, such as construction timber, electricity pylons and barriers, or in the form of finished articles, such as furniture or objects made from wood. Storage goods of animal origin are hides, leather, furs, hairs and the like. The composition according the present invention can prevent disadvantageous effects such as decay, discoloration or mold. Preferably "storage goods" is understood to denote natural substances of vegetable origin and/or their processed forms, more preferably fruits and their processed forms, such as pomes, stone fruits, soft fruits and citrus fruits and their processed forms. In another preferred embodiment of the invention "storage goods" is understood to denote wood.

Therefore a further aspect of the present invention is a method of protecting storage goods, which comprises applying to the storage goods a composition according to the invention.

The composition of the present invention may also be used in the field of protecting technical material against attack of fungi. According to the present invention, the term "technical material" includes paper; carpets; constructions; cooling and heating systems; wall-boards; ventilation and air conditioning systems and the like; preferably "technical material" is understood to denote wall-boards. The composition according the present invention can prevent disadvantageous effects such as decay, discoloration or mold.

The composition according to the invention is generally formulated in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the formulations according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood N.J. (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The formulations according to the invention can include an additive comprising an oil of vegetable or animal origin, a mineral oil, alkyl esters of such oils or mixtures of such oils and oil derivatives. The amount of oil additive in the formulation according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The formulations generally comprise from 0.1 to 99% by weight, especially from 0.1 to 95% by weight, of compounds of component (A) and component (B) and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Certain mixture compositions comprising a compound of formula (I) described above may show a synergistic effect. This occurs whenever the action of an active ingredient combination is greater than the sum of the actions of the individual components. The action to be expected E for a given active ingredient combination obeys the so-called COLBY formula and can be calculated as follows (COLBY, S. R. "Calculating synergistic and antagonistic responses of herbicide combination". Weeds, Vol. 15, pages 20-22; 1967):

ppm=milligrams of active ingredient (=a.i.) per liter of spray mixture

X=% action by active ingredient A) using p ppm of active ingredient

Y=% action by active ingredient B) using q ppm of active ingredient.

According to COLBY, the expected (additive) action of active ingredients A)+B) using p+q ppm of active ingredient is:

$$E = X + Y - \frac{X \cdot Y}{100}.$$

If the action actually observed (O) is greater than the expected action (E), then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

However, besides the actual synergistic action with respect to fungicidal activity, the composition according to the invention may also have further surprising advantageous properties. Examples of such advantageous properties that may be mentioned are: more advantageous degradability; improved toxicological and/or ecotoxicological behaviour; or improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigor, and early germination.

The composition according to the invention can be applied to the phytopathogenic microorganisms, the useful plants, the locus thereof, the propagation material thereof, storage goods or technical materials threatened by microorganism attack.

The composition according to the invention may be applied before or after infection of the useful plants, the propagation material thereof, storage goods or technical materials by the microorganisms.

The amount of a composition according to the invention to be applied, will depend on various factors, such as the compounds employed; the subject of the treatment, such as, for example plants, soil or seeds; the type of treatment, such as, for example spraying, dusting or seed dressing; the purpose of the treatment, such as, for example prophylactic or therapeutic; the type of fungi to be controlled or the application time.

When applied to the useful plants component (A) is typically applied at a rate of 5 to 2000 g a.i./ha, particularly 10 to 1000 g a.i./ha, e.g. 50, 75, 100 or 200 g a.i./ha, typically in association with 1 to 5000 g a.i./ha, particularly 2 to 2000 g a.i./ha, e.g. 100, 250, 500, 800, 1000, 1500 g a.i./ha of component (B).

In agricultural practice the application rates of the composition according to the invention depend on the type of effect desired, and typically range from 20 to 4000 g of total composition per hectare.

When the composition according to the invention is used for treating seed, rates of 0.001 to 50 g of a compound of component (A) per kg of seed, preferably from 0.01 to 10 g per kg of seed, and 0.001 to 50 g of a compound of component (B), per kg of seed, preferably from 0.01 to 10 g per kg of seed, are generally sufficient.

For the avoidance of doubt, where a literary reference, patent application, or patent, is cited within the text of this application, the entire text of said citation is herein incorporated by reference.

EXAMPLES

The Examples which follow serve to illustrate the invention.

The compounds (and compositions) of the invention may be distinguished from known compounds (and compositions) by virtue of greater efficacy at low application rates, which can be verified by the person skilled in the art using the experimental procedures outlined in the Examples, using lower application rates if necessary, for example 50 ppm, 12.5 ppm, 6 ppm, 3 ppm, 1.5 ppm or 0.2 ppm of active ingredient(s).

Throughout this description, temperatures are given in degrees Celsius and "m.p." means melting point. LC/MS means Liquid Chromatography Mass Spectroscopy and the description of the apparatus and the methods is as follows:

Method G:

Spectra were recorded on a Mass Spectrometer from Waters (SQD, SQDII Single quadrupole mass spectrometer) equipped with an electrospray source (Polarity: positive and negative ions), Capillary: 3.00 kV, Cone range: 30 V, Extractor: 2.00 V, Source Temperature: 150° C., Desolvation Temperature: 350° C., Cone Gas Flow: 50 l/h, Desolvation Gas Flow: 650 L/h, Mass range: 100 to 900 Da) and an Acquity UPLC from Waters: Binary pump, heated column compartment, diode-array detector and ELSD detector. Column: Waters UPLC HSS T3, 1.8 μm, 30×2.1 mm, Temp: 60° C., DAD Wavelength range (nm): 210 to 500, Solvent Gradient: A=water+5% MeOH+0.05% HCOOH, B=Acetonitrile+0.05% HCOOH, gradient: 10-100% B in 1.2 min; Flow (mL/min) 0.85

Method H:

Spectra were recorded on a Mass Spectrometer from Waters (SQD, SQDII Single quadrupole mass spectrometer) equipped with an electrospray source (Polarity: positive and negative ions), Capillary: 3.00 kV, Cone range: 30V, Extractor: 2.00 V, Source Temperature: 150° C., Desolvation Temperature: 350° C., Cone Gas Flow: 50 L/h, Desolvation Gas Flow: 650 L/h, Mass range: 100 to 900 Da) and an Acquity UPLC from Waters: Binary pump, heated column compartment, diode-array detector and ELSD detector. Column: Waters UPLC HSS T3, 1.8 μm, 30×2.1 mm, Temp: 60° C., DAD Wavelength range (nm): 210 to 500, Solvent Gradient: A=water+5% MeOH+0.05% HCOOH, B=Acetonitrile+0.05% HCOOH, gradient: 10-100% B in 2.7 min; Flow (mL/min) 0.85

Where necessary, enantiomerically pure final compounds may be obtained from racemic materials as appropriate via standard physical separation techniques, such as reverse phase chiral chromatography, or through stereoselective synthetic techniques, e.g., by using chiral starting materials.

FORMULATION EXAMPLES

| Wettable powders | a) | b) | c) |
|---|---|---|---|
| active ingredients [components (A) and (B)] | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |

-continued

| Wettable powders | a) | b) | c) |
|---|---|---|---|
| phenol polyethylene glycol ether (7-8 mol of ethylene oxide) | — | 2% | — |
| highly dispersed silicic acid | 5% | 10% | 10% |
| Kaolin | 62% | 27% | — |

The active ingredient is thoroughly mixed with the adjuvants and the mixture is thoroughly ground in a suitable mill, affording wettable powders that can be diluted with water to give suspensions of the desired concentration.

| Powders for dry seed treatment | a) | b) | C) |
|---|---|---|---|
| active ingredients [components (A) and (B)] | 25% | 50% | 75% |
| light mineral oil | 5% | 5% | 5% |
| highly dispersed silicic acid | 5% | 5% | — |
| Kaolin | 65% | 40% | — |
| Talcum | — | — | 20% |

The active ingredient is thoroughly mixed with the adjuvants and the mixture is thoroughly ground in a suitable mill, affording powders that can be used directly for seed treatment.

| Emulsifiable concentrate | |
|---|---|
| active ingredients [components (A) and (B)] | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | C) |
|---|---|---|---|
| active ingredients [components (A) and (B)] | 5% | 6% | 4% |
| talcum | 95% | — | — |
| Kaolin | — | 94% | — |
| mineral filler | — | — | 96% |

Ready-for-use dusts are obtained by mixing the active ingredient with the carrier and grinding the mixture in a suitable mill. Such powders can also be used for dry dressings for seed.

| Extruder granules | |
|---|---|
| active ingredients [components (A) and (B)] | 15% |
| sodium lignosulfonate | 2% |
| carboxymethylcellulose | 1% |
| Kaolin | 82% |

The active ingredient is mixed and ground with the adjuvants, and the mixture is moistened with water. The mixture is extruded and then dried in a stream of air.

| Coated granules | |
|---|---|
| active ingredients [components (A) and (B)] | 8% |
| polyethylene glycol (mol. wt. 200) | 3% |
| Kaolin | 89% |

The finely ground active ingredient is uniformly applied, in a mixer, to the kaolin moistened with polyethylene glycol. Non-dusty coated granules are obtained in this manner.

| Suspension concentrate | |
|---|---|
| active ingredients [components (A) and (B)] | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground active ingredient is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| Flowable concentrate for seed treatment | |
|---|---|
| active ingredients [components (A) and (B)] | 40% |
| propylene glycol | 5% |
| copolymer butanol PO/EO | 2% |
| tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground active ingredient is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of a combination of the active ingredients [components (A) and (B)] is mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

List of Abbreviations

Aq.=aqueous
br s=broad singlet
° C.=degrees Celsius
DCM=dichloromethane
dd=doublet of doublet
DMF=dimethylformamide
DMSO=dimethyl sulfoxide
DMSO-$d_6$=deuterated dimethyl sulfoxide
d=doublet
EtOAc=ethyl acetate
equiv.=equivalent
h=hour(s)
M=molar
m=mulitplet
min=minutes
MHz=mega hertz
mp=melting point
$Pd_2(dba)_3$=tris(dibenzylideneacetone)dipalladium(0)
Pd(dppf)$Cl_2$·DCM=[1,1'-bis(diphenylphosphino)ferrocene]dichloropalladium(II), DCM complex
$Pd(PPh_3)_2Cl_2$=bis(triphenylphosphine) palladium (II) dichloride
ppm=parts per million
RT=room temperature
Rt=retention time
s=singlet
t=triplet
THF=tetrahydrofuran
LC/MS=Liquid Chromatography Mass Spectrometry (description of the apparatus and the methods used for LC/MS analysis are given above)
X-Phos Pd G2=chloro(2-dicyclohexylphosphino-2',4',6'-triisopropyl-1,1'-biphenyl)[2-(2'-amino-1,1'-biphenyl)] palladium(II)

PREPARATION EXAMPLES

Example 1: This example illustrates the preparation of methyl (Z)-2-(5-cyclohexyl-2-methyl-phenoxy)-3-methoxy-prop-2-enoate (compound X.04)

Step 1: Preparation of methyl 2-(5-bromo-2-methyl-phenoxy)acetate

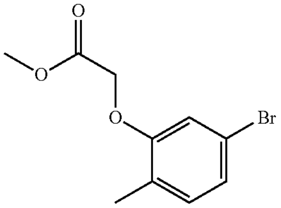

To a solution of 5-bromo-2-methylphenol (53.47 mmol, 10.00 g) and methyl 2-bromoacetate (1.5 equiv., 80.20 mmol, 12.27 g, 7.44 mL) in tetrahydrofuran (0.5 mol/L, 106.9 mL) at room temperature was added potassium carbonate (2 equiv., 106.9 mmol, 14.78 g), and the light brown suspension was heated to 65° C. for 2 h and then allowed to cool down to room temperature overnight. The reaction mixture was diluted with EtOAc and washed with water. The aqueous phase was extracted with EtOAc, and the total combined organic layer was washed with water, brine, dried with $Na_2SO_4$, filtered and concentrated in vacuo to give methyl 2-(5-bromo-2-methyl-phenoxy)acetate (47.22 mmol, 15.89 g, 88% yield) as a brown liquid. The crude oil was slightly contaminated with residual methyl-2-bromoacetate, but was taken directly to the next step without further purification.

LCMS (Method H), Rt=1.59 min, MS: (M+1)=259, 261; $^1$H NMR (400 MHz, $CDCl_3$) δ ppm 2.25 (s, 3H) 3.84 (s, 3H) 4.66 (s, 2H) 6.84 (d, 1H) 7.05 (m, 2H)

Step 2: Preparation of methyl (Z)-2-(5-bromo-2-methyl-phenoxy)-3-methoxy-prop-2-enoate

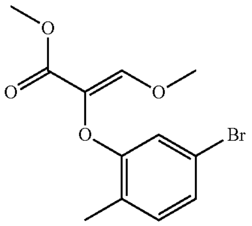 [SMILES: CO/C=C(\Oc1cc(Br)ccc1C)C(=O)OC]

Part 1: To a solution of 2-(5-bromo-2-methyl-phenoxy) acetate (20.8 g, 80.3 mmol) and methyl formate (6.0 equiv., 482 mmol, 29.5 g, 30.5 mL) in tetrahydrofuran (0.5 mol/L, 161 mL) at room temperature under argon was added sodium methoxide (20 equiv., 161 mmol, 9.13 g) portion-wise. The reaction was slightly exothermic and was kept below 30° C. with the assistance of a room temperature water bath. The reaction mixture was stirred at room temperature for 1 h and quenched by the slow addition of an aqueous saturated solution of $NaHCO_3$. The two phases were separated and the aqueous phase was extracted with EtOAc. The total combined organic layer was washed with aqueous saturated solution of $NaHCO_3$, brine, dried with $Na_2SO_4$, filtered and concentrated in vacuo to give methyl-2-(5-bromo-2-methyl-phenoxy)-3-hydroxy-prop-2-enoate, which was taken directly to the next step without further purification.

LCMS (Method G), Rt=0.80 and 0.90 min, MS: (M+1)=287, 289

Part 2: To a solution of the crude methyl-2-(5-bromo-2-methyl-phenoxy)-3-hydroxy-prop-2-enoate and dimethyl sulfate (1.2 equiv., 93.2 mmol, 11.8 g, 8.8 mL) in DMF (0.5 mol/L, 155 mL) at room temperature under argon was added potassium carbonate (1.5 equiv., 117 mmol, 16.3 g), and the reaction mixture was stirred at room temperature for 2 h. The reaction mixture was quenched by the slow addition of water, and the mixture was extracted with EtOAc. The total combined organic layer was washed with aqueous saturated solution of $NaHCO_3$, brine, dried with $Na_2SO_4$, filtered and concentrated in vacuo. The residue was purified by flash chromatography (cyclohexane:EtOAc) to give methyl (Z)-2-(5-bromo-2-methyl-phenoxy)-3-methoxy-prop-2-enoate (59.6 mmol, 18.0 g, 75% yield) as an off-white solid. LCMS (Method G), Rt=1.02 min, MS: (M+1)=301, 303; $^1$H NMR (400 MHz, $CDCl^3$) δ ppm 2.31 (s, 3H) 3.74 (s, 3H) 3.91 (s, 3H) 6.86 (d, 1H) 7.05 (m, 2H) 7.35 (s, 1H)

Step 3: Preparation of methyl (Z)-2-[5-(cyclohexen-1-yl)-2-methyl-phenoxy]-3-methoxy-prop-2-enoate

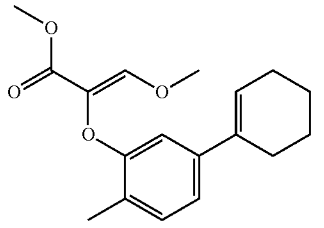 [SMILES: CO/C=C(\Oc1cc(C2=CCCCC2)ccc1C)C(=O)OC]

To a solution of methyl (Z)-2-(5-bromo-2-methyl-phenoxy)-3-methoxy-prop-2-enoate (203 mg, 0.67 mmol, 1.00 equiv.), in 1,4-dioxane (6 mL) and water (1 mL) was added cyclohexen-1-ylboronic acid (93.4 mg, 0.74 mmol, 1.10 equiv.), potassium phosphate (295 mg, 1.35 mmol, 2.00 equiv.) and X Phos Pd G2 (53.0 mg, 0.07 mmol, 0.10 equiv.). The reaction mixture was stirred at 100° C. for 15 min and the heating source was removed. After the contents reached RT, was diluted with EtOAc and a saturated aqueous $NaHCO_3$ solution then extracted with EtOAc. The total combined organic fraction was washed with and a saturated aqueous $NaHCO_3$ solution and brine, dried with $Na_2SO_4$, filtered, and concentrated in vacuo. The residue was purified by flash chromatography (cyclohexane:EtOAc) to give methyl (Z)-2-[5-(cyclohexen-1-yl)-2-methyl-phenoxy]-3-methoxy-prop-2-enoate as an amorphous solid.

LC-MS (Method G), Rt=1.17 min, MS: (M+H)=303; $^1H$ NMR (400 MHz, $CDCl_3$) δ ppm 7.36 (s, 1H), 7.11 (d, 1H), 6.96 (dd, 1H), 6.77 (d, 1H), 6.04 (m, 1H), 3.90 (s, 3H), 3.74 (s, 3H), 2.36 (m, 5H), 2.17-2.25 (m, 2H), 1.74-1.83 (m, 2H), 1.63-1.71 (m, 2H).

Step 4: Preparation of methyl (Z)-2-(5-cyclohexyl-2-methyl-phenoxy)-3-methoxy-prop-2-enoate (Compound X.04)

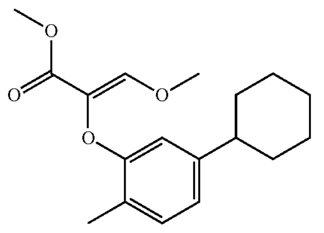 [SMILES: CO/C=C(\Oc1cc(C2CCCCC2)ccc1C)C(=O)OC]

To a solution of methyl (Z)-2-[5-(cyclohexen-1-yl)-2-methyl-phenoxy]-3-methoxy-prop-2-enoate (132 mg, 0.44 mmol, 1.00 equiv.), in hexane (0.87 mL) and EtOAc (2.18 mL) was added palladium on carbon (23.2 mg, 0.01 mmol, 0.02 equiv.). The reaction mixture was stirred under hydrogen atmosphere for 2 days. The reaction mixture was filtered over celite and concentrated in vacuo. The resultant crude residue was purified by flash chromatography (cyclohexane: EtOAc) to give methyl (Z)-2-(5-cyclohexyl-2-methyl-phenoxy)-3-methoxy-prop-2-enoate as a white solid (mp: 131-132° C.).

LC-MS (Method G), $R_t$=1.21 min, MS: (M+H)=305; $^1H$ NMR (400 MHz, $CDCl_3$) δ ppm ppm 7.35 (s, 1H), 7.10 (d, 1H), 6.79 (dd, 1H), 6.58 (d, 1H), 3.90 (s, 3H), 3.74 (s, 3H), 2.38-2.47 (m, 1H), 2.34 (s, 3H), 1.80-1.89 (m, 4H), 1.75 (br, 1H), 1.33-1.42 (m, 4H), 1.22-1.32 (m, 1H).

Example 2: This example illustrates the preparation of methyl (Z)-2-(5-cyclopentyl-2-methyl-phenoxy)-3-methoxy-prop-2-enoate (Compound X.02)

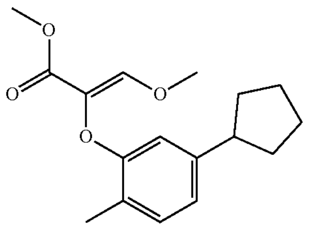 [SMILES: CO/C=C(\Oc1cc(C2CCCC2)ccc1C)C(=O)OC]

Under an argon atmosphere, a zinc chloride 1M THF solution (2.54 mmol) was added to a cyclopentyl magnesium bromide 2M THF solution (2.54 mmol) and the pale yellow suspension was stirred at RT for 10 min during time which a small exotherm was observed. After, a solution of methyl (Z)-2-(5-bromo-2-methyl-phenoxy)-3-methoxy-prop-2-enoate (0.153 g, 0.51 mmol) in tetrahydrofuran (2.5 mL) and $PdCl_2$(dppf) (0.19 g, 0.025 mmol) were added and the pale yellow suspension was heated at 50° C. for 3 hours. The reaction mixture was then allowed to reach RT, quenched with an aqueous saturated $NH_4Cl$ solution, and extracted with tert-butyl methylether. The total combined organic fraction was then washed with water and brine, dried over sodium sulfate, filtered, and concentrated under reduced pressure. The resultant crude residue was purified by flash chromatography (cyclohexane:EtOAc gradient) to give 0.106 mg the title compound as a white solid (mp 80-83° C.).

LC-MS (Method G), $R_1$=1.16 min, MS: (M+H)=291; $^1H$ NMR (400 MHz, $CDCl_3$) δ ppm: 7.35 (s, 1H), 7.09 (d, 1H), 6.82 (d, 1H), 6.60 (s, 1H), 3.90 (s, 3H), 3.72 (s, 3H), 2.91 (m, 1H), 2.32 (s, 3H), 2.10-1.97 (m, 2H), 1.85-1.75 (m, 2H), 1.74-1.65 (m, 2H), 1.60-1.45 (m, 2H).

Using the synthetic techniques described both above and below, compounds of formula (I) may be prepared accordingly.

Where necessary, enantiomerically pure final compounds may be obtained from racemic materials as appropriate via standard physical separation techniques, such as reverse phase chiral chromatography, or through stereoselective synthetic techniques, (e.g., by using chiral starting materials).

TABLE T1

Melting point (mp) data and/or retention times (Rt) for compounds X.01 to X.04 according to formula (I):

| Entry | Compound structure | Compound name | Rt (min) | Mass charge [M + H] | LCMS Method | mp (° C.) |
|---|---|---|---|---|---|---|
| X.01 | 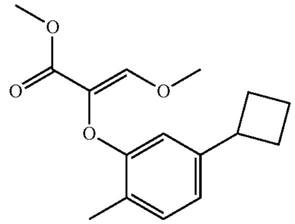 [SMILES: CO/C=C(\Oc1cc(C2CCC2)ccc1C)C(=O)OC] | methyl (Z)-2-(5-cyclobutyl-2-methyl-phenoxy)-3-methoxy-prop-2-enoate | 1.13 | 277 | G | |
| X.02 | 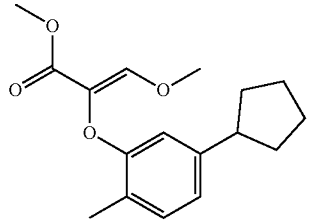 [SMILES: CO/C=C(\Oc1cc(C2CCCC2)ccc1C)C(=O)OC] | methyl (Z)-2-(5-cyclopentyl-2-methyl-phenoxy)-3-methoxy-prop-2-enoate | | | | 80-83 |
| X.03 | 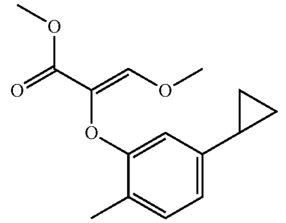 [SMILES: CO/C=C(\Oc1cc(C2CC2)ccc1C)C(=O)OC] | methyl (Z)-2-(5-cyclopropyl-2-methyl-phenoxy)-3-methoxy-prop-2-enoate | 1.04 | 263 | G | |
| X.04 | 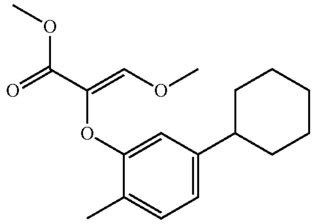 [SMILES: CO/C=C(\Oc1cc(C2CCCCC2)ccc1C)C(=O)OC] | methyl (Z)-2-(5-cyclohexyl-2-methyl-phenoxy)-3-methoxy-prop-2-enoate | | | | 131-132 |

BIOLOGICAL EXAMPLES

General Examples of Leaf Disk Tests in Well Plates:

Leaf disks or leaf segments of various plant species are cut from plants grown in a greenhouse. The cut leaf disks or segments are placed in multiwell plates (24-well format) onto water agar. The leaf disks are sprayed with a test solution before (preventative) or after (curative) inoculation. Compounds to be tested are prepared as DMSO solutions (max. 10 mg/mL) which are diluted to the appropriate concentration with 0.025% Tween20 just before spraying. The inoculated leaf disks or segments are incubated under defined conditions (temperature, relative humidity, light, etc.) according to the respective test system. A single evaluation of disease level is carried out 3 to 14 days after inoculation, depending on the pathosystem. Percent disease control relative to the untreated check leaf disks or segments is then calculated.

General Examples of Liquid Culture Tests in Well Plates:

Mycelia fragments or conidia suspensions of a fungus prepared either freshly from liquid cultures of the fungus or from cryogenic storage, are directly mixed into nutrient broth. DMSO solutions of the test compound (max. 10 mg/mL) are diluted with 0.025% Tween20 by a factor of 50 and 10 μl of this solution is pipetted into a microtiter plate (96-well format). The nutrient broth containing the fungal spores/mycelia fragments is then added to give an end concentration of the tested compound. The test plates are incubated in the dark at 24° C. and 96% relative humidity. The inhibition of fungal growth is determined photometrically after 2 to 7 days, depending on the pathosystem, and percent antifungal activity relative to the untreated check is calculated.

Example A1: Fungicidal Activity Against *Puccinia recondita* f. sp. *Tritici*/Wheat/Leaf Disc Preventative (Brown Rust)

Wheat leaf segments are placed on agar in multiwell plates (24-well format) and sprayed with test solutions. After drying, the leaf segments are inoculated with a spore suspension of the fungus. After appropriate incubation the activity of a compound is assessed 8 dpi (days after inoculation) as preventative fungicidal activity.

The following compounds gave at least 80% control of *Puccinia recondita* f. sp. *tritici* at 200 ppm when compared to untreated control under the same conditions, which showed extensive disease development:

Compounds (from Table T1): X.01, X.02. X.03, X.04

Example A2: Fungicidal Activity Against *Puccinia recondita* f. sp. *Tritici*/Wheat/Leaf Disc Curative (Brown Rust)

Wheat leaf segments are placed on agar in multiwell plates (24-well format). The leaf segments are inoculated with a spore suspension of the fungus and sprayed with test solutions 1 day after inoculation. After appropriate incubation the activity of a compound is assessed 8 dpi (days after inoculation) as curative fungicidal activity.

The following compounds gave at least 80% control of *Puccinia recondita* f. sp. *tritici* at 200 ppm when compared to untreated control under the same conditions, which showed extensive disease development:

Compounds (from Table T1): X.01, X.02, X.04

Example A3: Fungicidal Activity Against *Phakopsora pachyrhizi* Soybean/Leaf Disc Preventative (Asian Soybean Rust)

Soybean leaf disks are placed on agar in multiwell plates (24-well format) and sprayed with test solutions. After drying, the leaf disks are inoculated with a spore suspension of the fungus. After appropriate incubation the activity of a compound is assessed approx. 12 dpi (days after inoculation) as preventive fungicidal activity.

The following compounds gave at least 70% control of *Phakopsora pachyrhizi* at 60 ppm when compared to untreated control under the same conditions, which showed extensive disease development:

Compounds (from Table T1): X.01, X.02. X.03, X.04

Example A4: Fungicidal Activity Against *Glomerella lagenarium* (*Colletotrichum lagenarium*) Liquid Culture/Cucumber/Preventative (Anthracnose)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs at 620 nm. The following compounds gave at least 80% control of *Glomerella lagenarium* at 20 ppm when compared to untreated control under the same conditions, which showed extensive disease development:

Compounds (from Table T1): X.01, X.02. X.03, X.04

Comparative Data:

The biological activity of compounds X.02 and X.04 of the invention are compared to the reference compounds Z-1 and Z-2. Reference compounds Z-1 and Z-2 are specifically disclosed on page 16 of WO 98/03464 and page 6 of EP 0 212 859 respectively.

Example B: Comparative Biological Activity Against *Puccinia recondita* (Brown Rust), Curative Method; Wheat leaf segments are placed on agar in multiwell plates (24-well format). The leaf segments are inoculated with a spore suspension of the fungus and sprayed with test solutions 1 day after inoculation. After appropriate incubation the activity of a compound is assessed 8 dpi (days after inoculation) as curative fungicidal activity.

The data are presented as the percentage of disease control of each compound for the biological tests and testing rates described below in table B1.

TABLE B1

Biological activity against *Puccinia recondita* (Brown rust), curative:

| Compound | Compound structure | Concentration (PPm) | control (%) |
|---|---|---|---|
| Compound X.04 | 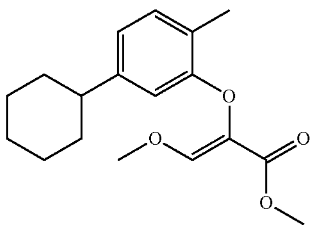 [SMILES: CO/C=C(\Oc1cc(C2CCCCC2)ccc1C)C(=O)OC] | 200<br>60<br>20 | 100<br>100<br>90 |
| Compound X.02 | 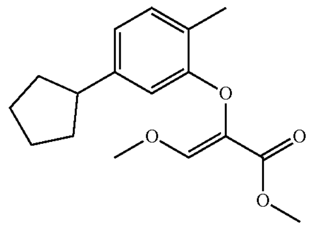 [SMILES: CO/C=C(\Oc1cc(C2CCCC2)ccc1C)C(=O)OC] | 200<br>60<br>20 | 100<br>0<br>0 |

TABLE B1-continued

| Biological activity against *Puccinia recondita* (Brown rust), curative: | | | |
|---|---|---|---|
| Compound | Compound structure | Concentration (PPm) | control (%) |
| Reference Compound Z-1 (WO 98/03464) | 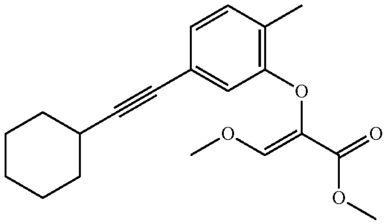 [SMILES: CO/C=C(\Oc1cc(C#CC2CCCCC2)ccc1C)C(=O)OC] | 200<br>60<br>20 | 0<br>0<br>0 |
| Reference Compound Z-2 (EP 0 212 859) | 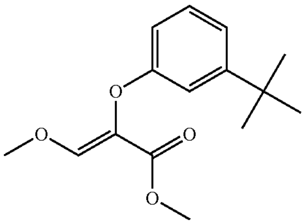 [SMILES: CO/C=C(\Oc1cccc(C(C)(C)C)c1)C(=O)OC] | 200<br>60<br>20 | 0<br>0<br>0 |

Further biological test examples relating to fungicidal compositions comprising a mixture of components (A) and (B) as active ingredients:

Example C1 Fungicidal Activity Against *Mycosphaerella arachidis* syn. *Cercospora arachidicola* (Brown Leaf Spot)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after approximately 5-6 days at 620 nm The following compound mixtures gave at least 80% control *Mycosphaerella arachidis* at rates cited in the table when compared to untreated control under the same conditions, which showed extensive disease development:

TABLE C1-1

| Fungicidal activity >80% (% of untreated) against *Mycosphaerella arachidis* | | | |
|---|---|---|---|
| Component A | Component B | Ratio A:B | Conc. (ppm) (A:B) |
| X.02 | glyphosate | 1:1 | 0.1 + 0.1 |
| X.02 | glyphosate | 1:3 | 0.1 + 0.3 |
| X.02 | chlorothalonil | 1:1 | 0.1 + 0.1 |
| X.02 | chlorothalonil | 1:3 | 0.1 + 0.3 |
| X.02 | chlorothalonil | 1:10 | 0.03 + 0.3 |
| X.02 | mancozeb | 1:1 | 0.1 + 0.1 |
| X.02 | mancozeb | 1:3 | 0.1 + 0.3 |
| X.02 | 2,4-D | 1:1 | 0.1 + 0.1 |
| X.02 | 2,4-D | 1:3 | 0.1 + 0.3 |
| X.02 | propiconazole | 1:1 | 0.1 + 0.1 |
| X.02 | propiconazole | 1:3 | 0.1 + 0.3 |
| X.02 | propiconazole | 3:10 | 0.03 + 0.1 |
| X.02 | propiconazole | 1:10 | 0.03 + 0.3 |
| X.02 | disodium phosphonate | 1:1 | 0.1 + 0.1 |
| X.02 | disodium phosphonate | 1:3 | 0.1 + 0.3 |
| X.02 | fenpropimorph | 1:1 | 0.1 + 0.1 |
| X.02 | fenpropimorph | 1:3 | 0.1 + 0.3 |
| X.02 | fenpropimorph | 3:10 | 0.03 + 0.1 |
| X.02 | fenpropimorph | 1:10 | 0.03 + 0.3 |
| X.02 | fenpropidin | 1:1 | 0.1 + 0.1 |
| X.02 | fenpropidin | 1:3 | 0.1 + 0.3 |
| X.02 | fenpropidin | 1:10 | 0.03 + 0.3 |
| X.02 | hexaconazole | 1:1 | 0.1 + 0.1 |
| X.02 | hexaconazole | 1:3 | 0.1 + 0.3 |
| X.02 | hexaconazole | 3:10 | 0.03 + 0.1 |
| X.02 | hexaconazole | 1:10 | 0.03 + 0.3 |
| X.02 | paclobutrazol | 1:1 | 0.1 + 0.1 |
| X.02 | paclobutrazol | 1:3 | 0.1 + 0.3 |
| X.02 | trinexapac-ethyl | 1:1 | 0.1 + 0.1 |

TABLE C1-1-continued

Fungicidal activity >80% (% of untreated) against *Mycosphaerella arachidis*

| Component A | Component B | Ratio A:B | Conc. (ppm) (A:B) |
|---|---|---|---|
| X.02 | trinexapac-ethyl | 1:3 | 0.1 + 0.3 |
| X.02 | flutriafol | 1:1 | 0.1 + 0.1 |
| X.02 | flutriafol | 1:3 | 0.1 + 0.3 |
| X.02 | difenoconazole | 1:1 | 0.1 + 0.1 |
| X.02 | difenoconazole | 1:3 | 0.1 + 0.3 |
| X.02 | difenoconazole | 3:10 | 0.03 + 0.1 |
| X.02 | difenoconazole | 1:10 | 0.03 + 0.3 |
| X.02 | cyproconazole | 1:1 | 0.1 + 0.1 |
| X.02 | cyproconazole | 1:3 | 0.1 + 0.3 |
| X.02 | cyproconazole | 1:10 | 0.03 + 0.3 |
| X.02 | acibenzolar S-methyl | 1:1 | 0.1 + 0.1 |
| X.02 | acibenzolar S-methyl | 1:3 | 0.1 + 0.3 |
| X.02 | trifloxystrobin | 1:1 | 0.1 + 0.1 |
| X.02 | trifloxystrobin | 1:3 | 0.1 + 0.3 |
| X.02 | trifloxystrobin | 3:10 | 0.03 + 0.1 |
| X.02 | trifloxystrobin | 1:10 | 0.03 + 0.3 |
| X.02 | folpet | 1:1 | 0.1 + 0.1 |
| X.02 | folpet | 1:3 | 0.1 + 0.3 |
| X.02 | azoxystrobin | 1:1 | 0.1 + 0.1 |
| X.02 | azoxystrobin | 1:3 | 0.1 + 0.3 |
| X.02 | azoxystrobin | 3:10 | 0.03 + 0.1 |
| X.02 | azoxystrobin | 1:10 | 0.03 + 0.3 |
| X.02 | pyraclostrobin | 1:1 | 0.1 + 0.1 |
| X.02 | pyraclostrobin | 1:3 | 0.1 + 0.3 |
| X.02 | pyraclostrobin | 3:10 | 0.03 + 0.1 |
| X.02 | pyraclostrobin | 1:10 | 0.03 + 0.3 |
| X.02 | picoxystrobin | 1:1 | 0.1 + 0.1 |
| X.02 | picoxystrobin | 1:3 | 0.1 + 0.3 |
| X.02 | picoxystrobin | 3:10 | 0.03 + 0.1 |
| X.02 | picoxystrobin | 1:10 | 0.03 + 0.3 |
| X.02 | sulphur | 1:1 | 0.1 + 0.1 |
| X.02 | sulphur | 1:3 | 0.1 + 0.3 |
| X.02 | tebuconazole | 1:1 | 0.1 + 0.1 |
| X.02 | tebuconazole | 1:3 | 0.1 + 0.3 |
| X.02 | tebuconazole | 1:10 | 0.03 + 0.3 |
| X.02 | prothioconazole | 1:1 | 0.1 + 0.1 |
| X.02 | prothioconazole | 1:3 | 0.1 + 0.3 |
| X.02 | prothioconazole | 3:10 | 0.03 + 0.1 |
| X.02 | prothioconazole | 1:10 | 0.03 + 0.3 |
| X.02 | fluopyram | 1:1 | 0.1 + 0.1 |
| X.02 | fluopyram | 1:3 | 0.1 + 0.3 |
| X.02 | fluopyram | 1:10 | 0.03 + 0.3 |
| X.02 | copper oxychloride | 1:1 | 0.1 + 0.1 |
| X.02 | copper oxychloride | 1:3 | 0.1 + 0.3 |
| X.02 | benzovindiflupyr | 1:1 | 0.1 + 0.1 |
| X.02 | benzovindiflupyr | 1:3 | 0.1 + 0.3 |
| X.02 | benzovindiflupyr | 3:10 | 0.03 + 0.1 |
| X.02 | benzovindiflupyr | 1:10 | 0.03 + 0.3 |
| X.02 | isopyrazam | 1:1 | 0.1 + 0.1 |
| X.02 | isopyrazam | 1:3 | 0.1 + 0.3 |
| X.02 | isopyrazam | 3:10 | 0.03 + 0.1 |
| X.02 | isopyrazam | 1:10 | 0.03 + 0.3 |
| X.02 | pydiflumetofen | 1:1 | 0.1 + 0.1 |
| X.02 | pydiflumetofen | 1:3 | 0.1 + 0.3 |
| X.02 | pydiflumetofen | 3:10 | 0.03 + 0.1 |
| X.02 | pydiflumetofen | 1:10 | 0.03 + 0.3 |
| X.02 | fluxapyroxad | 1:1 | 0.1 + 0.1 |
| X.02 | fluxapyroxad | 1:3 | 0.1 + 0.3 |
| X.02 | fluxapyroxad | 3:10 | 0.03 + 0.1 |
| X.02 | fluxapyroxad | 1:10 | 0.03 + 0.3 |
| X.02 | quinofumelin | 1:1 | 0.1 + 0.1 |
| X.02 | quinofumelin | 1:3 | 0.1 + 0.3 |
| X.02 | isoflucypram | 1:1 | 0.1 + 0.1 |
| X.02 | isoflucypram | 1:3 | 0.1 + 0.3 |
| X.02 | isoflucypram | 3:10 | 0.03 + 0.1 |
| X.02 | isoflucypram | 1:10 | 0.03 + 0.3 |
| X.02 | mefentrifluconazole | 1:1 | 0.1 + 0.1 |
| X.02 | mefentrifluconazole | 1:3 | 0.1 + 0.3 |
| X.02 | mefentrifluconazole | 3:10 | 0.03 + 0.1 |
| X.02 | mefentrifluconazole | 1:10 | 0.03 + 0.3 |
| X.02 | ipflufenoquin | 1:1 | 0.1 + 0.1 |
| X.02 | ipflufenoquin | 1:3 | 0.1 + 0.3 |
| X.02 | metyltetraprole | 1:1 | 0.1 + 0.1 |
| X.02 | metyltetraprole | 1:3 | 0.1 + 0.3 |

TABLE C1-1-continued

Fungicidal activity >80% (% of untreated) against *Mycosphaerella arachidis*

| Component A | Component B | Ratio A:B | Conc. (ppm) (A:B) |
|---|---|---|---|
| X.02 | metyltetraprole | 3:10 | 0.03 + 0.1 |
| X.02 | metyltetraprole | 1:10 | 0.03 + 0.3 |
| X.02 | aminopyrifen | 1:1 | 0.1 + 0.1 |
| X.02 | aminopyrifen | 1:3 | 0.1 + 0.3 |
| X.02 | aminopyrifen | 3:10 | 0.03 + 0.1 |
| X.02 | aminopyrifen | 1:10 | 0.03 + 0.3 |
| X.02 | florylpicoxamid | 1:1 | 0.1 + 0.1 |
| X.02 | florylpicoxamid | 1:3 | 0.1 + 0.3 |
| X.02 | florylpicoxamid | 3:10 | 0.03 + 0.1 |
| X.02 | florylpicoxamid | 1:10 | 0.03 + 0.3 |
| X.02 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.02 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.02 | 2-[6-(4-bromophenoxy)-2-(trifluoromethyl)-3-pyridyl]-1-(1,2,4-triazol-1-yl)propan-2-ol | 3:10 | 0.03 + 0.1 |
| X.02 | 2-[6-(4-bromophenoxy)-2-(trifluoromethyl)-3-pyridyl]-1-(1,2,4-triazol-1-yl)propan-2-ol | 1:10 | 0.03 + 0.3 |
| X.02 | fenpicoxamid | 1:1 | 0.1 + 0.1 |
| X.02 | fenpicoxamid | 1:3 | 0.1 + 0.3 |
| X.02 | fenpicoxamid | 3:10 | 0.03 + 0.1 |
| X.02 | fenpicoxamid | 1:10 | 0.03 + 0.3 |
| X.02 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.02 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.02 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.02 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |
| X.02 | [(1S,2S)-1-methyl-2-(o-tolyl)propyl] (2S)-2-[(4-methoxy-3-propanoyloxy-pyridine-2-carbonyl)amino]propanoate | 50:3 | 1 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:3 | 0.5 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:6 | 0.25 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:12 | 0.125 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:24 | 0.0625 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:48 | 0.03125 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 100:3 | 1 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:3 | 0.5 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:6 | 0.25 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:12 | 0.125 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:24 | 0.0625 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:48 | 0.03125 + 0.03 |
| X.02 | N-(2-fluorophenyl)-4-[5-(trifluoromethyl)-1,2,4-oxadiazol-3-yl]benzamide | 1:20 | 1 + 20 |
| X.02 | N-(2-fluorophenyl)-4-[5-(trifluoromethyl)-1,2,4-oxadiazol-3-yl]benzamide | 1:40 | 0.5 + 20 |
| X.02 | N-(2-fluorophenyl)-4-[5-(trifluoromethyl)-1,2,4-oxadiazol-3-yl]benzamide | 1:80 | 0.25 + 20 |
| X.02 | N-(2-fluorophenyl)-4-[5-(trifluoromethyl)-1,2,4-oxadiazol-3-yl]benzamide | 1:160 | 0.125 + 20 |

TABLE C1-1-continued

Fungicidal activity >80% (% of untreated) against *Mycosphaerella arachidis*

| Component A | Component B | Ratio A:B | Conc. (ppm) (A:B) |
|---|---|---|---|
| X.02 | N-(2-fluorophenyl)-4-[5-(trifluoromethyl)-1,2,4-oxadiazol-3-yl]benzamide | 1:320 | 0.0625 + 20 |
| X.02 | N-(2-fluorophenyl)-4-[5-(trifluoromethyl)-1,2,4-oxadiazol-3-yl]benzamide | 1:10 | 1 + 10 |
| X.02 | N-(2-fluorophenyl)-4-[5-(trifluoromethyl)-1,2,4-oxadiazol-3-yl]benzamide | 1:20 | 0.5 + 10 |
| X.02 | N-(2-fluorophenyl)-4-[5-(trifluoromethyl)-1,2,4-oxadiazol-3-yl]benzamide | 1:40 | 0.25 + 10 |
| X.02 | N-(2-fluorophenyl)-4-[5-(trifluoromethyl)-1,2,4-oxadiazol-3-yl]benzamide | 1:80 | 0.125 + 10 |
| X.02 | N-(2-fluorophenyl)-4-[5-(trifluoromethyl)-1,2,4-oxadiazol-3-yl]benzamide | 1:160 | 0.0625 + 10 |
| X.02 | Florylpicoxamid | 50:1 | 1 + 0.02 |
| X.02 | Florylpicoxamid | 25:1 | 0.5 + 0.02 |
| X.02 | Florylpicoxamid | 25:2 | 0.25 + 0.02 |
| X.02 | Florylpicoxamid | 25:4 | 0.125 + 0.02 |
| X.02 | Florylpicoxamid | 25:8 | 0.0625 + 0.02 |
| X.02 | Florylpicoxamid | 25:16 | 0.03125 + 0.02 |
| X.02 | Florylpicoxamid | 100:1 | 1 + 0.01 |
| X.02 | Florylpicoxamid | 50:1 | 0.5 + 0.01 |
| X.02 | Florylpicoxamid | 25:1 | 0.25 + 0.01 |
| X.02 | Florylpicoxamid | 25:2 | 0.125 + 0.01 |
| X.02 | Florylpicoxamid | 25:4 | 0.0625 + 0.01 |
| X.02 | Florylpicoxamid | 25:8 | 0.03125 + 0.01 |

TABLE C1-2

Fungicidal activity >80% (% of untreated) against *Mycosphaerella arachidis*

| Component A | Component B | Ratio A:B | Conc. (ppm) (A:B) |
|---|---|---|---|
| X.04 | glyphosate | 1:1 | 0.1 + 0.1 |
| X.04 | glyphosate | 1:3 | 0.1 + 0.3 |
| X.04 | glyphosate | 3:10 | 0.03 + 0.1 |
| X.04 | glyphosate | 1:10 | 0.03 + 0.3 |
| X.04 | chlorothalonil | 1:1 | 0.1 + 0.1 |
| X.04 | chlorothalonil | 1:3 | 0.1 + 0.3 |
| X.04 | chlorothalonil | 3:10 | 0.03 + 0.1 |
| X.04 | chlorothalonil | 1:10 | 0.03 + 0.3 |
| X.04 | mancozeb | 1:1 | 0.1 + 0.1 |
| X.04 | mancozeb | 1:3 | 0.1 + 0.3 |
| X.04 | mancozeb | 3:10 | 0.03 + 0.1 |
| X.04 | mancozeb | 1:10 | 0.03 + 0.3 |
| X.04 | 2,4-D | 1:1 | 0.1 + 0.1 |
| X.04 | 2,4-D | 1:3 | 0.1 + 0.3 |
| X.04 | 2,4-D | 3:10 | 0.03 + 0.1 |
| X.04 | 2,4-D | 1:10 | 0.03 + 0.3 |
| X.04 | propiconazole | 1:1 | 0.1 + 0.1 |
| X.04 | propiconazole | 1:3 | 0.1 + 0.3 |
| X.04 | propiconazole | 3:10 | 0.03 + 0.1 |
| X.04 | propiconazole | 1:10 | 0.03 + 0.3 |
| X.04 | disodium phosphonate | 1:1 | 0.1 + 0.1 |
| X.04 | disodium phosphonate | 1:3 | 0.1 + 0.3 |
| X.04 | disodium phosphonate | 3:10 | 0.03 + 0.1 |
| X.04 | disodium phosphonate | 1:10 | 0.03 + 0.3 |
| X.04 | fenpropimorph | 1:1 | 0.1 + 0.1 |
| X.04 | fenpropimorph | 1:3 | 0.1 + 0.3 |
| X.04 | fenpropimorph | 3:10 | 0.03 + 0.1 |
| X.04 | fenpropimorph | 1:10 | 0.03 + 0.3 |
| X.04 | fenpropidin | 1:1 | 0.1 + 0.1 |
| X.04 | fenpropidin | 1:3 | 0.1 + 0.3 |
| X.04 | fenpropidin | 1:10 | 0.03 + 0.3 |
| X.04 | hexaconazole | 1:1 | 0.1 + 0.1 |
| X.04 | hexaconazole | 1:3 | 0.1 + 0.3 |
| X.04 | hexaconazole | 3:10 | 0.03 + 0.1 |
| X.04 | hexaconazole | 1:10 | 0.03 + 0.3 |
| X.04 | paclobutrazol | 1:1 | 0.1 + 0.1 |
| X.04 | paclobutrazol | 1:3 | 0.1 + 0.3 |
| X.04 | paclobutrazol | 3:10 | 0.03 + 0.1 |

TABLE C1-2-continued

Fungicidal activity >80% (% of untreated) against *Mycosphaerella arachidis*

| Component A | Component B | Ratio A:B | Conc. (ppm) (A:B) |
|---|---|---|---|
| X.04 | paclobutrazol | 1:10 | 0.03 + 0.3 |
| X.04 | trinexapac-ethyl | 1:1 | 0.1 + 0.1 |
| X.04 | trinexapac-ethyl | 1:3 | 0.1 + 0.3 |
| X.04 | trinexapac-ethyl | 3:10 | 0.03 + 0.1 |
| X.04 | trinexapac-ethyl | 1:10 | 0.03 + 0.3 |
| X.04 | flutriafol | 1:1 | 0.1 + 0.1 |
| X.04 | flutriafol | 1:3 | 0.1 + 0.3 |
| X.04 | difenoconazole | 1:1 | 0.1 + 0.1 |
| X.04 | difenoconazole | 1:3 | 0.1 + 0.3 |
| X.04 | difenoconazole | 3:10 | 0.03 + 0.1 |
| X.04 | difenoconazole | 1:10 | 0.03 + 0.3 |
| X.04 | fludioxonil | 1:1 | 0.1 + 0.1 |
| X.04 | fludioxonil | 1:3 | 0.1 + 0.3 |
| X.04 | cyproconazole | 1:1 | 0.1 + 0.1 |
| X.04 | cyproconazole | 1:3 | 0.1 + 0.3 |
| X.04 | cyproconazole | 1:10 | 0.03 + 0.3 |
| X.04 | acibenzolar S-methyl | 1:1 | 0.1 + 0.1 |
| X.04 | acibenzolar S-methyl | 1:3 | 0.1 + 0.3 |
| X.04 | acibenzolar S-methyl | 3:10 | 0.03 + 0.1 |
| X.04 | acibenzolar S-methyl | 1:10 | 0.03 + 0.3 |
| X.04 | trifloxystrobin | 1:1 | 0.1 + 0.1 |
| X.04 | trifloxystrobin | 1:3 | 0.1 + 0.3 |
| X.04 | trifloxystrobin | 3:10 | 0.03 + 0.1 |
| X.04 | trifloxystrobin | 1:10 | 0.03 + 0.3 |
| X.04 | folpet | 1:1 | 0.1 + 0.1 |
| X.04 | folpet | 1:3 | 0.1 + 0.3 |
| X.04 | folpet | 3:10 | 0.03 + 0.1 |
| X.04 | folpet | 1:10 | 0.03 + 0.3 |
| X.04 | azoxystrobin | 1:1 | 0.1 + 0.1 |
| X.04 | azoxystrobin | 1:3 | 0.1 + 0.3 |
| X.04 | azoxystrobin | 3:10 | 0.03 + 0.1 |
| X.04 | azoxystrobin | 1:10 | 0.03 + 0.3 |
| X.04 | pyraclostrobin | 1:1 | 0.1 + 0.1 |
| X.04 | pyraclostrobin | 1:3 | 0.1 + 0.3 |
| X.04 | pyraclostrobin | 3:10 | 0.03 + 0.1 |
| X.04 | pyraclostrobin | 1:10 | 0.03 + 0.3 |
| X.04 | picoxystrobin | 1:1 | 0.1 + 0.1 |
| X.04 | picoxystrobin | 1:3 | 0.1 + 0.3 |
| X.04 | picoxystrobin | 3:10 | 0.03 + 0.1 |
| X.04 | picoxystrobin | 1:10 | 0.03 + 0.3 |
| X.04 | sulphur | 1:1 | 0.1 + 0.1 |
| X.04 | sulphur | 1:3 | 0.1 + 0.3 |
| X.04 | sulphur | 3:10 | 0.03 + 0.1 |
| X.04 | sulphur | 1:10 | 0.03 + 0.3 |
| X.04 | tebuconazole | 1:1 | 0.1 + 0.1 |
| X.04 | tebuconazole | 1:3 | 0.1 + 0.3 |
| X.04 | tebuconazole | 1:10 | 0.03 + 0.3 |
| X.04 | prothioconazole | 1:1 | 0.1 + 0.1 |
| X.04 | prothioconazole | 1:3 | 0.1 + 0.3 |
| X.04 | prothioconazole | 3:10 | 0.03 + 0.1 |
| X.04 | prothioconazole | 1:10 | 0.03 + 0.3 |
| X.04 | fluopyram | 1:1 | 0.1 + 0.1 |
| X.04 | fluopyram | 1:3 | 0.1 + 0.3 |
| X.04 | fluopyram | 3:10 | 0.03 + 0.1 |
| X.04 | fluopyram | 1:10 | 0.03 + 0.3 |
| X.04 | copper oxychloride | 1:1 | 0.1 + 0.1 |
| X.04 | copper oxychloride | 1:3 | 0.1 + 0.3 |
| X.04 | copper oxychloride | 3:10 | 0.03 + 0.1 |
| X.04 | copper oxychloride | 1:10 | 0.03 + 0.3 |
| X.04 | benzovindiflupyr | 1:1 | 0.1 + 0.1 |
| X.04 | benzovindiflupyr | 1:3 | 0.1 + 0.3 |
| X.04 | benzovindiflupyr | 3:10 | 0.03 + 0.1 |
| X.04 | benzovindiflupyr | 1:10 | 0.03 + 0.3 |
| X.04 | isopyrazam | 1:1 | 0.1 + 0.1 |
| X.04 | isopyrazam | 1:3 | 0.1 + 0.3 |
| X.04 | isopyrazam | 3:10 | 0.03 + 0.1 |
| X.04 | isopyrazam | 1:10 | 0.03 + 0.3 |
| X.04 | pydiflumetofen | 1:1 | 0.1 + 0.1 |
| X.04 | pydiflumetofen | 1:3 | 0.1 + 0.3 |
| X.04 | pydiflumetofen | 3:10 | 0.03 + 0.1 |
| X.04 | pydiflumetofen | 1:10 | 0.03 + 0.3 |
| X.04 | fluxapyroxad | 1:1 | 0.1 + 0.1 |
| X.04 | fluxapyroxad | 1:3 | 0.1 + 0.3 |
| X.04 | fluxapyroxad | 3:10 | 0.03 + 0.1 |

TABLE C1-2-continued

| Component A | Component B | Ratio A:B | Conc. (ppm) (A:B) |
|---|---|---|---|
| | Fungicidal activity >80% (% of untreated) against *Mycosphaerella arachidis* | | |
| X.04 | fluxapyroxad | 1:10 | 0.03 + 0.3 |
| X.04 | quinofumelin | 1:1 | 0.1 + 0.1 |
| X.04 | quinofumelin | 1:3 | 0.1 + 0.3 |
| X.04 | quinofumelin | 3:10 | 0.03 + 0.1 |
| X.04 | quinofumelin | 1:10 | 0.03 + 0.3 |
| X.04 | isoflucypram | 1:1 | 0.1 + 0.1 |
| X.04 | isoflucypram | 1:3 | 0.1 + 0.3 |
| X.04 | isoflucypram | 3:10 | 0.03 + 0.1 |
| X.04 | isoflucypram | 1:10 | 0.03 + 0.3 |
| X.04 | mefentrifluconazole | 1:1 | 0.1 + 0.1 |
| X.04 | mefentrifluconazole | 1:3 | 0.1 + 0.3 |
| X.04 | mefentrifluconazole | 3:10 | 0.03 + 0.1 |
| X.04 | mefentrifluconazole | 1:10 | 0.03 + 0.3 |
| X.04 | ipflufenoquin | 1:1 | 0.1 + 0.1 |
| X.04 | ipflufenoquin | 1:3 | 0.1 + 0.3 |
| X.04 | ipflufenoquin | 3:10 | 0.03 + 0.1 |
| X.04 | ipflufenoquin | 1:10 | 0.03 + 0.3 |
| X.04 | metyltetraprole | 1:1 | 0.1 + 0.1 |
| X.04 | metyltetraprole | 1:3 | 0.1 + 0.3 |
| X.04 | metyltetraprole | 3:10 | 0.03 + 0.1 |
| X.04 | metyltetraprole | 1:10 | 0.03 + 0.3 |
| X.04 | aminopyrifen | 1:1 | 0.1 + 0.1 |
| X.04 | aminopyrifen | 1:3 | 0.1 + 0.3 |
| X.04 | aminopyrifen | 3:10 | 0.03 + 0.1 |
| X.04 | aminopyrifen | 1:10 | 0.03 + 0.3 |
| X.04 | florylpicoxamid | 1:1 | 0.1 + 0.1 |
| X.04 | florylpicoxamid | 1:3 | 0.1 + 0.3 |
| X.04 | florylpicoxamid | 3:10 | 0.03 + 0.1 |
| X.04 | florylpicoxamid | 1:10 | 0.03 + 0.3 |
| X.04 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.04 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.04 | 2-[6-(4-bromophenoxy)-2-(trifluoromethyl)-3-pyridyl]-1-(1,2,4-triazol-1-yl)propan-2-ol | 3:10 | 0.03 + 0.1 |
| X.04 | 2-[6-(4-bromophenoxy)-2-(trifluoromethyl)-3-pyridyl]-1-(1,2,4-triazol-1-yl)propan-2-ol | 1:10 | 0.03 + 0.3 |
| X.04 | fenpicoxamid | 1:1 | 0.1 + 0.1 |
| X.04 | fenpicoxamid | 1:3 | 0.1 + 0.3 |
| X.04 | fenpicoxamid | 3:10 | 0.03 + 0.1 |
| X.04 | fenpicoxamid | 1:10 | 0.03 + 0.3 |
| X.04 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.04 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.04 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.04 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |
| X.04 | [(1S,2S)-1-methyl-2-(o-tolyl)propyl] (2S)-2-[(4-methoxy-3-propanoyloxy-pyridine-2-carbonyl)amino]propanoate[(1S,2S)-1 -methyl-2-(o-tolyl)propyl] (2S)-2-[(4-methoxy-3-propanoyloxy-pyridine-2-carbonyl)amino]propanoate | 10:3 | 0.2 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:3 | 0.1 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:6 | 0.05 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:12 | 0.025 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:24 | 0.0125 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:48 | 0.00625 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 20:3 | 0.2 + 0.03 |

TABLE C1-2-continued

| Fungicidal activity >80% (% of untreated) against *Mycosphaerella arachidis* | | | |
|---|---|---|---|
| Component A | Component B | Ratio A:B | Conc. (ppm) (A:B) |
| X.04 | [(1S,2S)-1-methyl-2-(o-tolyl)propyl] (2S)-2-[(4-methoxy-3-propanoyloxy-pyridine-2-carbonyl)amino]propanoate | 10:3 | 0.1 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:6 | 0.05 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:12 | 0.025 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:24 | 0.0125 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:48 | 0.00625 + 0.03 |
| X.04 | N-(2-fluorophenyl)-4-[5-(trifluoromethyl)-1,2,4-oxadiazol-3-yl]benzamideN-(2-fluorophenyl)-4-[5-(trifluoromethyl)-1,2,4-oxadiazol-3-yl]benzamide | 1 :100 | 0.2 + 20 |
| X.04 | N-(2-fluorophenyl)-4-[5-(trifluoromethyl)-1,2,4-oxadiazol-3-yl]benzamide | 1:200 | 0.1 + 20 |
| X.04 | N-(2-fluorophenyl)-4-[5-(trifluoromethyl)-1,2,4-oxadiazol-3-yl]benzamide | 1:400 | 0.05 + 20 |
| X.04 | N-(2-fluorophenyl)-4-[5-(trifluoromethyl)-1,2,4-oxadiazol-3-yl]benzamide | 1:800 | 0.025 + 20 |
| X.04 | N-(2-fluorophenyl)-4-[5-(trifluoromethyl)-1,2,4-oxadiazol-3-yl]benzamide | 1:50 | 0.2 + 10 |
| X.04 | N-(2-fluorophenyl)-4-[5-(trifluoromethyl)-1,2,4-oxadiazol-3-yl]benzamide | 1:100 | 0.1 + 10 |
| X.04 | N-(2-fluorophenyl)-4-[5-(trifluoromethyl)-1,2,4-oxadiazol-3-yl]benzamide | 1:200 | 0.05 + 10 |
| X.04 | N-(2-fluorophenyl)-4-[5-(trifluoromethyl)-1,2,4-oxadiazol-3-yl]benzamide | 1:400 | 0.025 + 10 |
| X.04 | Florylpicoxamid | 10:1 | 0.2 + 0.02 |
| X.04 | Florylpicoxamid | 5:1 | 0.1 + 0.02 |
| X.04 | Florylpicoxamid | 5:2 | 0.05 + 0.02 |
| X.04 | Florylpicoxamid | 5:4 | 0.025 + 0.02 |
| X.04 | Florylpicoxamid | 5:8 | 0.0125 + 0.02 |
| X.04 | Florylpicoxamid | 5:16 | 0.006125 + 0.02 |
| X.04 | Florylpicoxamid | 20:1 | 0.2 + 0.01 |
| X.04 | Florylpicoxamid | 10:1 | 0.1 + 0.01 |
| X.04 | Florylpicoxamid | 5:1 | 0.05 + 0.01 |
| X.04 | Florylpicoxamid | 5:2 | 0.025 + 0.01 |
| X.04 | Florylpicoxamid | 5:4 | 0.0125 + 0.01 |
| X.04 | Florylpicoxamid | 5:8 | 0.006125 + 0.01 |

The following mixture compositions at the reported concentration (in ppm) in tables C1-3 and C1-4 gave the following disease control in this test *Mycosphaerella arachidis* syn. *Cercospora arachidicola* (Brown leaf spot of peanut). Fungicidal activity was evaluated on a 100-0 scale (100=no disease growth; 0=well completely covered by mycelium).

TABLE C1-3

| Component A | Component B | Conc. (ppm) (A:B) | Ratio A:B | Activity (%) | COLBY (expected activity %) |
|---|---|---|---|---|---|
| X.02 | | 0.03 | | 50 | |
| | chlorothalonil | 0.1 | | 20 | |
| X.02 | chlorothalonil | 0.03 + 0.1 | 3:10 | 70 | 60 |
| | mancozeb | 0.1 | | 0 | |
| | mancozeb | 0.3 | | 0 | |
| X.02 | mancozeb | 0.03 + 0.1 | 3:10 | 70 | 50 |
| X.02 | mancozeb | 0.03 + 0.3 | 1:10 | 70 | 50 |
| | folpet | 0.3 | | 20 | |

TABLE C1-3-continued

| Component A | Component B | Conc. (ppm) (A:B) | Ratio A:B | Activity (%) | COLBY (expected activity %) |
|---|---|---|---|---|---|
| X.02 | folpet | 0.03 + 0.3 | 1:10 | 70 | 60 |
| | ipflufenoquin | 0.3 | | 0 | |
| X.02 | ipflufenoquin | 0.03 + 0.3 | 1:10 | 70 | 50 |

TABLE C1-4

| Component A | Component B | Conc. (ppm) (A:B) | Ratio A:B | Activity (%) | COLBY (expected activity %) |
|---|---|---|---|---|---|
| X.04 | | 0.0125 | | 50 | |
| X.04 | | 0.00625 | | 0 | |
| | [(1S,2S)-1-methyl-2-(o-tolyl)propyl] (2S)-2-[(4-methoxy-3-propanoyloxy-pyridine-2-carbonyl)amino]propanoate | 0.03 | | 70 | |
| X.04 | [(1S,2S)-1-methyl-2-(o-tolyl)propyl] (2S)-2-[(4-methoxy-3-propanoyloxy-pyridine-2-carbonyl)amino]propanoate | 0.0125 + 0.03 | 12:5 | 100 | 85 |
| X.04 | [(1S,2S)-1-methyl-2-(o-tolyl)propyl] (2S)-2-[(4-methoxy-3-propanoyloxy-pyridine-2-carbonyl)amino]propanoate | 0.00625 + 0.03 | 24:5 | 100 | 70 |
| | Florylpicoxamid | 0.02 | | 90 | |
| | Florylpicoxamid | 0.01 | | 50 | |
| X.04 | Florylpicoxamid | 0.0125 + 0.02 | 5:8 | 100 | 95 |
| X.04 | Florylpicoxamid | 0.00625 + 0.02 | 5:16 | 100 | 90 |
| X.04 | Florylpicoxamid | 0.0125 + 0.01 | 5:4 | 100 | 75 |
| X.04 | Florylpicoxamid | 0.00625 + 0.01 | 5:8 | 100 | 50 |
| X.02 | | 0.03125 | | 70 | |
| X.02 | Florylpicoxamid | 0.03125 + 0.02 | 25:16 | 100 | 97 |
| X.02 | Florylpicoxamid | 0.03125 + 0.01 | 25:8 | 100 | 85 |

Example C2—Fungicidal Activity Against *Septoria tritici* (Leaf Blotch)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs. The following compound mixtures gave at least 80% control *Septoria tritici* at rates cited in the table when compared to untreated control under the same conditions, which showed extensive disease development.

TABLE C2-1

Fungicidal activity >80% (% of untreated) against *Septoria tritici*

| Component A | Component B | Ratio A:B | Conc. (ppm) (A:B) |
|---|---|---|---|
| X.02 | chlorothalonil | 1:1 | 0.1 + 0.1 |
| X.02 | chlorothalonil | 1:3 | 0.1 + 0.3 |
| X.02 | chlorothalonil | 1:10 | 0.03 + 0.3 |
| X.02 | propiconazole | 1:3 | 0.1 + 0.3 |
| X.02 | propiconazole | 1:10 | 0.03 + 0.3 |
| X.02 | hexaconazole | 1:1 | 0.1 + 0.1 |
| X.02 | hexaconazole | 1:3 | 0.1 + 0.3 |
| X.02 | hexaconazole | 3:10 | 0.03 + 0.1 |
| X.02 | hexaconazole | 1:10 | 0.03 + 0.3 |
| X.02 | difenoconazole | 1:1 | 0.1 + 0.1 |
| X.02 | difenoconazole | 1:3 | 0.1 + 0.3 |
| X.02 | difenoconazole | 3:10 | 0.03 + 0.1 |
| X.02 | difenoconazole | 1:10 | 0.03 + 0.3 |
| X.02 | cyproconazole | 1:3 | 0.1 + 0.3 |
| X.02 | trifloxystrobin | 1:1 | 0.1 + 0.1 |

TABLE C2-1-continued

Fungicidal activity >80% (% of untreated) against *Septoria tritici*

| Component A | Component B | Ratio A:B | Conc. (ppm) (A:B) |
|---|---|---|---|
| X.02 | trifloxystrobin | 1:3 | 0.1 + 0.3 |
| X.02 | trifloxystrobin | 3:10 | 0.03 + 0.1 |
| X.02 | trifloxystrobin | 1:10 | 0.03 + 0.3 |
| X.02 | azoxystrobin | 1:1 | 0.1 + 0.1 |
| X.02 | azoxystrobin | 1:3 | 0.1 + 0.3 |
| X.02 | azoxystrobin | 3:10 | 0.03 + 0.1 |
| X.02 | azoxystrobin | 1:10 | 0.03 + 0.3 |
| X.02 | pyraclostrobin | 1:1 | 0.1 + 0.1 |
| X.02 | pyraclostrobin | 1:3 | 0.1 + 0.3 |
| X.02 | pyraclostrobin | 3:10 | 0.03 + 0.1 |
| X.02 | pyraclostrobin | 1:10 | 0.03 + 0.3 |
| X.02 | picoxystrobin | 1:1 | 0.1 + 0.1 |
| X.02 | picoxystrobin | 1:3 | 0.1 + 0.3 |
| X.02 | picoxystrobin | 3:10 | 0.03 + 0.1 |
| X.02 | picoxystrobin | 1:10 | 0.03 + 0.3 |
| X.02 | prothioconazole | 1:1 | 0.1 + 0.1 |
| X.02 | prothioconazole | 1:3 | 0.1 + 0.3 |
| X.02 | prothioconazole | 3:10 | 0.03 + 0.1 |
| X.02 | prothioconazole | 1:10 | 0.03 + 0.3 |
| X.02 | benzovindiflupyr | 1:1 | 0.1 + 0.1 |
| X.02 | benzovindiflupyr | 1:3 | 0.1 + 0.3 |
| X.02 | benzovindiflupyr | 1:10 | 0.03 + 0.3 |
| X.02 | isopyrazam | 1:1 | 0.1 + 0.1 |
| X.02 | isopyrazam | 1:3 | 0.1 + 0.3 |
| X.02 | isopyrazam | 1:10 | 0.03 + 0.3 |
| X.02 | pydiflumetofen | 1:1 | 0.1 + 0.1 |
| X.02 | pydiflumetofen | 1:3 | 0.1 + 0.3 |
| X.02 | pydiflumetofen | 3:10 | 0.03 + 0.1 |
| X.02 | pydiflumetofen | 1:10 | 0.03 + 0.3 |
| X.02 | fluxapyroxad | 1:1 | 0.1 + 0.1 |
| X.02 | fluxapyroxad | 1:3 | 0.1 + 0.3 |
| X.02 | fluxapyroxad | 1:10 | 0.03 + 0.3 |
| X.02 | quinofumelin | 1:3 | 0.1 + 0.3 |
| X.02 | isoflucypram | 1:1 | 0.1 + 0.1 |
| X.02 | isoflucypram | 1:3 | 0.1 + 0.3 |
| X.02 | isoflucypram | 3:10 | 0.03 + 0.1 |
| X.02 | isoflucypram | 1:10 | 0.03 + 0.3 |
| X.02 | mefentrifluconazole | 1:1 | 0.1 + 0.1 |
| X.02 | mefentrifluconazole | 1:3 | 0.1 + 0.3 |
| X.02 | mefentrifluconazole | 3:10 | 0.03 + 0.1 |
| X.02 | mefentrifluconazole | 1:10 | 0.03 + 0.3 |
| X.02 | ipflufenoquin | 1:1 | 0.1 + 0.1 |
| X.02 | ipflufenoquin | 1:3 | 0.1 + 0.3 |
| X.02 | metyltetraprole | 1:1 | 0.1 + 0.1 |
| X.02 | metyltetraprole | 1:3 | 0.1 + 0.3 |
| X.02 | metyltetraprole | 3:10 | 0.03 + 0.1 |
| X.02 | metyltetraprole | 1:10 | 0.03 + 0.3 |
| X.02 | aminopyrifen | 1:1 | 0.1 + 0.1 |
| X.02 | aminopyrifen | 1:3 | 0.1 + 0.3 |
| X.02 | aminopyrifen | 3:10 | 0.03 + 0.1 |
| X.02 | aminopyrifen | 1:10 | 0.03 + 0.3 |
| X.02 | florylpicoxamid | 1:1 | 0.1 + 0.1 |
| X.02 | florylpicoxamid | 1:3 | 0.1 + 0.3 |
| X.02 | florylpicoxamid | 3:10 | 0.03 + 0.1 |
| X.02 | florylpicoxamid | 1:10 | 0.03 + 0.3 |
| X.02 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.02 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.02 | 2-[6-(4-bromophenoxy)-2-(trifluoromethyl)-3-pyridyl]-1-(1,2,4-triazol-1-yl)propan-2-ol | 3:10 | 0.03 + 0.1 |
| X.02 | 2-[6-(4-bromophenoxy)-2-(trifluoromethyl)-3-pyridyl]-1-(1,2,4-triazol-1-yl)propan-2-ol | 1:10 | 0.03 + 0.3 |
| X.02 | fenpicoxamid | 1:1 | 0.1 + 0.1 |
| X.02 | fenpicoxamid | 1:3 | 0.1 + 0.3 |
| X.02 | fenpicoxamid | 3:10 | 0.03 + 0.1 |
| X.02 | fenpicoxamid | 1:10 | 0.03 + 0.3 |
| X.02 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.02 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.02 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |

TABLE C2-1-continued

Fungicidal activity >80% (% of untreated) against *Septoria tritici*

| Component A | Component B | Ratio A:B | Conc. (ppm) (A:B) |
|---|---|---|---|
| X.02 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |
| X.02 | [(1S,2S)-1-methyl-2-(o-tolyl)propyl] (2S)-2-[(4-methoxy-3-propanoyloxy-pyridine-2-carbonyl)amino]propanoate | 50:3 | 1 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:3 | 0.5 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:6 | 0.25 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:12 | 0.125 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:24 | 0.0625 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:48 | 0.03125 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 100:3 | 1 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:3 | 0.5 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:6 | 0.25 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:12 | 0.125 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:24 | 0.0625 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:48 | 0.03125 + 0.03 |
| X.02 | N-(2-fluorophenyl)-4-[5-(trifluoromethyl)-1,2,4-oxadiazol-3-yl]benzamide | 1:20 | 1 + 20 |
| X.02 | N-(2-fluorophenyl)-4-[5-(trifluoromethyl)-1,2,4-oxadiazol-3-yl]benzamide | 1:40 | 0.5 + 20 |
| X.02 | N-(2-fluorophenyl)-4-[5-(trifluoromethyl)-1,2,4-oxadiazol-3-yl]benzamide | 1:80 | 0.25 + 20 |
| X.02 | N-(2-fluorophenyl)-4-[5-(trifluoromethyl)-1,2,4-oxadiazol-3-yl]benzamide | 1:160 | 0.125 + 20 |
| X.02 | N-(2-fluorophenyl)-4-[5-(trifluoromethyl)-1,2,4-oxadiazol-3-yl] benzamide | 1:10 | 1 + 10 |
| X.02 | N-(2-fluorophenyl)-4-[5-(trifluoromethyl)-1,2,4-oxadiazol-3-yl]benzamide | 1:20 | 0.5 + 10 |
| X.02 | N-(2-fluorophenyl)-4-[5-(trifluoromethyl)-1,2,4-oxadiazol-3-yl]benzamide | 1:40 | 0.25 + 10 |
| X.02 | N-(2-fluorophenyl)-4-[5-(trifluoromethyl)-1,2,4-oxadiazol-3-yl]benzamide | 1:80 | 0.125 + 10 |
| X.02 | Florylpicoxamid | 50:1 | 1 + 0.02 |
| X.02 | Florylpicoxamid | 25:1 | 0.5 + 0.02 |
| X.02 | Florylpicoxamid | 25:2 | 0.25 + 0.02 |
| X.02 | Florylpicoxamid | 25:4 | 0.125 + 0.02 |
| X.02 | Florylpicoxamid | 25:8 | 0.0625 + 0.02 |
| X.02 | Florylpicoxamid | 25:16 | 0.03125 + 0.02 |
| X.02 | Florylpicoxamid | 100:1 | 1 + 0.01 |
| X.02 | Florylpicoxamid | 50:1 | 0.5 + 0.01 |
| X.02 | Florylpicoxamid | 25:1 | 0.25 + 0.01 |
| X.02 | Florylpicoxamid | 25:2 | 0.125 + 0.01 |
| X.02 | Florylpicoxamid | 25:4 | 0.0625 + 0.01 |
| X.02 | Florylpicoxamid | 25:8 | 0.03125 + 0.01 |

TABLE C2-2

Fungicidal activity >80% (% of untreated) against *Septoria tritici*

| Component A | Component B | Ratio A:B | Conc. (ppm) (A:B) |
|---|---|---|---|
| X.04 | chlorothalonil | 1:1 | 0.1 + 0.1 |
| X.04 | chlorothalonil | 1:3 | 0.1 + 0.3 |
| X.04 | chlorothalonil | 1:10 | 0.03 + 0.3 |
| X.04 | propiconazole | 1:3 | 0.1 + 0.3 |
| X.04 | propiconazole | 1:10 | 0.03 + 0.3 |
| X.04 | hexaconazole | 1:1 | 0.1 + 0.1 |
| X.04 | hexaconazole | 1:3 | 0.1 + 0.3 |
| X.04 | hexaconazole | 3:10 | 0.03 + 0.1 |

TABLE C2-2-continued

Fungicidal activity >80% (% of untreated) against *Septoria tritici*

| Component A | Component B | Ratio A:B | Conc. (ppm) (A:B) |
|---|---|---|---|
| X.04 | hexaconazole | 1:10 | 0.03 + 0.3 |
| X.04 | difenoconazole | 1:1 | 0.1 + 0.1 |
| X.04 | difenoconazole | 1:3 | 0.1 + 0.3 |
| X.04 | difenoconazole | 3:10 | 0.03 + 0.1 |
| X.04 | difenoconazole | 1:10 | 0.03 + 0.3 |
| X.04 | fludioxonil | 1:3 | 0.1 + 0.3 |
| X.04 | cyproconazole | 1:3 | 0.1 + 0.3 |
| X.04 | cyproconazole | 1:10 | 0.03 + 0.3 |
| X.04 | trifloxystrobin | 1:1 | 0.1 + 0.1 |
| X.04 | trifloxystrobin | 1:3 | 0.1 + 0.3 |
| X.04 | trifloxystrobin | 3:10 | 0.03 + 0.1 |
| X.04 | trifloxystrobin | 1:10 | 0.03 + 0.3 |
| X.04 | folpet | 1:3 | 0.1 + 0.3 |
| X.04 | azoxystrobin | 1:1 | 0.1 + 0.1 |
| X.04 | azoxystrobin | 1:3 | 0.1 + 0.3 |
| X.04 | azoxystrobin | 3:10 | 0.03 + 0.1 |
| X.04 | azoxystrobin | 1:10 | 0.03 + 0.3 |
| X.04 | pyraclostrobin | 1:1 | 0.1 + 0.1 |
| X.04 | pyraclostrobin | 1:3 | 0.1 + 0.3 |
| X.04 | pyraclostrobin | 3:10 | 0.03 + 0.1 |
| X.04 | pyraclostrobin | 1:10 | 0.03 + 0.3 |
| X.04 | picoxystrobin | 1:1 | 0.1 + 0.1 |
| X.04 | picoxystrobin | 1:3 | 0.1 + 0.3 |
| X.04 | picoxystrobin | 3:10 | 0.03 + 0.1 |
| X.04 | picoxystrobin | 1:10 | 0.03 + 0.3 |
| X.04 | prothioconazole | 1:1 | 0.1 + 0.1 |
| X.04 | prothioconazole | 1:3 | 0.1 + 0.3 |
| X.04 | prothioconazole | 3:10 | 0.03 + 0.1 |
| X.04 | prothioconazole | 1:10 | 0.03 + 0.3 |
| X.04 | fluopyram | 1:3 | 0.1 + 0.3 |
| X.04 | benzovindiflupyr | 1:1 | 0.1 + 0.1 |
| X.04 | benzovindiflupyr | 1:3 | 0.1 + 0.3 |
| X.04 | benzovindiflupyr | 1:10 | 0.03 + 0.3 |
| X.04 | isopyrazam | 1:1 | 0.1 + 0.1 |
| X.04 | isopyrazam | 1:3 | 0.1 + 0.3 |
| X.04 | isopyrazam | 1:10 | 0.03 + 0.3 |
| X.04 | pydiflumetofen | 1:1 | 0.1 + 0.1 |
| X.04 | pydiflumetofen | 1:3 | 0.1 + 0.3 |
| X.04 | pydiflumetofen | 3:10 | 0.03 + 0.1 |
| X.04 | pydiflumetofen | 1:10 | 0.03 + 0.3 |
| X.04 | fluxapyroxad | 1:1 | 0.1 + 0.1 |
| X.04 | fluxapyroxad | 1:3 | 0.1 + 0.3 |
| X.04 | fluxapyroxad | 1:10 | 0.03 + 0.3 |
| X.04 | quinofumelin | 1:3 | 0.1 + 0.3 |
| X.04 | isoflucypram | 1:1 | 0.1 + 0.1 |
| X.04 | isoflucypram | 1:3 | 0.1 + 0.3 |
| X.04 | isoflucypram | 3:10 | 0.03 + 0.1 |
| X.04 | isoflucypram | 1:10 | 0.03 + 0.3 |
| X.04 | mefentrifluconazole | 1:1 | 0.1 + 0.1 |
| X.04 | mefentrifluconazole | 1:3 | 0.1 + 0.3 |
| X.04 | mefentrifluconazole | 3:10 | 0.03 + 0.1 |
| X.04 | mefentrifluconazole | 1:10 | 0.03 + 0.3 |
| X.04 | ipflufenoquin | 1:1 | 0.1 + 0.1 |
| X.04 | ipflufenoquin | 1:3 | 0.1 + 0.3 |
| X.04 | ipflufenoquin | 1:10 | 0.03 + 0.3 |
| X.04 | metyltetraprole | 1:1 | 0.1 + 0.1 |
| X.04 | metyltetraprole | 1:3 | 0.1 + 0.3 |
| X.04 | metyltetraprole | 3:10 | 0.03 + 0.1 |
| X.04 | metyltetraprole | 1:10 | 0.03 + 0.3 |
| X.04 | aminopyrifen | 1:1 | 0.1 + 0.1 |
| X.04 | aminopyrifen | 1:3 | 0.1 + 0.3 |
| X.04 | aminopyrifen | 3:10 | 0.03 + 0.1 |
| X.04 | aminopyrifen | 1:10 | 0.03 + 0.3 |
| X.04 | florylpicoxamid | 1:1 | 0.1 + 0.1 |
| X.04 | florylpicoxamid | 1:3 | 0.1 + 0.3 |
| X.04 | florylpicoxamid | 3:10 | 0.03 + 0.1 |
| X.04 | florylpicoxamid | 1:10 | 0.03 + 0.3 |
| X.04 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.04 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.04 | 2-[6-(4-bromophenoxy)-2-(trifluoromethyl)-3-pyridyl]-1-(1,2,4-triazol-1-yl)propan-2-ol | 3:10 | 0.03 + 0.1 |

TABLE C2-2-continued

| Fungicidal activity >80% (% of untreated) against *Septoria tritici* | | | |
|---|---|---|---|
| Component A | Component B | Ratio A:B | Conc. (ppm) (A:B) |
| X.04 | 2-[6-(4-bromophenoxy)-2-(trifluoromethyl)-3-pyridyl]-1-(1,2,4-triazol-1-yl)propan-2-ol | 1:10 | 0.03 + 0.3 |
| X.04 | fenpicoxamid | 1:1 | 0.1 + 0.1 |
| X.04 | fenpicoxamid | 1:3 | 0.1 + 0.3 |
| X.04 | fenpicoxamid | 3:10 | 0.03 + 0.1 |
| X.04 | fenpicoxamid | 1:10 | 0.03 + 0.3 |
| X.04 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.04 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.04 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.04 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |
| X.04 | [(1S,2S)-1-methyl-2-(o-tolyl)propyl] (2S)-2-[(4-methoxy-3-propanoyloxy-pyridine-2-carbonyl)amino]propanoate | 10:3 | 0.2 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:3 | 0.1 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:6 | 0.05 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:12 | 0.025 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:24 | 0.0125 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:48 | 0.00625 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 20:3 | 0.2 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:3 | 0.1 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:6 | 0.05 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:12 | 0.025 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:24 | 0.0125 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:48 | 0.00625 + 0.03 |
| X.04 | N-(2-fluorophenyl)-4-[5-(trifluoromethyl)-1,2,4-oxadiazol-3-yl]benzamide | 1:100 | 0.2 + 20 |
| X.04 | N-(2-fluorophenyl)-4-[5-(trifluoromethyl)-1,2,4-oxadiazol-3-yl]benzamide | 1:200 | 0.1 + 20 |
| X.04 | N-(2-fluorophenyl)-4-[5-(trifluoromethyl)-1,2,4-oxadiazol-3-yl]benzamide | 1:400 | 0.05 + 20 |
| X.04 | N-(2-fluorophenyl)-4-[5-(trifluoromethyl)-1,2,4-oxadiazol-3-yl]benzamide | 1:800 | 0.025 + 20 |
| X.04 | N-(2-fluorophenyl)-4-[5-(trifluoromethyl)-1,2,4-oxadiazol-3-yl]benzamide | 1:50 | 0.2 + 10 |
| X.04 | N-(2-fluorophenyl)-4-[5-(trifluoromethyl)-1,2,4-oxadiazol-3-yl]benzamide | 1:100 | 0.1 + 10 |
| X.04 | N-(2-fluorophenyl)-4-[5-(trifluoromethyl)-1,2,4-oxadiazol-3-yl]benzamide | 1:200 | 0.05 + 10 |
| X.04 | N-(2-fluorophenyl)-4-[5-(trifluoromethyl)-1,2,4-oxadiazol-3-yl]benzamide | 1:400 | 0.025 + 10 |
| X.04 | Florylpicoxamid | 10:1 | 0.2 + 0.02 |
| X.04 | Florylpicoxamid | 5:1 | 0.1 + 0.02 |
| X.04 | Florylpicoxamid | 5:2 | 0.05 + 0.02 |
| X.04 | Florylpicoxamid | 5:4 | 0.025 + 0.02 |
| X.04 | Florylpicoxamid | 5:8 | 0.0125 + 0.02 |
| X.04 | Florylpicoxamid | 5:16 | 0.006125 + 0.02 |
| X.04 | Florylpicoxamid | 20:1 | 0.2 + 0.01 |
| X.04 | Florylpicoxamid | 10:1 | 0.1 + 0.01 |

TABLE C2-2-continued

| Fungicidal activity >80% (% of untreated) against *Septoria tritici* | | | |
|---|---|---|---|
| Component A | Component B | Ratio A:B | Conc. (ppm) (A:B) |
| X.04 | Florylpicoxamid | 5:1 | 0.05 + 0.01 |
| X.04 | Florylpicoxamid | 5:2 | 0.025 + 0.01 |

The following mixture compositions at the reported concentration (in ppm) in tables C2-3 to C2-5 gave the following disease control in this test *Septoria tritici* (leaf blotch). Fungicidal activity was evaluated on a 100-0 scale (100=no disease growth; 0=well completely covered by mycelium).

TABLE C2-3

| Component A | Component B | Conc. (ppm) (A:B) | Ratio A:B | Activity (%) | COLBY (expected activity %) |
|---|---|---|---|---|---|
| X.02 | | 0.1 | | 70 | |
| X.02 | | 0.03 | | 0 | |
| | chlorothalonil | 0.1 | | 20 | |
| | chlorothalonil | 0.3 | | 50 | |
| X.02 | chlorothalonil | 0.1 + 0.1 | 1:1 | 90 | 76 |
| X.02 | chlorothalonil | 0.1 + 0.3 | 1:3 | 100 | 85 |
| X.02 | chlorothalonil | 0.03 + 0.3 | 1:10 | 90 | 50 |
| | propiconazole | 0.3 | | 70 | |
| X.02 | propiconazole | 0.03 + 0.3 | 1:10 | 90 | 70 |
| | hexaconazole | 0.1 | | 70 | |
| X.02 | hexaconazole | 0.1 + 0.1 | 1:1 | 100 | 91 |
| X.02 | hexaconazole | 0.03 + 0.1 | 3:10 | 90 | 70 |
| | cyproconazole | 0.3 | | 50 | |
| X.02 | cyproconazole | 0.1 + 0.3 | 1:3 | 90 | 85 |
| X.02 | cyproconazole | 0.03 + 0.3 | 1:10 | 70 | 50 |
| | benzovindiflupyr | 0.1 | | 50 | |
| | benzovindiflupyr | 0.3 | | 70 | |
| X.02 | benzovindiflupyr | 0.1 + 0.1 | 1:1 | 90 | 85 |
| X.02 | benzovindiflupyr | 0.1 + 0.3 | 1:3 | 100 | 91 |
| X.02 | benzovindiflupyr | 0.03 + 0.3 | 1:10 | 90 | 70 |
| | isopyrazam | 0.1 | | 50 | |
| | isopyrazam | 0.3 | | 70 | |
| X.02 | isopyrazam | 0.1 + 0.1 | 1:1 | 90 | 85 |
| X.02 | isopyrazam | 0.1 + 0.3 | 1:3 | 100 | 91 |
| X.02 | isopyrazam | 0.03 + 0.3 | 1:10 | 90 | 70 |
| | quinofumelin | 0.3 | | 0 | |
| X.02 | quinofumelin | 0.1 + 0.3 | 1:3 | 90 | 70 |
| | ipflufenoquin | 0.1 | | 20 | |
| | ipflufenoquin | 0.3 | | 20 | |
| X.02 | ipflufenoquin | 0.1 + 0.1 | 1:1 | 90 | 76 |
| X.02 | ipflufenoquin | 0.1 + 0.3 | 1:3 | 100 | 76 |
| X.02 | ipflufenoquin | 0.03 + 0.3 | 1:10 | 50 | 20 |

TABLE C2-4

| Component A | Component B | Conc. (ppm) (A:B) | Ratio A:B | Activity (%) | COLBY (expected activity %) |
|---|---|---|---|---|---|
| X.04 | | 0.1 | | 70 | |
| X.04 | | 0.03 | | 50 | |
| | chlorothalonil | 0.1 | | 20 | |
| | chlorothalonil | 0.3 | | 50 | |
| X.04 | chlorothalonil | 0.1 + 0.1 | 1:1 | 100 | 76 |
| X.04 | chlorothalonil | 0.1 + 0.3 | 1:3 | 100 | 85 |
| X.04 | chlorothalonil | 0.03 + 0.1 | 3:10 | 70 | 60 |
| X.04 | chlorothalonil | 0.03 + 0.3 | 1:10 | 100 | 75 |
| | propiconazole | 0.3 | | 70 | |
| X.04 | propiconazole | 0.1 + 0.3 | 1:3 | 100 | 91 |
| X.04 | propiconazole | 0.03 + 0.3 | 1:10 | 100 | 85 |
| | hexaconazole | 0.1 | | 70 | |

TABLE C2-4-continued

| Component A | Component B | Conc. (ppm) (A:B) | Ratio A:B | Activity (%) | COLBY (expected activity %) |
|---|---|---|---|---|---|
| X.04 | hexaconazole | 0.1 + 0.1 | 1:1 | 100 | 91 |
| X.04 | hexaconazole | 0.03 + 0.1 | 3:10 | 100 | 85 |
| | fludioxonil | 0.3 | | 20 | |
| X.04 | fludioxonil | 0.1 + 0.3 | 1:3 | 90 | 76 |
| X.04 | fludioxonil | 0.03 + 0.3 | 1:10 | 70 | 60 |
| | cyproconazole | 0.3 | | 50 | |
| X.04 | cyproconazole | 0.1 + 0.3 | 1:3 | 90 | 85 |
| X.04 | cyproconazole | 0.03 + 0.3 | 1:10 | 90 | 75 |
| | folpet | 0.3 | | 20 | |
| X.04 | folpet | 0.1 + 0.3 | 1:3 | 90 | 76 |
| | quinofumelin | 0.3 | | 0 | |
| X.04 | quinofumelin | 0.1 + 0.3 | 1:3 | 90 | 70 |
| X.04 | quinofumelin | 0.03 + 0.3 | 1:10 | 70 | 50 |
| | ipflufenoquin | 0.1 | | 20 | |
| | ipflufenoquin | 0.3 | | 20 | |
| X.04 | ipflufenoquin | 0.1 + 0.1 | 1:1 | 90 | 76 |
| X.04 | ipflufenoquin | 0.1 + 0.3 | 1:3 | 100 | 76 |
| X.04 | ipflufenoquin | 0.03 + 0.1 | 3:10 | 70 | 60 |
| X.04 | ipflufenoquin | 0.03 + 0.3 | 1:10 | 90 | 60 |

TABLE C2-5

| Component A | Component B | Conc. (ppm) (A:B) | Ratio A:B | Activity (%) | COLBY (expected activity %) |
|---|---|---|---|---|---|
| X.02 | | 0.0625 | | 90 | |
| X.02 | | 0.03125 | | 20 | |
| | [(1S,2S)-1-methyl-2-(o-tolyl)propyl] (2S)-2-[(4-methoxy-3-propanoyloxy-pyridine-2-carbonyl)amino]propanoate | 0.06 | | 70 | |
| | [(1S,2S)-1-methyl-2-(o-tolyl)propyl] (2S)-2-[(4-methoxy-3-propanoyloxy-pyridine-2-carbonyl)amino]propanoate | 0.03 | | 50 | |
| X.02 | [(1S,2S)-1-methyl-2-(o-tolyl)propyl] (2S)-2-[(4-methoxy-3-propanoyloxy-pyridine-2-carbonyl)amino]propanoate | 0.0625 + 0.06 | 25:24 | 100 | 97 |
| X.02 | [(1S,2S)-1-methyl-2-(o-tolyl)propyl] (2S)-2-[(4-methoxy-3-propanoyloxy-pyridine-2-carbonyl)amino]propanoate | 0.03125 + 0.06 | 50:24 | 100 | 76 |
| X.02 | [(1S,2S)-1-methyl-2-(o-tolyl)propyl] (2S)-2-[(4-methoxy-3-propanoyloxy-pyridine-2-carbonyl)amino]propanoate | 0.0625 + 0.03 | 50:24 | 100 | 95 |
| X.02 | [(1S,2S)-1-methyl-2-(o-tolyl)propyl] (2S)-2-[(4-methoxy-3-propanoyloxy-pyridine-2-carbonyl)amino]propanoate | 0.03125 + 0.03 | 25:24 | 100 | 60 |
| X.02 | Florylpicoxamid | 0.0625 + 0.02 | 25:8 | 100 | 99 |
| X.02 | Florylpicoxamid | 0.03125 + 0.02 | 25:16 | 100 | 92 |
| X.02 | Florylpicoxamid | 0.0625 + 0.01 | 25:4 | 100 | 97 |
| X.02 | Florylpicoxamid | 0.03125 + 0.01 | 25:8 | 90 | 76 |
| X.04 | | 0.025 | | 70 | |
| X.04 | | 0.0125 | | 20 | |
| X.04 | | 0.00625 | | 0 | |
| X.04 | [(1S,2S)-1-methyl-2-(o-tolyl)propyl] (2S)-2-[(4-methoxy-3-propanoyloxy-pyridine-2-carbonyl)amino]propanoate | 0.025 + 0.06 | 5:12 | 100 | 91 |

TABLE C2-5-continued

| Component A | Component B | Conc. (ppm) (A:B) | Ratio A:B | Activity (%) | COLBY (expected activity %) |
|---|---|---|---|---|---|
| X.04 | [(1S,2S)-1-methyl-2-(o-tolyl)propyl] (2S)-2-[(4-methoxy-3-propanoyloxy-pyridine-2-carbonyl)amino]propanoate | 0.0125 + 0.06 | 5:24 | 100 | 76 |
| X.04 | [(1S,2S)-1-methyl-2-(o-tolyl)propyl] (2S)-2-[(4-methoxy-3-propanoyloxy-pyridine-2-carbonyl)amino]propanoate | 0.00625 + 0.06 | 5:48 | 90 | 70 |
| X.04 | [(1S,2S)-1-methyl-2-(o-tolyl)propyl] (2S)-2-[(4-methoxy-3-propanoyloxy-pyridine-2-carbonyl)amino]propanoate | 0.025 + 0.03 | 10:12 | 100 | 85 |
| X.04 | [(1S,2S)-1-methyl-2-(o-tolyl)propyl] (2S)-2-[(4-methoxy-3-propanoyloxy-pyridine-2-carbonyl)amino]propanoate | 0.0125 + 0.03 | 10:24 | 90 | 60 |
| X.04 | [(1S,2S)-1-methyl-2-(o-tolyl)propyl] (2S)-2-[(4-methoxy-3-propanoyloxy-pyridine-2-carbonyl)amino]propanoate | 0.00625 + 0.03 | 10:48 | 70 | 50 |
| | N-(2-fluorophenyl)-4-[5-(trifluoromethyl)-1,2,4-oxadiazol-3-yl]benzamide | 20 | | 0 | |
| | N-(2-fluorophenyl)-4-[5-(trifluoromethyl)-1,2,4-oxadiazol-3-yl]benzamide | 10 | | 0 | |
| X.04 | N-(2-fluorophenyl)-4-[5-(trifluoromethyl)-1,2,4-oxadiazol-3-yl]benzamide | 0.025 + 20 | 1:800 | 90 | 70 |
| X.04 | N-(2-fluorophenyl)-4-[5-(trifluoromethyl)-1,2,4-oxadiazol-3-yl]benzamide | 0.025 + 10 | 1:400 | 90 | 70 |
| | Florylpicoxamid | 0.02 | | 90 | |
| | Florylpicoxamid | 0.01 | | 70 | |
| X.04 | Florylpicoxamid | 0.025 + 0.02 | 5:4 | 100 | 97 |
| X.04 | Florylpicoxamid | 0.0125 + 0.02 | 5:8 | 90 | 92 |
| X.04 | Florylpicoxamid | 0.006125 + 0.02 | 5:16 | 90 | 90 |
| X.04 | Florylpicoxamid | 0.025 + 0.01 | 5:2 | 100 | 91 |

Example C3—Fungicidal Activity Against *Septoria glycines* (Brown Spot)

Conidia of the fungus harvested from a fresh culture grown on artificial media, were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs.

The following compound mixtures gave at least 80% control *Septoria glycines* at rates cited in the table when compared to untreated control under the same conditions, which showed extensive disease development:

TABLE C3-1

Fungicidal activity >80% (% of untreated) against *Septoria glycines*

| Component A | Component B | Ratio A:B | Conc. (ppm) (A:B) |
|---|---|---|---|
| X.02 | chlorothalonil | 1:1 | 0.1 + 0.1 |
| X.02 | chlorothalonil | 1:3 | 0.1 + 0.3 |
| X.02 | chlorothalonil | 1:10 | 0.03 + 0.3 |
| X.02 | mancozeb | 1:1 | 0.1 + 0.1 |
| X.02 | mancozeb | 1:3 | 0.1 + 0.3 |
| X.02 | propiconazole | 1:1 | 0.1 + 0.1 |
| X.02 | propiconazole | 1:3 | 0.1 + 0.3 |
| X.02 | propiconazole | 3:10 | 0.03 + 0.1 |
| X.02 | propiconazole | 1:10 | 0.03 + 0.3 |
| X.02 | fenpropimorph | 1:1 | 0.1 + 0.1 |
| X.02 | fenpropimorph | 1:3 | 0.1 + 0.3 |

TABLE C3-1-continued

| Fungicidal activity >80% (% of untreated) against *Septoria glycines* | | | |
|---|---|---|---|
| Component A | Component B | Ratio A:B | Conc. (ppm) (A:B) |
| X.02 | fenpropimorph | 3:10 | 0.03 + 0.1 |
| X.02 | fenpropimorph | 1:10 | 0.03 + 0.3 |
| X.02 | fenpropidin | 1:1 | 0.1 + 0.1 |
| X.02 | fenpropidin | 1:3 | 0.1 + 0.3 |
| X.02 | hexaconazole | 1:1 | 0.1 + 0.1 |
| X.02 | hexaconazole | 1:3 | 0.1 + 0.3 |
| X.02 | hexaconazole | 3:10 | 0.03 + 0.1 |
| X.02 | hexaconazole | 1:10 | 0.03 + 0.3 |
| X.02 | paclobutrazol | 1:1 | 0.1 + 0.1 |
| X.02 | paclobutrazol | 1:3 | 0.1 + 0.3 |
| X.02 | trinexapac-ethyl | 1:3 | 0.1 + 0.3 |
| X.02 | flutriafol | 1:1 | 0.1 + 0.1 |
| X.02 | flutriafol | 1:3 | 0.1 + 0.3 |
| X.02 | flutriafol | 1:10 | 0.03 + 0.3 |
| X.02 | difenoconazole | 1:1 | 0.1 + 0.1 |
| X.02 | difenoconazole | 1:3 | 0.1 + 0.3 |
| X.02 | difenoconazole | 3:10 | 0.03 + 0.1 |
| X.02 | difenoconazole | 1:10 | 0.03 + 0.3 |
| X.02 | fludioxonil | 1:1 | 0.1 + 0.1 |
| X.02 | fludioxonil | 1:3 | 0.1 + 0.3 |
| X.02 | cyproconazole | 1:1 | 0.1 + 0.1 |
| X.02 | cyproconazole | 1:3 | 0.1 + 0.3 |
| X.02 | cyproconazole | 1:10 | 0.03 + 0.3 |
| X.02 | trifloxystrobin | 1:1 | 0.1 + 0.1 |
| X.02 | trifloxystrobin | 1:3 | 0.1 + 0.3 |
| X.02 | trifloxystrobin | 3:10 | 0.03 + 0.1 |
| X.02 | trifloxystrobin | 1:10 | 0.03 + 0.3 |
| X.02 | folpet | 1:1 | 0.1 + 0.1 |
| X.02 | folpet | 1:3 | 0.1 + 0.3 |
| X.02 | azoxystrobin | 1:1 | 0.1 + 0.1 |
| X.02 | azoxystrobin | 1:3 | 0.1 + 0.3 |
| X.02 | azoxystrobin | 3:10 | 0.03 + 0.1 |
| X.02 | azoxystrobin | 1:10 | 0.03 + 0.3 |
| X.02 | pyraclostrobin | 1:1 | 0.1 + 0.1 |
| X.02 | pyraclostrobin | 1:3 | 0.1 + 0.3 |
| X.02 | pyraclostrobin | 3:10 | 0.03 + 0.1 |
| X.02 | pyraclostrobin | 1:10 | 0.03 + 0.3 |
| X.02 | picoxystrobin | 1:1 | 0.1 + 0.1 |
| X.02 | picoxystrobin | 1:3 | 0.1 + 0.3 |
| X.02 | picoxystrobin | 3:10 | 0.03 + 0.1 |
| X.02 | picoxystrobin | 1:10 | 0.03 + 0.3 |
| X.02 | sulphur | 1:3 | 0.1 + 0.3 |
| X.02 | tebuconazole | 1:1 | 0.1 + 0.1 |
| X.02 | tebuconazole | 1:3 | 0.1 + 0.3 |
| X.02 | tebuconazole | 3:10 | 0.03 + 0.1 |
| X.02 | tebuconazole | 1:10 | 0.03 + 0.3 |
| X.02 | prothioconazole | 1:1 | 0.1 + 0.1 |
| X.02 | prothioconazole | 1:3 | 0.1 + 0.3 |
| X.02 | prothioconazole | 3:10 | 0.03 + 0.1 |
| X.02 | prothioconazole | 1:10 | 0.03 + 0.3 |
| X.02 | fluopyram | 1:1 | 0.1 + 0.1 |
| X.02 | fluopyram | 1:3 | 0.1 + 0.3 |
| X.02 | benzovindiflupyr | 1:1 | 0.1 + 0.1 |
| X.02 | benzovindiflupyr | 1:3 | 0.1 + 0.3 |
| X.02 | benzovindiflupyr | 3:10 | 0.03 + 0.1 |
| X.02 | benzovindiflupyr | 1:10 | 0.03 + 0.3 |
| X.02 | isopyrazam | 1:1 | 0.1 + 0.1 |
| X.02 | isopyrazam | 1:3 | 0.1 + 0.3 |
| X.02 | isopyrazam | 3:10 | 0.03 + 0.1 |
| X.02 | isopyrazam | 1:10 | 0.03 + 0.3 |
| X.02 | pydiflumetofen | 1:1 | 0.1 + 0.1 |
| X.02 | pydiflumetofen | 1:3 | 0.1 + 0.3 |
| X.02 | pydiflumetofen | 3:10 | 0.03 + 0.1 |
| X.02 | pydiflumetofen | 1:10 | 0.03 + 0.3 |
| X.02 | fluxapyroxad | 1:1 | 0.1 + 0.1 |
| X.02 | fluxapyroxad | 1:3 | 0.1 + 0.3 |
| X.02 | fluxapyroxad | 3:10 | 0.03 + 0.1 |
| X.02 | fluxapyroxad | 1:10 | 0.03 + 0.3 |
| X.02 | isoflucypram | 1:1 | 0.1 + 0.1 |
| X.02 | isoflucypram | 1:3 | 0.1 + 0.3 |
| X.02 | isoflucypram | 3:10 | 0.03 + 0.1 |
| X.02 | isoflucypram | 1:10 | 0.03 + 0.3 |
| X.02 | mefentrifluconazole | 1:1 | 0.1 + 0.1 |
| X.02 | mefentrifluconazole | 1:3 | 0.1 + 0.3 |

TABLE C3-1-continued

| Component A | Component B | Ratio A:B | Conc. (ppm) (A:B) |
|---|---|---|---|
| Fungicidal activity >80% (% of untreated) against *Septoria glycines* | | | |
| X.02 | mefentrifluconazole | 3:10 | 0.03 + 0.1 |
| X.02 | mefentrifluconazole | 1:10 | 0.03 + 0.3 |
| X.02 | ipflufenoquin | 1:1 | 0.1 + 0.1 |
| X.02 | ipflufenoquin | 1:3 | 0.1 + 0.3 |
| X.02 | ipflufenoquin | 3:10 | 0.03 + 0.1 |
| X.02 | ipflufenoquin | 1:10 | 0.03 + 0.3 |
| X.02 | metyltetraprole | 1:1 | 0.1 + 0.1 |
| X.02 | metyltetraprole | 1:3 | 0.1 + 0.3 |
| X.02 | metyltetraprole | 3:10 | 0.03 + 0.1 |
| X.02 | metyltetraprole | 1:10 | 0.03 + 0.3 |
| X.02 | aminopyrifen | 1:1 | 0.1 + 0.1 |
| X.02 | aminopyrifen | 1:3 | 0.1 + 0.3 |
| X.02 | aminopyrifen | 3:10 | 0.03 + 0.1 |
| X.02 | aminopyrifen | 1:10 | 0.03 + 0.3 |
| X.02 | florylpicoxamid | 1:1 | 0.1 + 0.1 |
| X.02 | florylpicoxamid | 1:3 | 0.1 + 0.3 |
| X.02 | florylpicoxamid | 3:10 | 0.03 + 0.1 |
| X.02 | florylpicoxamid | 1:10 | 0.03 + 0.3 |
| X.02 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.02 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.02 | 2-[6-(4-bromophenoxy)-2-(trifluoromethyl)-3-pyridyl]-1-(1,2,4-triazol-1-yl)propan-2-ol | 3:10 | 0.03 + 0.1 |
| X.02 | 2-[6-(4-bromophenoxy)-2-(trifluoromethyl)-3-pyridyl]-1-(1,2,4-triazol-1-yl)propan-2-ol | 1:10 | 0.03 + 0.3 |
| X.02 | fenpicoxamid | 1:1 | 0.1 + 0.1 |
| X.02 | fenpicoxamid | 1:3 | 0.1 + 0.3 |
| X.02 | fenpicoxamid | 3:10 | 0.03 + 0.1 |
| X.02 | fenpicoxamid | 1:10 | 0.03 + 0.3 |
| X.02 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.02 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.02 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.02 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |
| X.02 | [(1S,2S)-1-methyl-2-(o-tolyl)propyl] (2S)-2-[(4-methoxy-3-propanoyloxy-pyridine-2-carbonyl)amino]propanoate | 50:3 | 1 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:3 | 0.5 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:6 | 0.25 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:12 | 0.125 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:24 | 0.0625 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 25:48 | 0.03125 + 0.06 |
| X.02 | [(1S,2S)-1-methyl-2-(o-tolyl)propyl] (2S)-2-[(4-methoxy-3-propanoyloxy-pyridine-2-carbonyl)amino]propanoate | 100:3 | 1 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:3 | 0.5 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:6 | 0.25 + 0.03 |
| X.02 | [(1 S,2S)-1 -methyl-2-(o-tolyl)propyl] (2S)-2-[(4-methoxy-3-propanoyloxy-pyridine-2-carbonyl)amino]propanoate | 50:12 | 0.125 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:24 | 0.0625 + 0.03 |
| X.02 | [(1S,2S)-1-methyl-2-(o-tolyl)propyl] (2S)-2-[(4-methoxy-3-propanoyloxy-pyridine-2-carbonyl)amino]propanoate | 50:48 | 0.03125 + 0.03 |

TABLE C3-1-continued

Fungicidal activity >80% (% of untreated) against *Septoria glycines*

| Component A | Component B | Ratio A:B | Conc. (ppm) (A:B) |
|---|---|---|---|
| X.02 | N-(2-fluorophenyl)-4-[5-(trifluoromethyl)-1,2,4-oxadiazol-3-yl]benzamide | 1:20 | 1 + 20 |
| X.02 | N-(2-fluorophenyl)-4-[5-(trifluoromethyl)-1,2,4-oxadiazol-3-yl]benzamide | 1:40 | 0.5 + 20 |
| X.02 | N-(2-fluorophenyl)-4-[5-(trifluoromethyl)-1,2,4-oxadiazol-3-yl]benzamide | 1:80 | 0.25 + 20 |
| X.02 | N-(2-fluorophenyl)-4-[5-(trifluoromethyl)-1,2,4-oxadiazol-3-yl]benzamide | 1:160 | 0.125 + 20 |
| X.02 | N-(2-fluorophenyl)-4-[5-(trifluoromethyl)-1,2,4-oxadiazol-3-yl]benzamide | 1:320 | 0.0625 + 20 |
| X.02 | N-(2-fluorophenyl)-4-[5-(trifluoromethyl)-1,2,4-oxadiazol-3-yl] benzamide | 1:10 | 1 + 10 |
| X.02 | N-(2-fluorophenyl)-4-[5-(trifluoromethyl)-1,2,4-oxadiazol-3-yl]benzamide | 1:20 | 0.5 + 10 |
| X.02 | N-(2-fluorophenyl)-4-[5-(trifluoromethyl)-1,2,4-oxadiazol-3-yl]benzamide | 1:40 | 0.25 + 10 |
| X.02 | N-(2-fluorophenyl)-4-[5-(trifluoromethyl)-1,2,4-oxadiazol-3-yl]benzamide | 1:80 | 0.125 + 10 |
| X.02 | N-(2-fluorophenyl)-4-[5-(trifluoromethyl)-1,2,4-oxadiazol-3-yl]benzamide | 1:160 | 0.0625 + 10 |
| X.02 | Florylpicoxamid | 50:1 | 1 + 0.02 |
| X.02 | Florylpicoxamid | 25:1 | 0.5 + 0.02 |
| X.02 | Florylpicoxamid | 25:2 | 0.25 + 0.02 |
| X.02 | Florylpicoxamid | 25:4 | 0.125 + 0.02 |
| X.02 | Florylpicoxamid | 25:8 | 0.0625 + 0.02 |
| X.02 | Florylpicoxamid | 25:16 | 0.03125 + 0.02 |
| X.02 | Florylpicoxamid | 100:1 | 1 + 0.01 |
| X.02 | Florylpicoxamid | 50:1 | 0.5 + 0.01 |
| X.02 | Florylpicoxamid | 25:1 | 0.25 + 0.01 |
| X.02 | Florylpicoxamid | 25:2 | 0.125 + 0.01 |
| X.02 | Florylpicoxamid | 25:4 | 0.0625 + 0.01 |
| X.02 | Florylpicoxamid | 25:8 | 0.03125 + 0.01 |

TABLE C3-2

Fungicidal activity >80% (% of untreated) against *Septoria glycines*

| Component A | Component B | Ratio A:B | Conc. (ppm) (A:B) |
|---|---|---|---|
| X.04 | glyphosate | 1:1 | 0.1 + 0.1 |
| X.04 | glyphosate | 1:3 | 0.1 + 0.3 |
| X.04 | chlorothalonil | 1:1 | 0.1 + 0.1 |
| X.04 | chlorothalonil | 1:3 | 0.1 + 0.3 |
| X.04 | chlorothalonil | 1:10 | 0.03 + 0.3 |
| X.04 | mancozeb | 1:1 | 0.1 + 0.1 |
| X.04 | mancozeb | 1:3 | 0.1 + 0.3 |
| X.04 | 2,4-D | 1:1 | 0.1 + 0.1 |
| X.04 | 2,4-D | 1:3 | 0.1 + 0.3 |
| X.04 | propiconazole | 1:1 | 0.1 + 0.1 |
| X.04 | propiconazole | 1:3 | 0.1 + 0.3 |
| X.04 | propiconazole | 3:10 | 0.03 + 0.1 |
| X.04 | propiconazole | 1:10 | 0.03 + 0.3 |
| X.04 | disodium phosphonate | 1:1 | 0.1 + 0.1 |
| X.04 | disodium phosphonate | 1:3 | 0.1 + 0.3 |
| X.04 | fenpropimorph | 1:1 | 0.1 + 0.1 |
| X.04 | fenpropimorph | 1:3 | 0.1 + 0.3 |
| X.04 | fenpropimorph | 3:10 | 0.03 + 0.1 |
| X.04 | fenpropimorph | 1:10 | 0.03 + 0.3 |
| X.04 | fenpropidin | 1:1 | 0.1 + 0.1 |
| X.04 | fenpropidin | 1:3 | 0.1 + 0.3 |
| X.04 | fenpropidin | 3:10 | 0.03 + 0.1 |
| X.04 | fenpropidin | 1:10 | 0.03 + 0.3 |
| X.04 | hexaconazole | 1:1 | 0.1 + 0.1 |
| X.04 | hexaconazole | 1:3 | 0.1 + 0.3 |
| X.04 | hexaconazole | 3:10 | 0.03 + 0.1 |
| X.04 | hexaconazole | 1:10 | 0.03 + 0.3 |
| X.04 | paclobutrazol | 1:1 | 0.1 + 0.1 |
| X.04 | paclobutrazol | 1:3 | 0.1 + 0.3 |
| X.04 | paclobutrazol | 1:10 | 0.03 + 0.3 |

TABLE C3-2-continued

Fungicidal activity >80% (% of untreated) against *Septoria glycines*

| Component A | Component B | Ratio A:B | Conc. (ppm) (A:B) |
|---|---|---|---|
| X.04 | trinexapac-ethyl | 1:1 | 0.1 + 0.1 |
| X.04 | trinexapac-ethyl | 1:3 | 0.1 + 0.3 |
| X.04 | flutriafol | 1:1 | 0.1 + 0.1 |
| X.04 | flutriafol | 1:3 | 0.1 + 0.3 |
| X.04 | flutriafol | 3:10 | 0.03 + 0.1 |
| X.04 | flutriafol | 1:10 | 0.03 + 0.3 |
| X.04 | difenoconazole | 1:1 | 0.1 + 0.1 |
| X.04 | difenoconazole | 1:3 | 0.1 + 0.3 |
| X.04 | difenoconazole | 3:10 | 0.03 + 0.1 |
| X.04 | difenoconazole | 1:10 | 0.03 + 0.3 |
| X.04 | fludioxonil | 1:1 | 0.1 + 0.1 |
| X.04 | fludioxonil | 1:3 | 0.1 + 0.3 |
| X.04 | fludioxonil | 3:10 | 0.03 + 0.1 |
| X.04 | fludioxonil | 1:10 | 0.03 + 0.3 |
| X.04 | cyproconazole | 1:1 | 0.1 + 0.1 |
| X.04 | cyproconazole | 1:3 | 0.1 + 0.3 |
| X.04 | cyproconazole | 3:10 | 0.03 + 0.1 |
| X.04 | cyproconazole | 1:10 | 0.03 + 0.3 |
| X.04 | acibenzolar S-methyl | 1:1 | 0.1 + 0.1 |
| X.04 | acibenzolar S-methyl | 1:3 | 0.1 + 0.3 |
| X.04 | trifloxystrobin | 1:1 | 0.1 + 0.1 |
| X.04 | trifloxystrobin | 1:3 | 0.1 + 0.3 |
| X.04 | trifloxystrobin | 3:10 | 0.03 + 0.1 |
| X.04 | trifloxystrobin | 1:10 | 0.03 + 0.3 |
| X.04 | folpet | 1:1 | 0.1 + 0.1 |
| X.04 | folpet | 1:3 | 0.1 + 0.3 |
| X.04 | folpet | 3:10 | 0.03 + 0.1 |
| X.04 | folpet | 1:10 | 0.03 + 0.3 |
| X.04 | azoxystrobin | 1:1 | 0.1 + 0.1 |
| X.04 | azoxystrobin | 1:3 | 0.1 + 0.3 |
| X.04 | azoxystrobin | 3:10 | 0.03 + 0.1 |
| X.04 | azoxystrobin | 1:10 | 0.03 + 0.3 |
| X.04 | pyraclostrobin | 1:1 | 0.1 + 0.1 |
| X.04 | pyraclostrobin | 1:3 | 0.1 + 0.3 |
| X.04 | pyraclostrobin | 3:10 | 0.03 + 0.1 |
| X.04 | pyraclostrobin | 1:10 | 0.03 + 0.3 |
| X.04 | picoxystrobin | 1:1 | 0.1 + 0.1 |
| X.04 | picoxystrobin | 1:3 | 0.1 + 0.3 |
| X.04 | picoxystrobin | 3:10 | 0.03 + 0.1 |
| X.04 | picoxystrobin | 1:10 | 0.03 + 0.3 |
| X.04 | sulphur | 1:1 | 0.1 + 0.1 |
| X.04 | sulphur | 1:3 | 0.1 + 0.3 |
| X.04 | tebuconazole | 1:1 | 0.1 + 0.1 |
| X.04 | tebuconazole | 1:3 | 0.1 + 0.3 |
| X.04 | tebuconazole | 3:10 | 0.03 + 0.1 |
| X.04 | tebuconazole | 1:10 | 0.03 + 0.3 |
| X.04 | prothioconazole | 1:1 | 0.1 + 0.1 |
| X.04 | prothioconazole | 1:3 | 0.1 + 0.3 |
| X.04 | prothioconazole | 3:10 | 0.03 + 0.1 |
| X.04 | prothioconazole | 1:10 | 0.03 + 0.3 |
| X.04 | fluopyram | 1:1 | 0.1 + 0.1 |
| X.04 | fluopyram | 1:3 | 0.1 + 0.3 |
| X.04 | fluopyram | 1:10 | 0.03 + 0.3 |
| X.04 | copper oxychloride | 1:1 | 0.1 + 0.1 |
| X.04 | copper oxychloride | 1:3 | 0.1 + 0.3 |
| X.04 | benzovindiflupyr | 1:1 | 0.1 + 0.1 |
| X.04 | benzovindiflupyr | 1:3 | 0.1 + 0.3 |
| X.04 | benzovindiflupyr | 3:10 | 0.03 + 0.1 |
| X.04 | benzovindiflupyr | 1:10 | 0.03 + 0.3 |
| X.04 | isopyrazam | 1:1 | 0.1 + 0.1 |
| X.04 | isopyrazam | 1:3 | 0.1 + 0.3 |
| X.04 | isopyrazam | 3:10 | 0.03 + 0.1 |
| X.04 | isopyrazam | 1:10 | 0.03 + 0.3 |
| X.04 | pydiflumetofen | 1:1 | 0.1 + 0.1 |
| X.04 | pydiflumetofen | 1:3 | 0.1 + 0.3 |
| X.04 | pydiflumetofen | 3:10 | 0.03 + 0.1 |
| X.04 | pydiflumetofen | 1:10 | 0.03 + 0.3 |
| X.04 | fluxapyroxad | 1:1 | 0.1 + 0.1 |
| X.04 | fluxapyroxad | 1:3 | 0.1 + 0.3 |
| X.04 | fluxapyroxad | 3:10 | 0.03 + 0.1 |
| X.04 | fluxapyroxad | 1:10 | 0.03 + 0.3 |
| X.04 | quinofumelin | 1:1 | 0.1 + 0.1 |
| X.04 | quinofumelin | 1:3 | 0.1 + 0.3 |
| X.04 | isoflucypram | 1:1 | 0.1 + 0.1 |

TABLE C3-2-continued

| Fungicidal activity >80% (% of untreated) against *Septoria glycines* | | | |
|---|---|---|---|
| Component A | Component B | Ratio A:B | Conc. (ppm) (A:B) |
| X.04 | isoflucypram | 1:3 | 0.1 + 0.3 |
| X.04 | isoflucypram | 3:10 | 0.03 + 0.1 |
| X.04 | isoflucypram | 1:10 | 0.03 + 0.3 |
| X.04 | mefentrifluconazole | 1:1 | 0.1 + 0.1 |
| X.04 | mefentrifluconazole | 1:3 | 0.1 + 0.3 |
| X.04 | mefentrifluconazole | 3:10 | 0.03 + 0.1 |
| X.04 | mefentrifluconazole | 1:10 | 0.03 + 0.3 |
| X.04 | ipflufenoquin | 1:1 | 0.1 + 0.1 |
| X.04 | ipflufenoquin | 1:3 | 0.1 + 0.3 |
| X.04 | ipflufenoquin | 3:10 | 0.03 + 0.1 |
| X.04 | ipflufenoquin | 1:10 | 0.03 + 0.3 |
| X.04 | metyltetraprole | 1:1 | 0.1 + 0.1 |
| X.04 | metyltetraprole | 1:3 | 0.1 + 0.3 |
| X.04 | metyltetraprole | 3:10 | 0.03 + 0.1 |
| X.04 | metyltetraprole | 1:10 | 0.03 + 0.3 |
| X.04 | aminopyrifen | 1:1 | 0.1 + 0.1 |
| X.04 | aminopyrifen | 1:3 | 0.1 + 0.3 |
| X.04 | aminopyrifen | 3:10 | 0.03 + 0.1 |
| X.04 | aminopyrifen | 1:10 | 0.03 + 0.3 |
| X.04 | florylpicoxamid | 1:1 | 0.1 + 0.1 |
| X.04 | florylpicoxamid | 1:3 | 0.1 + 0.3 |
| X.04 | florylpicoxamid | 3:10 | 0.03 + 0.1 |
| X.04 | florylpicoxamid | 1:10 | 0.03 + 0.3 |
| X.04 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.04 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.04 | 2-[6-(4-bromophenoxy)-2-(trifluoromethyl)-3-pyridyl]-1-(1,2,4-triazol-1-yl)propan-2-ol | 3:10 | 0.03 + 0.1 |
| X.04 | 2-[6-(4-bromophenoxy)-2-(trifluoromethyl)-3-pyridyl]-1-(1,2,4-triazol-1-yl)propan-2-ol | 1:10 | 0.03 + 0.3 |
| X.04 | fenpicoxamid | 1:1 | 0.1 + 0.1 |
| X.04 | fenpicoxamid | 1:3 | 0.1 + 0.3 |
| X.04 | fenpicoxamid | 3:10 | 0.03 + 0.1 |
| X.04 | fenpicoxamid | 1:10 | 0.03 + 0.3 |
| X.04 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.04 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.04 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.04 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |
| X.04 | [(1S,2S)-1-methyl-2-(o-tolyl)propyl] (2S)-2-[(4-methoxy-3-propanoyloxy-pyridine-2-carbonyl)amino]propanoate | 10:3 | 0.2 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:3 | 0.1 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:6 | 0.05 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:12 | 0.025 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 5:24 | 0.0125 + 0.06 |
| X.04 | [(1S,2S)-1-methyl-2-(o-tolyl)propyl] (2S)-2-[(4-methoxy-3-propanoyloxy-pyridine-2-carbonyl)amino]propanoate | 20:3 | 0.2 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:3 | 0.1 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:6 | 0.05 + 0.03 |
| X.04 | [(1S,2S)-1-methyl-2-(o-tolyl)propyl] (2S)-2-[(4-methoxy-3-propanoyloxy-pyridine-2-carbonyl)amino]propanoate | 10:12 | 0.025 + 0.03 |
| X.04 | N-(2-fluorophenyl)-4-[5-(trifluoromethyl)-1,2,4-oxadiazol-3-yl]benzamide | 1:100 | 0.2 + 20 |
| X.04 | N-(2-fluorophenyl)-4-[5-(trifluoromethyl)-1,2,4-oxadiazol-3-yl]benzamide | 1:200 | 0.1 + 20 |

TABLE C3-2-continued

| Fungicidal activity >80% (% of untreated) against *Septoria glycines* | | | |
|---|---|---|---|
| Component A | Component B | Ratio A:B | Conc. (ppm) (A:B) |
| X.04 | N-(2-fluorophenyl)-4-[5-(trifluoromethyl)-1,2,4-oxadiazol-3-yl]benzamide | 1:400 | 0.05 + 20 |
| X.04 | N-(2-fluorophenyl)-4-[5-(trifluoromethyl)-1,2,4-oxadiazol-3-yl]benzamide | 1:800 | 0.025 + 20 |
| X.04 | N-(2-fluorophenyl)-4-[5-(trifluoromethyl)-1,2,4-oxadiazol-3-yl]benzamide | 1:50 | 0.2 + 10 |
| X.04 | N-(2-fluorophenyl)-4-[5-(trifluoromethyl)-1,2,4-oxadiazol-3-yl]benzamide | 1:100 | 0.1 + 10 |
| X.04 | N-(2-fluorophenyl)-4-[5-(trifluoromethyl)-1,2,4-oxadiazol-3-yl]benzamide | 1:200 | 0.05 + 10 |
| X.04 | N-(2-fluorophenyl)-4-[5-(trifluoromethyl)-1,2,4-oxadiazol-3-yl]benzamide | 1:400 | 0.025 + 10 |
| X.04 | Florylpicoxamid | 10:1 | 0.2 + 0.02 |
| X.04 | Florylpicoxamid | 5:1 | 0.1 + 0.02 |
| X.04 | Florylpicoxamid | 5:2 | 0.05 + 0.02 |
| X.04 | Florylpicoxamid | 5:4 | 0.025 + 0.02 |
| X.04 | Florylpicoxamid | 5:8 | 0.0125 + 0.02 |
| X.04 | Florylpicoxamid | 20:1 | 0.2 + 0.01 |
| X.04 | Florylpicoxamid | 10:1 | 0.1 + 0.01 |
| X.04 | Florylpicoxamid | 5:1 | 0.05 + 0.01 |
| X.04 | Florylpicoxamid | 5:2 | 0.025 + 0.01 |
| X.04 | Florylpicoxamid | 5:4 | 0.0125 + 0.01 |

The following mixture compositions at the reported concentration (in ppm) in tables C3-3 to C3-5 gave the following disease control in this test *Septoria glycines* (brown spot). Fungicidal activity was evaluated on a 100-0 scale (100=no disease growth; 0=well completely covered by mycelium).

TABLE C3-3

| Component A | Component B | Conc. (ppm) (A:B) | Ratio A:B | Activity (%) | COLBY (expected activity %) |
|---|---|---|---|---|---|
| X.02 | | 0.1 | | 70 | |
| X.02 | | 0.03 | | 50 | |
| | chlorothalonil | 0.1 | | 0 | |
| | chlorothalonil | 0.3 | | 20 | |
| X.02 | chlorothalonil | 0.1 + 0.1 | 1:1 | 90 | 70 |
| X.02 | chlorothalonil | 0.1 + 0.3 | 1:3 | 100 | 76 |
| X.02 | chlorothalonil | 0.03 + 0.3 | 1:10 | 100 | 60 |
| | mancozeb | 0.1 | | 0 | |
| | mancozeb | 0.3 | | 0 | |
| X.02 | mancozeb | 0.1 + 0.1 | 1:1 | 90 | 70 |
| X.02 | mancozeb | 0.1 + 0.3 | 1:3 | 90 | 70 |
| | fenpropimorph | 0.1 | | 50 | |
| | fenpropimorph | 0.3 | | 70 | |
| X.02 | fenpropimorph | 0.1 + 0.1 | 1:1 | 100 | 85 |
| X.02 | fenpropimorph | 0.1 + 0.3 | 1:3 | 100 | 91 |
| X.02 | fenpropimorph | 0.03 + 0.1 | 3:10 | 100 | 75 |
| X.02 | fenpropimorph | 0.03 + 0.3 | 1:10 | 100 | 85 |
| | fenpropidin | 0.1 | | 0 | |
| | fenpropidin | 0.3 | | 50 | |
| X.02 | fenpropidin | 0.1 + 0.1 | 1:1 | 90 | 70 |
| X.02 | fenpropidin | 0.1 + 0.3 | 1:3 | 100 | 85 |
| | paclobutrazol | 0.1 | | 0 | |
| | paclobutrazol | 0.3 | | 50 | |
| X.02 | paclobutrazol | 0.1 + 0.1 | 1:1 | 90 | 70 |
| X.02 | paclobutrazol | 0.1 + 0.3 | 1:3 | 90 | 85 |
| | trinexapac-ethyl | 0.3 | | 0 | |
| X.02 | trinexapac-ethyl | 0.1 + 0.3 | 1:3 | 90 | 70 |
| | flutriafol | 0.1 | | 20 | |
| | flutriafol | 0.3 | | 70 | |
| X.02 | flutriafol | 0.1 + 0.1 | 1:1 | 100 | 76 |
| X.02 | flutriafol | 0.1 + 0.3 | 1:3 | 100 | 91 |
| X.02 | flutriafol | 0.03 + 0.1 | 3:10 | 70 | 60 |
| X.02 | flutriafol | 0.03 + 0.3 | 1:10 | 100 | 85 |
| | fludioxonil | 0.1 | | 0 | |
| | fludioxonil | 0.3 | | 20 | |
| X.02 | fludioxonil | 0.1 + 0.1 | 1:1 | 90 | 70 |
| X.02 | fludioxonil | 0.1 + 0.3 | 1:3 | 100 | 76 |
| | cyproconazole | 0.1 | | 20 | |

TABLE C3-3-continued

| Component A | Component B | Conc. (ppm) (A:B) | Ratio A:B | Activity (%) | COLBY (expected activity %) |
|---|---|---|---|---|---|
| X.02 | cyproconazole | 0.1 + 0.1 | 1:1 | 100 | 76 |
| X.02 | cyproconazole | 0.03 + 0.1 | 3:10 | 70 | 60 |
| | folpet | 0.1 | | 0 | |
| | folpet | 0.3 | | 0 | |
| X.02 | folpet | 0.1 + 0.1 | 1:1 | 90 | 70 |
| X.02 | folpet | 0.1 + 0.3 | 1:3 | 100 | 70 |
| | sulphur | 0.3 | | 0 | |
| X.02 | sulphur | 0.1 + 0.3 | 1:3 | 90 | 70 |
| | tebuconazole | 0.1 | | 70 | |
| X.02 | tebuconazole | 0.1 + 0.1 | 1:1 | 100 | 91 |
| X.02 | tebuconazole | 0.03 + 0.1 | 3:10 | 100 | 85 |
| | fluopyram | 0.1 | | 0 | |
| | fluopyram | 0.3 | | 50 | |
| X.02 | fluopyram | 0.1 + 0.1 | 1:1 | 90 | 70 |
| X.02 | fluopyram | 0.1 + 0.3 | 1:3 | 100 | 85 |
| | benzovindiflupyr | 0.1 | | 70 | |
| X.02 | benzovindiflupyr | 0.1 + 0.1 | 1:1 | 100 | 91 |
| X.02 | benzovindiflupyr | 0.03 + 0.1 | 3:10 | 90 | 85 |
| | isopyrazam | 0.1 | | 70 | |
| | isopyrazam | 0.3 | | 70 | |
| X.02 | isopyrazam | 0.1 + 0.1 | 1:1 | 100 | 91 |
| X.02 | isopyrazam | 0.1 + 0.3 | 1:3 | 100 | 91 |
| X.02 | isopyrazam | 0.03 + 0.1 | 3:10 | 100 | 85 |
| X.02 | isopyrazam | 0.03 + 0.3 | 1:10 | 100 | 85 |
| | fluxapyroxad | 0.1 | | 50 | |
| | fluxapyroxad | 0.3 | | 70 | |
| X.02 | fluxapyroxad | 0.1 + 0.1 | 1:1 | 100 | 85 |
| X.02 | fluxapyroxad | 0.1 + 0.3 | 1:3 | 100 | 91 |
| X.02 | fluxapyroxad | 0.03 + 0.1 | 3:10 | 90 | 75 |
| X.02 | fluxapyroxad | 0.03 + 0.3 | 1:10 | 90 | 85 |
| | ipflufenoquin | 0.1 | | 0 | |
| | ipflufenoquin | 0.3 | | 20 | |
| X.02 | ipflufenoquin | 0.1 + 0.1 | 1:1 | 100 | 70 |
| X.02 | ipflufenoquin | 0.1 + 0.3 | 1:3 | 100 | 76 |
| X.02 | ipflufenoquin | 0.03 + 0.1 | 3:10 | 100 | 50 |
| X.02 | ipflufenoquin | 0.03 + 0.3 | 1:10 | 100 | 60 |
| | fenpicoxamid | | | | |
| X.02 | fenpicoxamid | 0.1 + 0.1 | 1:1 | 100 | 70 |
| X.02 | fenpicoxamid | 0.03 + 0.1 | 3:10 | 90 | 50 |

TABLE C3-4

| Component A | Component B | Conc. (ppm) (A:B) | Ratio A:B | Activity (%) | COLBY (expected activity %) |
|---|---|---|---|---|---|
| X.04 | | 0.03 | | 70 | |
| | chlorothalonil | 0.3 | | 20 | |
| X.04 | chlorothalonil | 0.03 + 0.3 | 1:10 | 100 | 76 |
| | fenpropimorph | 0.1 | | 50 | |
| | fenpropimorph | 0.3 | | 70 | |
| X.04 | fenpropimorph | 0.03 + 0.1 | 3:10 | 100 | 85 |
| X.04 | fenpropimorph | 0.03 + 0.3 | 1:10 | 100 | 91 |
| | fenpropidin | 0.1 | | 0 | |
| | fenpropidin | 0.3 | | 50 | |
| X.04 | fenpropidin | 0.03 + 0.1 | 3:10 | 90 | 70 |
| X.04 | fenpropidin | 0.03 + 0.3 | 1:10 | 100 | 85 |
| | paclobutrazol | 0.3 | | 50 | |
| X.04 | paclobutrazol | 0.03 + 0.3 | 1:10 | 90 | 85 |
| | flutriafol | 0.1 | | 20 | |
| | | 0.3 | | 70 | |
| X.04 | flutriafol | 0.03 + 0.1 | 3:10 | 90 | 76 |
| X.04 | flutriafol | 0.03 + 0.3 | 1:10 | 100 | 91 |
| | fludioxonil | 0.1 | | 0 | |
| | fludioxonil | 0.3 | | 20 | |
| X.04 | fludioxonil | 0.03 + 0.1 | 3:10 | 90 | 70 |
| X.04 | fludioxonil | 0.03 + 0.3 | 1:10 | 90 | 76 |
| | cyproconazole | 0.1 | | 20 | |
| X.04 | cyproconazole | 0.03 + 0.1 | 3:10 | 90 | 76 |
| | folpet | 0.1 | | 0 | |
| | folpet | 0.3 | | 0 | |

TABLE C3-4-continued

| Component A | Component B | Conc. (ppm) (A:B) | Ratio A:B | Activity (%) | COLBY (expected activity %) |
|---|---|---|---|---|---|
| X.04 | folpet | 0.03 + 0.1 | 3:10 | 90 | 70 |
| X.04 | folpet | 0.03 + 0.3 | 1:10 | 90 | 70 |
| | tebuconazole | 0.1 | | 70 | |
| X.04 | tebuconazole | 0.03 + 0.1 | 3:10 | 100 | 91 |
| | fluopyram | 0.3 | | 50 | |
| X.04 | fluopyram | 0.03 + 0.3 | 1:10 | 90 | 85 |
| | benzovindiflupyr | 0.1 | | 70 | |
| X.04 | benzovindiflupyr | 0.03 + 0.1 | 3:10 | 100 | 91 |
| | isopyrazam | 0.1 | | 70 | |
| | isopyrazam | 0.3 | | 70 | |
| X.04 | isopyrazam | 0.03 + 0.1 | 3:10 | 100 | 91 |
| X.04 | isopyrazam | 0.03 + 0.3 | 1:10 | 100 | 91 |
| | fluxapyroxad | 0.1 | | 50 | |
| | fluxapyroxad | 0.3 | | 70 | |
| X.04 | fluxapyroxad | 0.03 + 0.1 | 3:10 | 100 | 85 |
| X.04 | fluxapyroxad | 0.03 + 0.3 | 1:10 | 100 | 91 |
| | ipflufenoquin | 0.1 | | 0 | |
| | ipflufenoquin | 0.3 | | 20 | |
| X.04 | ipflufenoquin | 0.03 + 0.1 | 3:10 | 100 | 70 |
| X.04 | ipflufenoquin | 0.03 + 0.3 | 1:10 | 100 | 76 |

TABLE C3-5

| Component A | Component B | Conc. (ppm) (A:B) | Ratio A:B | Activity (%) | COLBY (expected activity %) |
|---|---|---|---|---|---|
| X.02 | | 0.03125 | | 70 | |
| | [(1S,2S)-1-methyl-2-(o-tolyl)propyl] (2S)-2-[(4-methoxy-3-propanoyloxy-pyridine-2-carbonyl)amino]propanoate | 0.06 | | 0 | |
| | [(1S,2S)-1-methyl-2-(o-tolyl)propyl] (2S)-2-[(4-methoxy-3-propanoyloxy-pyridine-2-carbonyl)amino]propanoate | 0.03 | | 0 | |
| X.02 | [(1S,2S)-1-methyl-2-(o-tolyl)propyl] (2S)-2-[(4-methoxy-3-propanoyloxy-pyridine-2-carbonyl)amino]propanoate | 0.03125 + 0.06 | 50:24 | 90 | 70 |
| X.02 | [(1S,2S)-1-methyl-2-(o-tolyl)propyl] (2S)-2-[(4-methoxy-3-propanoyloxy-pyridine-2-carbonyl)amino]propanoate | 0.03125 + 0.03 | 25:24 | 90 | 70 |
| X.04 | | 0.025 | | 90 | |
| X.04 | | 0.0125 | | 50 | |
| X.04 | | 0.00625 | | 0 | |
| X.04 | [(1S,2S)-1-methyl-2-(o-tolyl)propyl] (2S)-2-[(4-methoxy-3-propanoyloxy-pyridine-2-carbonyl)amino]propanoate | 0.025 + 0.06 | 5:12 | 100 | 90 |
| X.04 | [(1S,2S)-1-methyl-2-(o-tolyl)propyl] (2S)-2-[(4-methoxy-3-propanoyloxy-pyridine-2-carbonyl)amino]propanoate | 0.0125 + 0.06 | 5:24 | 90 | 50 |
| X.04 | [(1S,2S)-1-methyl-2-(o-tolyl)propyl] (2S)-2-[(4-methoxy-3-propanoyloxy-pyridine-2-carbonyl)amino]propanoate | 0.00625 + 0.06 | 5:48 | 70 | 0 |
| X.04 | [(1S,2S)-1-methyl-2-(o-tolyl)propyl] (2S)-2-[(4-methoxy-3-propanoyloxy-pyridine-2-carbonyl)amino]propanoate | 0.0125 + 0.03 | 10:24 | 70 | 50 |

TABLE C3-5-continued

| Component A | Component B | Conc. (ppm) (A:B) | Ratio A:B | Activity (%) | COLBY (expected activity %) |
|---|---|---|---|---|---|
| X.04 | [(1S,2S)-1-methyl-2-(o-tolyl)propyl] (2S)-2-[(4-methoxy-3-propanoyloxy-pyridine-2-carbonyl)amino]propanoate | 0.00625 + 0.03 | 10:48 | 50 | 0 |
| | Florylpicoxamid | 0.02 | | 0 | |
| | Florylpicoxamid | 0.01 | | 0 | |
| X.04 | Florylpicoxamid | 0.025 + 0.02 | 5:4 | 100 | 90 |
| X.04 | Florylpicoxamid | 0.0125 + 0.02 | 5:8 | 90 | 50 |
| X.04 | Florylpicoxamid | 0.006125 + 0.02 | 5:16 | 70 | 0 |
| X.04 | Florylpicoxamid | 0.025 + 0.01 | 5:2 | 100 | 90 |
| X.04 | Florylpicoxamid | 0.0125 + 0.01 | 5:4 | 90 | 50 |

Example C4—Fungicidal Activity Against *Glomerella lagenarium* syn. *Colletotrichum lagenarium* (Anthracnose)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs at 620 nm.

The following compound mixtures gave at least 80% control *Glomerella lagenarium* at rates cited in the table when compared to untreated control under the same conditions, which showed extensive disease development:

TABLE C4-1

Fungicidal activity >80% (% of untreated) against *Glomerella lagenarium*

| Component A | Component B | Ratio A:B | Conc. (ppm) (A:B) |
|---|---|---|---|
| X.02 | chlorothalonil | 1:1 | 0.1 + 0.1 |
| X.02 | chlorothalonil | 1:3 | 0.1 + 0.3 |
| X.02 | chlorothalonil | 1:10 | 0.03 + 0.3 |
| X.02 | trifloxystrobin | 1:1 | 0.1 + 0.1 |
| X.02 | trifloxystrobin | 1:3 | 0.1 + 0.3 |
| X.02 | trifloxystrobin | 3:10 | 0.03 + 0.1 |
| X.02 | trifloxystrobin | 1:10 | 0.03 + 0.3 |
| X.02 | folpet | 1:3 | 0.1 + 0.3 |
| X.02 | folpet | 1:10 | 0.03 + 0.3 |
| X.02 | azoxystrobin | 1:1 | 0.1 + 0.1 |
| X.02 | azoxystrobin | 1:3 | 0.1 + 0.3 |
| X.02 | azoxystrobin | 3:10 | 0.03 + 0.1 |
| X.02 | azoxystrobin | 1:10 | 0.03 + 0.3 |
| X.02 | pyraclostrobin | 1:1 | 0.1 + 0.1 |
| X.02 | pyraclostrobin | 1:3 | 0.1 + 0.3 |
| X.02 | pyraclostrobin | 3:10 | 0.03 + 0.1 |
| X.02 | pyraclostrobin | 1:10 | 0.03 + 0.3 |
| X.02 | picoxystrobin | 1:1 | 0.1 + 0.1 |
| X.02 | picoxystrobin | 1:3 | 0.1 + 0.3 |
| X.02 | picoxystrobin | 3:10 | 0.03 + 0.1 |
| X.02 | picoxystrobin | 1:10 | 0.03 + 0.3 |
| X.02 | prothioconazole | 1:3 | 0.1 + 0.3 |
| X.02 | prothioconazole | 1:10 | 0.03 + 0.3 |
| X.02 | benzovindiflupyr | 1:1 | 0.1 + 0.1 |
| X.02 | benzovindiflupyr | 1:3 | 0.1 + 0.3 |
| X.02 | benzovindiflupyr | 1:10 | 0.03 + 0.3 |
| X.02 | quinofumelin | 1:1 | 0.1 + 0.1 |
| X.02 | quinofumelin | 1:3 | 0.1 + 0.3 |
| X.02 | quinofumelin | 3:10 | 0.03 + 0.1 |
| X.02 | quinofumelin | 1:10 | 0.03 + 0.3 |
| X.02 | ipflufenoquin | 1:1 | 0.1 + 0.1 |
| X.02 | ipflufenoquin | 1:3 | 0.1 + 0.3 |
| X.02 | ipflufenoquin | 1:10 | 0.03 + 0.3 |
| X.02 | metyltetraprole | 1:1 | 0.1 + 0.1 |
| X.02 | metyltetraprole | 1:3 | 0.1 + 0.3 |
| X.02 | metyltetraprole | 3:10 | 0.03 + 0.1 |
| X.02 | metyltetraprole | 1:10 | 0.03 + 0.3 |
| X.02 | aminopyrifen | 1:3 | 0.1 + 0.3 |
| X.02 | florylpicoxamid | 1:1 | 0.1 + 0.1 |
| X.02 | florylpicoxamid | 1:3 | 0.1 + 0.3 |
| X.02 | florylpicoxamid | 3:10 | 0.03 + 0.1 |
| X.02 | florylpicoxamid | 1:10 | 0.03 + 0.3 |

TABLE C4-1-continued

Fungicidal activity >80% (% of untreated) against *Glomerella lagenarium*

| Component A | Component B | Ratio A:B | Conc. (ppm) (A:B) |
|---|---|---|---|
| X.02 | fenpicoxamid | 1:1 | 0.1 + 0.1 |
| X.02 | fenpicoxamid | 1:3 | 0.1 + 0.3 |
| X.02 | fenpicoxamid | 3:10 | 0.03 + 0.1 |
| X.02 | fenpicoxamid | 1:10 | 0.03 + 0.3 |
| X.02 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.02 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.02 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.02 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |

TABLE C4-2

Fungicidal activity >80% (% of untreated) against *Glomerella lagenarium*

| Component A | Component B | Ratio A:B | Conc. (ppm) (A:B) |
|---|---|---|---|
| X.04 | glyphosate | 1:1 | 0.1 + 0.1 |
| X.04 | glyphosate | 1:3 | 0.1 + 0.3 |
| X.04 | chlorothalonil | 1:1 | 0.1 + 0.1 |
| X.04 | chlorothalonil | 1:3 | 0.1 + 0.3 |
| X.04 | chlorothalonil | 3:10 | 0.03 + 0.1 |
| X.04 | chlorothalonil | 1:10 | 0.03 + 0.3 |
| X.04 | mancozeb | 1:1 | 0.1 + 0.1 |
| X.04 | mancozeb | 1:3 | 0.1 + 0.3 |
| X.04 | 2,4-D | 1:1 | 0.1 + 0.1 |
| X.04 | 2,4-D | 1:3 | 0.1 + 0.3 |
| X.04 | propiconazole | 1:1 | 0.1 + 0.1 |
| X.04 | propiconazole | 1:3 | 0.1 + 0.3 |
| X.04 | disodium phosphonate | 1:1 | 0.1 + 0.1 |
| X.04 | disodium phosphonate | 1:3 | 0.1 + 0.3 |
| X.04 | fenpropimorph | 1:1 | 0.1 + 0.1 |
| X.04 | fenpropimorph | 1:3 | 0.1 + 0.3 |
| X.04 | fenpropidin | 1:1 | 0.1 + 0.1 |
| X.04 | fenpropidin | 1:3 | 0.1 + 0.3 |
| X.04 | hexaconazole | 1:1 | 0.1 + 0.1 |
| X.04 | hexaconazole | 1:3 | 0.1 + 0.3 |
| X.04 | paclobutrazol | 1:1 | 0.1 + 0.1 |
| X.04 | paclobutrazol | 1:3 | 0.1 + 0.3 |
| X.04 | trinexapac-ethyl | 1:1 | 0.1 + 0.1 |
| X.04 | trinexapac-ethyl | 1:3 | 0.1 + 0.3 |
| X.04 | flutriafol | 1:1 | 0.1 + 0.1 |
| X.04 | flutriafol | 1:3 | 0.1 + 0.3 |
| X.04 | difenoconazole | 1:1 | 0.1 + 0.1 |
| X.04 | difenoconazole | 1:3 | 0.1 + 0.3 |
| X.04 | fludioxonil | 1:1 | 0.1 + 0.1 |
| X.04 | fludioxonil | 1:3 | 0.1 + 0.3 |
| X.04 | cyproconazole | 1:1 | 0.1 + 0.1 |
| X.04 | cyproconazole | 1:3 | 0.1 + 0.3 |
| X.04 | acibenzolar S-methyl | 1:1 | 0.1 + 0.1 |
| X.04 | acibenzolar S-methyl | 1:3 | 0.1 + 0.3 |
| X.04 | trifloxystrobin | 1:1 | 0.1 + 0.1 |
| X.04 | trifloxystrobin | 1:3 | 0.1 + 0.3 |
| X.04 | trifloxystrobin | 3:10 | 0.03 + 0.1 |
| X.04 | trifloxystrobin | 1:10 | 0.03 + 0.3 |
| X.04 | folpet | 1:1 | 0.1 + 0.1 |
| X.04 | folpet | 1:3 | 0.1 + 0.3 |
| X.04 | folpet | 1:10 | 0.03 + 0.3 |
| X.04 | azoxystrobin | 1:1 | 0.1 + 0.1 |
| X.04 | azoxystrobin | 1:3 | 0.1 + 0.3 |
| X.04 | azoxystrobin | 3:10 | 0.03 + 0.1 |
| X.04 | azoxystrobin | 1:10 | 0.03 + 0.3 |
| X.04 | pyraclostrobin | 1:1 | 0.1 + 0.1 |
| X.04 | pyraclostrobin | 1:3 | 0.1 + 0.3 |
| X.04 | pyraclostrobin | 3:10 | 0.03 + 0.1 |
| X.04 | pyraclostrobin | 1:10 | 0.03 + 0.3 |
| X.04 | picoxystrobin | 1:1 | 0.1 + 0.1 |

TABLE C4-2-continued

| Fungicidal activity >80% (% of untreated) against *Glomerella lagenarium* | | | |
|---|---|---|---|
| Component A | Component B | Ratio A:B | Conc. (ppm) (A:B) |
| X.04 | picoxystrobin | 1:3 | 0.1 + 0.3 |
| X.04 | picoxystrobin | 3:10 | 0.03 + 0.1 |
| X.04 | picoxystrobin | 1:10 | 0.03 + 0.3 |
| X.04 | sulphur | 1:1 | 0.1 + 0.1 |
| X.04 | sulphur | 1:3 | 0.1 + 0.3 |
| X.04 | tebuconazole | 1:1 | 0.1 + 0.1 |
| X.04 | tebuconazole | 1:3 | 0.1 + 0.3 |
| X.04 | prothioconazole | 1:1 | 0.1 + 0.1 |
| X.04 | prothioconazole | 1:3 | 0.1 + 0.3 |
| X.04 | prothioconazole | 1:10 | 0.03 + 0.3 |
| X.04 | fluopyram | 1:1 | 0.1 + 0.1 |
| X.04 | fluopyram | 1:3 | 0.1 + 0.3 |
| X.04 | copper oxychloride | 1:1 | 0.1 + 0.1 |
| X.04 | copper oxychloride | 1:3 | 0.1 + 0.3 |
| X.04 | benzovindiflupyr | 1:1 | 0.1 + 0.1 |
| X.04 | benzovindiflupyr | 1:3 | 0.1 + 0.3 |
| X.04 | benzovindiflupyr | 3:10 | 0.03 + 0.1 |
| X.04 | benzovindiflupyr | 1:10 | 0.03 + 0.3 |
| X.04 | isopyrazam | 1:1 | 0.1 + 0.1 |
| X.04 | isopyrazam | 1:3 | 0.1 + 0.3 |
| X.04 | pydiflumetofen | 1:1 | 0.1 + 0.1 |
| X.04 | pydiflumetofen | 1:3 | 0.1 + 0.3 |
| X.04 | fluxapyroxad | 1:1 | 0.1 + 0.1 |
| X.04 | fluxapyroxad | 1:3 | 0.1 + 0.3 |
| X.04 | quinofumelin | 1:1 | 0.1 + 0.1 |
| X.04 | quinofumelin | 1:3 | 0.1 + 0.3 |
| X.04 | quinofumelin | 3:10 | 0.03 + 0.1 |
| X.04 | quinofumelin | 1:10 | 0.03 + 0.3 |
| X.04 | isoflucypram | 1:1 | 0.1 + 0.1 |
| X.04 | isoflucypram | 1:3 | 0.1 + 0.3 |
| X.04 | mefentrifluconazole | 1:1 | 0.1 + 0.1 |
| X.04 | mefentrifluconazole | 1:3 | 0.1 + 0.3 |
| X.04 | ipflufenoquin | 1:1 | 0.1 + 0.1 |
| X.04 | ipflufenoquin | 1:3 | 0.1 + 0.3 |
| X.04 | ipflufenoquin | 3:10 | 0.03 + 0.1 |
| X.04 | ipflufenoquin | 1:10 | 0.03 + 0.3 |
| X.04 | metyltetraprole | 1:1 | 0.1 + 0.1 |
| X.04 | metyltetraprole | 1:3 | 0.1 + 0.3 |
| X.04 | metyltetraprole | 3:10 | 0.03 + 0.1 |
| X.04 | metyltetraprole | 1:10 | 0.03 + 0.3 |
| X.04 | aminopyrifen | 1:1 | 0.1 + 0.1 |
| X.04 | aminopyrifen | 1:3 | 0.1 + 0.3 |
| X.04 | florylpicoxamid | 1:1 | 0.1 + 0.1 |
| X.04 | florylpicoxamid | 1:3 | 0.1 + 0.3 |
| X.04 | florylpicoxamid | 3:10 | 0.03 + 0.1 |
| X.04 | florylpicoxamid | 1:10 | 0.03 + 0.3 |
| X.04 | 2-[6-(4-bromophenoxy)-2-(trifluoromethyl)-3-pyridyl]-1-(1,2,4-triazol-1-yl)propan-2-ol | 1:1 | 0.1 + 0.1 |
| X.04 | 2-[6-(4-bromophenoxy)-2-(trifluoromethyl)-3-pyridyl]-1-(1,2,4-triazol-1-yl)propan-2-ol | 1:3 | 0.1 + 0.3 |
| X.04 | fenpicoxamid | 1:1 | 0.1 + 0.1 |
| X.04 | fenpicoxamid | 1:3 | 0.1 + 0.3 |
| X.04 | fenpicoxamid | 3:10 | 0.03 + 0.1 |
| X.04 | fenpicoxamid | 1:10 | 0.03 + 0.3 |
| X.04 | (Z,2E)-5-[1-(2,4-dichlorophenyl)pyrazol-3-yl]oxy-2-methoxyimino-N,3-dimethyl-pent-3-enamide | 1:1 | 0.1 + 0.1 |
| X.04 | (Z,2E)-5-[1-(2,4-dichlorophenyl)pyrazol-3-yl]oxy-2-methoxyimino-N,3-dimethyl-pent-3-enamide | 1:3 | 0.1 + 0.3 |
| X.04 | (Z,2E)-5-[1-(2,4-dichlorophenyl)pyrazol-3-yl]oxy-2-methoxyimino-N,3-dimethyl-pent-3-enamide | 3:10 | 0.03 + 0.1 |
| X.04 | (Z,2E)-5-[1-(2,4-dichlorophenyl)pyrazol-3-yl]oxy-2-methoxyimino-N,3-dimethyl-pent-3-enamide | 1:10 | 0.03 + 0.3 |

The following mixture compositions at the reported concentration (in ppm) in tables $C_4$-3 and $C_4$-4 gave the following disease control in this test (*Glomerella lagenarium* syn. *Colletotrichum lagenarium*). Fungicidal activity was evaluated on a 100-0 scale (100=no disease growth; 0=well completely covered by mycelium).

TABLE C4-3

| Component A | Component B | Conc. (ppm) (A:B) | Ratio A:B | Activity (%) | COLBY (expected activity %) |
|---|---|---|---|---|---|
| X.02 | | 0.1 | | 20 | |
| X.02 | | 0.03 | | 0 | |
| | chlorothalonil | 0.1 | | 50 | |
| X.02 | chlorothalonil | 0.1 + 0.1 | 1:1 | 90 | 60 |
| | mancozeb | 0.1 | | 0 | |
| | mancozeb | 0.3 | | 20 | |
| X.02 | mancozeb | 0.1 + 0.1 | 1:1 | 50 | 20 |
| X.02 | mancozeb | 0.1 + 0.3 | 1:3 | 70 | 36 |
| | folpet | 0.1 | | 20 | |
| | folpet | 0.3 | | 70 | |
| X.02 | folpet | 0.1 + 0.1 | 1:1 | 50 | 36 |
| X.02 | folpet | 0.1 + 0.3 | 1:3 | 100 | 76 |
| X.02 | folpet | 0.03 + 0.1 | 3:10 | 50 | 20 |
| X.02 | folpet | 0.03 + 0.3 | 1:10 | 90 | 70 |
| | prothioconazole | 0.1 | | 20 | |
| | prothioconazole | 0.3 | | 70 | |
| X.02 | prothioconazole | 0.1 + 0.1 | 1:1 | 50 | 36 |
| X.02 | prothioconazole | 0.1 + 0.3 | 1:3 | 90 | 76 |
| X.02 | prothioconazole | 0.03 + 0.3 | 1:10 | 90 | 70 |
| | benzovindiflupyr | 0.1 | | 50 | |
| X.02 | benzovindiflupyr | 0.1 + 0.1 | 1:1 | 90 | 60 |
| X.02 | benzovindiflupyr | 0.03 + 0.3 | 1:10 | 70 | 50 |
| | mefentrifluconazole | 0.3 | | 0 | |
| X.02 | mefentrifluconazole | 0.03 + 0.3 | 1:10 | 20 | 0 |
| | ipflufenoquin | 0.1 | | 50 | |
| X.02 | ipflufenoquin | 0.1 + 0.1 | 1:1 | 90 | 60 |
| X.02 | ipflufenoquin | 0.03 + 0.1 | 3:10 | 70 | 50 |
| | aminopyrifen | 0.1 | | 20 | |
| | aminopyrifen | 0.3 | | 50 | |
| X.02 | aminopyrifen | 0.1 + 0.1 | 1:1 | 70 | 36 |
| X.02 | aminopyrifen | 0.1 + 0.3 | 1:3 | 90 | 60 |
| X.02 | aminopyrifen | 0.03 + 0.1 | 3:10 | 50 | 20 |
| X.02 | aminopyrifen | 0.03 + 0.3 | 1:10 | 70 | 50 |
| | florylpicoxamid | 0.1 | | 20 | |
| X.02 | florylpicoxamid | 0.1 + 0.1 | 1:1 | 100 | 36 |
| X.02 | florylpicoxamid | 0.03 + 0.1 | 3:10 | 90 | 20 |
| | 2-[6-(4-bromophenoxy)-2-(trifluoromethyl)-3-pyridyl]-1-(1,2,4-triazol-1-yl)propan-2-ol | 0.3 | | 0 | |
| X.02 | 2-[6-(4-bromophenoxy)-2-(trifluoromethyl)-3-pyridyl]-1-(1,2,4-triazol-1-yl)propan-2-ol | 0.03 + 0.3 | 1:10 | 20 | 0 |
| | fenpicoxamid | 0.1 | | 20 | |
| | fenpicoxamid | 0.3 | | 70 | |
| X.02 | fenpicoxamid | 0.1 + 0.1 | 1:1 | 100 | 36 |
| X.02 | fenpicoxamid | 0.1 + 0.3 | 1:3 | 100 | 76 |
| X.02 | fenpicoxamid | 0.03 + 0.1 | 3:10 | 90 | 20 |
| X.02 | fenpicoxamid | 0.03 + 0.3 | 1:10 | 100 | 70 |

TABLE C4-4

| Component A | Component B | Conc. (ppm) (A:B) | Ratio A:B | Activity (%) | COLBY (expected activity %) |
|---|---|---|---|---|---|
| X.04 | | 0.03 | | 0 | |
| | chlorothalonil | 0.1 | | 0 | |
| X.04 | chlorothalonil | 0.03 + 0.1 | 3:10 | 90 | 0 |
| | mancozeb | 0.1 | | 0 | |
| X.04 | mancozeb | 0.03 + 0.1 | 3:10 | 20 | 0 |
| | folpet | 0.1 | | 20 | |
| | folpet | 0.3 | | 70 | |
| X.04 | folpet | 0.03 + 0.1 | 3:10 | 50 | 20 |
| X.04 | folpet | 0.03 + 0.3 | 1:10 | 100 | 70 |
| | prothioconazole | 0.1 | | 20 | |
| | prothioconazole | 0.3 | | 70 | |

TABLE C4-4-continued

| Component A | Component B | Conc. (ppm) (A:B) | Ratio A:B | Activity (%) | COLBY (expected activity %) |
|---|---|---|---|---|---|
| X.04 | prothioconazole | 0.03 + 0.1 | 3:10 | 70 | 20 |
| X.04 | prothioconazole | 0.03 + 0.3 | 1:10 | 100 | 70 |
| | benzovindiflupyr | 0.1 | | 50 | |
| X.04 | benzovindiflupyr | 0.03 + 0.1 | 3:10 | 90 | 50 |
| | mefentrifluconazole | 0.3 | | 0 | |
| X.04 | mefentrifluconazole | 0.03 + 0.3 | 1:10 | 20 | 0 |
| | ipflufenoquin | 0.1 | | 50 | |
| X.04 | ipflufenoquin | 0.03 + 0.1 | 3:10 | 90 | 50 |
| | aminopyrifen | 0.1 | | 20 | |
| | aminopyrifen | 0.3 | | 50 | |
| X.04 | aminopyrifen | 0.03 + 0.1 | 3:10 | 50 | 20 |
| X.04 | aminopyrifen | 0.03 + 0.3 | 1:10 | 70 | 50 |
| | florylpicoxamid | 0.1 | | 20 | |
| X.04 | florylpicoxamid | 0.03 + 0.1 | 3:10 | 100 | 20 |
| | 2-[6-(4-bromophenoxy)-2-(trifluoromethyl)-3-pyridyl]-1-(1,2,4-triazol-1-yl)propan-2-ol | 0.3 | | 0 | |
| X.04 | 2-[6-(4-bromophenoxy)-2-(trifluoromethyl)-3-pyridyl]-1-(1,2,4-triazol-1-yl)propan-2-ol | 0.03 + 0.3 | 1:10 | 20 | 0 |
| | fenpicoxamid | 0.1 | | 20 | |
| | fenpicoxamid | 0.3 | | 70 | |
| X.04 | fenpicoxamid | 0.03 + 0.1 | 3:10 | 100 | 20 |
| X.04 | fenpicoxamid | 0.03 + 0.3 | 1:10 | 100 | 70 |

Example C5—Fungicidal Activity Against *Corynespora cassiicola* (Target Leaf Spot)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24 C and the inhibition of growth was determined photometrically after 3-4 days at 620 nm.

The following mixture compositions at the reported concentration (in ppm) in tables C4-3 and C4-4 gave the following disease control in this test (*Corynespora cassiicola*). Fungicidal activity was evaluated on a 100-0 scale (100=no disease growth; 0=well completely covered by mycelium).

TABLE C5-1

| Component A | Component B | Conc. (ppm) (A:B) | Ratio A:B | Activity (%) | COLBY (expected activity %) |
|---|---|---|---|---|---|
| X.02 | | 1 | | 20 | |
| X.02 | [(1S,2S)-1-methyl-2-(o-tolyl)propyl] (2S)-2-[(4-methoxy-3-propanoyloxy-pyridine-2-carbonyl)amino]propanoate | 1 + 0.06 | 50:3 | 50 | 20 |
| X.02 | [(1S,2S)-1-methyl-2-(o-tolyl)propyl] (2S)-2-[(4-methoxy-3-propanoyloxy-pyridine-2-carbonyl)amino]propanoate | 1 + 0.03 | 100:3 | 50 | 20 |
| | N-(2-fluorophenyl)-4-[5-(trifluoromethyl)-1,2,4-oxadiazol-3-yl]benzamide | 20 | | 0 | |
| | N-(2-fluorophenyl)-4-[5-(trifluoromethyl)-1,2,4-oxadiazol-3-yl]benzamide | 10 | | 0 | |
| X.02 | N-(2-fluorophenyl)-4-[5-(trifluoromethyl)-1,2,4-oxadiazol-3-yl]benzamide | 1 + 20 | 1:20 | 50 | 20 |
| X.02 | N-(2-fluorophenyl)-4-[5-(trifluoromethyl)-1,2,4-oxadiazol-3-yl]benzamide | 1 + 10 | 1:10 | 50 | 20 |

TABLE C5-1-continued

| Component A | Component B | Conc. (ppm) (A:B) | Ratio A:B | Activity (%) | COLBY (expected activity %) |
|---|---|---|---|---|---|
| X.04 | | 0.2 | | 20 | |
| | [(1S,2S)-1-methyl-2-(o-tolyl)propyl] (2S)-2-[(4-methoxy-3-propanoyloxy-pyridine-2-carbonyl)amino]propanoate | 0.06 | | 0 | |
| | [(1S,2S)-1-methyl-2-(o-tolyl)propyl] (2S)-2-[(4-methoxy-3-propanoyloxy-pyridine-2-carbonyl)amino]propanoate | 0.03 | | 0 | |
| X.04 | [(1S,2S)-1-methyl-2-(o-tolyl)propyl] (2S)-2-[(4-methoxy-3-propanoyloxy-pyridine-2-carbonyl)amino]propanoate | 0.2 + 0.06 | 10:3 | 50 | 20 |
| X.04 | [(1S,2S)-1-methyl-2-(o-tolyl)propyl] (2S)-2-[(4-methoxy-3-propanoyloxy-pyridine-2-carbonyl)amino]propanoate | 0.2 + 0.03 | 20:3 | 20 | 20 |
| | N-(2-fluorophenyl)-4-[5-(trifluoromethyl)-1,2,4-oxadiazol-3-yl]benzamide | 20 | | 0 | |
| | N-(2-fluorophenyl)-4-[5-(trifluoromethyl)-1,2,4-oxadiazol-3-yl]benzamide | 10 | | 0 | |
| X.04 | N-(2-fluorophenyl)-4-[5-(trifluoromethyl)-1,2,4-oxadiazol-3-yl]benzamide | 0.2 + 20 | 1:100 | 50 | 20 |
| X.04 | N-(2-fluorophenyl)-4-[5-(trifluoromethyl)-1,2,4-oxadiazol-3-yl]benzamide | 0.2 + 10 | 1:50 | 50 | 20 |
| | Florylpicoxamid | 0.02 | | 0 | |
| X.02 | Florylpicoxamid | 1 + 0.02 | 50:1 | 50 | 20 |
| X.02 | Florylpicoxamid | 1 + 0.01 | 100:1 | 50 | 20 |

Example D: Preventative Activity Against *Phakopsora pachyrhizi* on Soybean

Whole soybean plants are treated with the recited active ingredients 4 weeks after planting. 1 day after spraying leaf disks are cut from the first trifoliate leaf. Five repetitions at each rate are conducted. The leaf disks are inoculated with *Phakopsora pachyrhizi* (Asian soybean rust) one day after treatment. Evaluation of the leaf disks is conducted 11 to 14 days after inoculation and the activity is derived from the relation of the treated vs untreated, infested check. (100=no disease, no damage to the leaf, 0=high infestation, leaf damaged heavily). The rates of the active ingredients used are given in the tables as g active ingredient (a.i.)/ha.

The results are shown in the tables below:

TABLE D1

| Activity (% of untreated) against *Phakopsora pachyrhizi* | | | | |
|---|---|---|---|---|
| Compound X.02 (g/ha) | Fenpropimorph (g/ha) | Compound:Mixing partner | Observed Activity (%) | COLBY Expected Activity (%) |
| 4.5 | 0 | | 33 | |
| 2.25 | 0 | | 23 | |
| 1.13 | 0 | | 1 | |

TABLE D1-continued

| Activity (% of untreated) against *Phakopsora pachyrhizi* | | | | |
|---|---|---|---|---|
| Compound X.02 (g/ha) | Fenpropimorph (g/ha) | Compound:Mixing partner | Observed Activity (%) | COLBY Expected Activity (%) |
| 0 | 900 | | 76 | |
| 0 | 450 | | 43 | |
| 0 | 225 | | 8 | |
| 4.5 | 900 | 1:200 | 94 | 84 |
| 2.25 | 450 | 1:200 | 94 | 56 |
| 1.13 | 225 | 1:200 | 78 | 9 |
| 1.13 | 450 | 1:400 | 83 | 44 |

TABLE D2

| Activity (% of untreated) against *Phakopsora pachyrhizi* | | | | |
|---|---|---|---|---|
| Compound X.02 (g/ha) | Fenpropidin (g/ha) | Compound:Mixing partner | Observed Activity (%) | COLBY Expected Activity (%) |
| 4.5 | 0 | | 33 | |
| 2.25 | 0 | | 23 | |
| 1.13 | 0 | | 1 | |
| 0 | 900 | | 82 | |

TABLE D2-continued

| Activity (% of untreated) against *Phakopsora pachyrhizi* | | | | |
|---|---|---|---|---|
| Compound X.02 (g/ha) | Fenpropidin (g/ha) | Compound:Mixing partner | Observed Activity (%) | COLBY Expected Activity (%) |
| 0 | 450 | | 61 | |
| 0 | 225 | | 64 | |
| 4.5 | 900 | 1:200 | 96 | 88 |
| 2.25 | 450 | 1:200 | 93 | 70 |
| 1.13 | 225 | 1:200 | 89 | 64 |
| 1.13 | 450 | 1:400 | 88 | 61 |

TABLE D3

| Activity (% of untreated) against *Phakopsora pachyrhizi* | | | | |
|---|---|---|---|---|
| Compound X.02 (g/ha) | Trifloxystrobin (g/ha) | Compound:Mixing partner | Observed Activity (%) | COLBY Expected Activity (%) |
| 9.0 | 0 | | 38 | |
| 4.50 | 0 | | 22 | |
| 2.25 | 0 | | 14 | |
| 0 | 18 | | 33 | |
| 0 | 9 | | 1 | |
| 0 | 4.5 | | 0 | |
| 9.0 | 18 | 1:2 | 92 | 59 |
| 4.50 | 9 | 1:2 | 88 | 23 |
| 2.25 | 4.5 | 1:2 | 62 | 14 |
| 2.25 | 9 | 1:4 | 74 | 15 |

TABLE D4

| Activity (% of untreated) against *Phakopsora pachyrhizi* | | | | |
|---|---|---|---|---|
| Compound X.02 (g/ha) | Azoxystrobin (g/ha) | Compound:Mixing partner | Observed Activity (%) | COLBY Expected Activity (%) |
| 9.0 | 0 | | 38 | |
| 4.50 | 0 | | 22 | |
| 2.25 | 0 | | 14 | |
| 0 | 18 | | 26 | |
| 0 | 9 | | 2 | |
| 0 | 4.5 | | 0 | |
| 9.0 | 18 | 1:2 | 96 | 54 |

TABLE D4-continued

| Activity (% of untreated) against *Phakopsora pachyrhizi* | | | | |
|---|---|---|---|---|
| Compound X.02 (g/ha) | Azoxystrobin (g/ha) | Compound:Mixing partner | Observed Activity (%) | COLBY Expected Activity (%) |
| 4.50 | 9 | 1:2 | 89 | 24 |
| 2.25 | 4.5 | 1:2 | 57 | 14 |
| 2.25 | 9 | 1:4 | 85 | 16 |

TABLE D5

| Activity (% of untreated) against *Phakopsora pachyrhizi* | | | | |
|---|---|---|---|---|
| Compound X.02 (g/ha) | Metyltetraprole (g/ha) | Compound:Mixing partner | Observed Activity (%) | COLBY Expected Activity (%) |
| 9.0 | 0 | | 38 | |
| 4.50 | 0 | | 22 | |
| 2.25 | 0 | | 14 | |
| 0 | 18 | | 2 | |
| 0 | 9 | | 2 | |
| 9.0 | 18 | 1:2 | 78 | 39 |
| 4.50 | 9 | 1:2 | 31 | 24 |
| 2.25 | 9 | 1:4 | 21 | 16 |

TABLE D6

| Activity (% of untreated) against *Phakopsora pachyrhizi* | | | | |
|---|---|---|---|---|
| Compound X.02 (g/ha) | Pyraclostrobin (g/ha) | Compound:Mixing partner | Observed Activity (%) | COLBY Expected Activity (%) |
| 9.0 | 0 | | 38 | |
| 4.50 | 0 | | 22 | |
| 2.25 | 0 | | 14 | |
| 0 | 18 | | 0 | |
| 0 | 9 | | 1 | |
| 0 | 4.5 | | 1 | |
| 9.0 | 18 | 1:2 | 92 | 38 |
| 4.50 | 9 | 1:2 | 75 | 23 |
| 2.25 | 4.5 | 1:2 | 40 | 15 |
| 2.25 | 9 | 1:4 | 34 | 15 |

TABLE D7

| Activity (% of untreated) against *Phakopsora pachyrhizi* | | | | |
|---|---|---|---|---|
| Compound X.02 (g/ha) | (Z,2E)-5-[1-(2,4-dichlorophenyl)pyrazol-3-yl]oxy-2-methoxyimino-N,3-dimethyl-pent-3-enamide (g/ha) | Compound:Mixing partner | Observed Activity (%) | COLBY Expected Activity (%) |
| 9.0 | 0 | | 38 | |
| 4.50 | 0 | | 22 | |
| 0 | 18 | | 3 | |
| 0 | 9 | | 2 | |
| 9.0 | 18 | 1:2 | 92 | 40 |
| 4.50 | 9 | 1:2 | 68 | 24 |

TABLE D8

| Activity (% of untreated) against *Phakopsora pachyrhizi* | | | | |
|---|---|---|---|---|
| Compound X.02 (g/ha) | Benzovindiflupyr (g/ha) | Compound:Mixing partner | Observed Activity (%) | COLBY Expected Activity (%) |
| 4.50 | 0 | | 20 | |
| 2.25 | 0 | | 13 | |
| 0 | 4.50 | | 94 | |
| 0 | 2.25 | | 92 | |
| 4.50 | 4.50 | 1:1 | 99 | 95 |
| 2.25 | 2.25 | 1:1 | 93 | 93 |
| 2.25 | 4.50 | 1:2 | 99 | 95 |

TABLE D9

| Activity (% of untreated) against *Phakopsora pachyrhizi* | | | | |
|---|---|---|---|---|
| Compound X.02 (g/ha) | Pydiflumetofen (g/ha) | Compound:Mixing partner | Observed Activity (%) | COLBY Expected Activity (%) |
| 4.50 | 0 | | 20 | |
| 2.25 | 0 | | 13 | |
| 0 | 45 | | 4 | |
| 0 | 22.5 | | 0 | |
| 4.50 | 45 | 1:10 | 70 | 24 |
| 2.25 | 22.5 | 1:10 | 40 | 13 |
| 2.25 | 45 | 1:20 | 63 | 17 |

TABLE D10

| Activity (% of untreated) against *Phakopsora pachyrhizi* | | | | |
|---|---|---|---|---|
| Compound X.02 (g/ha) | Prothioconazole (g/ha) | Compound:Mixing partner | Observed Activity (%) | COLBY Expected Activity (%) |
| 4.50 | 0 | | 20 | |
| 2.25 | 0 | | 13 | |
| 0 | 45 | | 76 | |
| 0 | 22.5 | | 74 | |
| 4.50 | 45 | 1:10 | 97 | 81 |
| 2.25 | 22.5 | 1:10 | 98 | 77 |
| 2.25 | 45 | 1:20 | 96 | 79 |

TABLE D11

| Activity (% of untreated) against *Phakopsora pachyrhizi* | | | | |
|---|---|---|---|---|
| Compound X.02 (g/ha) | Difenoconazole (g/ha) | Compound:Mixing partner | Observed Activity (%) | COLBY Expected Activity (%) |
| 4.50 | 0 | | 20 | |
| 2.25 | 0 | | 13 | |
| 0 | 45 | | 0 | |
| 0 | 22.5 | | 0 | |
| 4.50 | 45 | 1:10 | 68 | 20 |
| 2.25 | 22.5 | 1:10 | 52 | 13 |
| 2.25 | 45 | 1:20 | 23 | 13 |

TABLE D12

| Activity (% of untreated) against *Phakopsora pachyrhizi* | | | | |
|---|---|---|---|---|
| Compound X.02 (g/ha) | Cyproconazole (g/ha) | Compound:Mixing partner | Observed Activity (%) | COLBY Expected Activity (%) |
| 4.50 | 0 | | 20 | |
| 2.25 | 0 | | 13 | |
| 0 | 45 | | 52 | |
| 0 | 22.5 | | 51 | |
| 4.50 | 45 | 1:10 | 97 | 62 |
| 2.25 | 22.5 | 1:10 | 88 | 57 |
| 2.25 | 45 | 1:20 | 95 | 59 |

TABLE D13

| Activity (% of untreated) against *Phakopsora pachyrhizi* | | | | |
|---|---|---|---|---|
| Compound X.04 (g/ha) | Fenpropimorph (g/ha) | Compound:Mixing partner | Observed Activity (%) | COLBY Expected Activity (%) |
| 4.5 | 0 | | 67 | |
| 2.25 | 0 | | 22 | |
| 1.13 | 0 | | 20 | |
| 0 | 900 | | 76 | |
| 0 | 450 | | 43 | |
| 0 | 225 | | 8 | |
| 4.5 | 900 | 1:200 | 95 | 92 |
| 2.25 | 450 | 1:200 | 95 | 56 |
| 1.13 | 225 | 1:200 | 83 | 26 |
| 1.13 | 450 | 1:400 | 93 | 55 |

TABLE D14

| Activity (% of untreated) against *Phakopsora pachyrhizi* | | | | |
|---|---|---|---|---|
| Compound X.04 (g/ha) | Fenpropidin (g/ha) | Compound:Mixing partner | Observed Activity (%) | COLBY Expected Activity (%) |
| 4.5 | 0 | | 67 | |
| 2.25 | 0 | | 22 | |
| 1.13 | 0 | | 20 | |
| 0 | 900 | | 82 | |
| 0 | 450 | | 61 | |
| 0 | 225 | | 64 | |
| 4.5 | 900 | 1:200 | 93 | 94 |
| 2.25 | 450 | 1:200 | 91 | 69 |
| 1.13 | 225 | 1:200 | 89 | 71 |
| 1.13 | 450 | 1:400 | 90 | 68 |

TABLE D15

| Activity (% of untreated) against *Phakopsora pachyrhizi* | | | | |
|---|---|---|---|---|
| Compound X.04 (g/ha) | Mancozeb (g/ha) | Compound:Mixing partner | Observed Activity (%) | COLBY Expected Activity (%) |
| 2.25 | 0 | | 22 | |
| 1.13 | 0 | | 20 | |
| 0 | 450 | | 39 | |
| 0 | 225 | | 27 | |
| 2.25 | 450 | 1:200 | 65 | 53 |
| 1.13 | 225 | 1:200 | 50 | 41 |
| 1.13 | 450 | 1:400 | 53 | 51 |

TABLE D16

| Activity (% of untreated) against *Phakopsora pachyrhizi* | | | | |
|---|---|---|---|---|
| Compound X.04 (g/ha) | Chlorothalonil (g/ha) | Compound:Mixing partner | Observed Activity (%) | COLBY Expected Activity (%) |
| 2.25 | 0 | | 22 | |
| 1.13 | 0 | | 20 | |
| 0 | 900 | | 7 | |
| 0 | 450 | | 8 | |
| 2.25 | 900 | 1:400 | 52 | 28 |
| 1.13 | 450 | 1:400 | 37 | 26 |
| 1.13 | 900 | 1:800 | 52 | 25 |

TABLE D17

| Activity (% of untreated) against *Phakopsora pachyrhizi* | | | | |
|---|---|---|---|---|
| Compound X.04 (g/ha) | Folpet (g/ha) | Compound:Mixing partner | Observed Activity (%) | COLBY Expected Activity (%) |
| 2.25 | 0 | | 22 | |
| 1.13 | 0 | | 20 | |
| 0 | 900 | | 13 | |
| 0 | 450 | | 4 | |
| 2.25 | 900 | 1:400 | 52 | 32 |
| 1.13 | 450 | 1:400 | 35 | 23 |
| 1.13 | 900 | 1:800 | 33 | 30 |

TABLE D18

| Activity (% of untreated) against *Phakopsora pachyrhizi* | | | | |
|---|---|---|---|---|
| Compound X.04 (g/ha) | Trifloxystrobin (g/ha) | Compound:Mixing partner | Observed Activity (%) | COLBY Expected Activity (%) |
| 18 | 0 | | 74 | |
| 9 | 0 | | 81 | |
| 4.5 | 0 | | 34 | |
| 2.25 | 0 | | 35 | |
| 0 | 18 | | 19 | |
| 0 | 9 | | 0 | |
| 0 | 4.5 | | 3 | |
| 0 | 2.25 | | 0 | |
| 9 | 9 | 1:1 | 92 | 81 |
| 4.5 | 4.5 | 1:1 | 83 | 35 |
| 2.25 | 2.25 | 1:1 | 42 | 35 |

TABLE D19

| Activity (% of untreated) against *Phakopsora pachyrhizi* | | | | |
|---|---|---|---|---|
| Compound X.04 (g/ha) | Azoxystrobin (g/ha) | Compound:Mixing partner | Observed Activity (%) | Expected Activity (%) |
| 18 | 0 | | 74 | |
| 9 | 0 | | 81 | |
| 4.5 | 0 | | 34 | |
| 2.25 | 0 | | 35 | |
| 0 | 18 | | 9 | |
| 0 | 9 | | 23 | |
| 0 | 4.5 | | 15 | |
| 0 | 2.25 | | 0 | |
| 9 | 9 | 1:1 | 98 | 85 |
| 4.5 | 4.5 | 1:1 | 92 | 43 |
| 2.25 | 2.25 | 1:1 | 86 | 35 |

TABLE D20

| Activity (% of untreated) against *Phakopsora pachyrhizi* | | | | |
|---|---|---|---|---|
| Compound X.04 (g/ha) | Metyltetraprole (g/ha) | Compound:Mixing partner | Observed Activity (%) | COLBY Expected Activity (%) |
| 9.0 | 0 | | 59 | |
| 4.50 | 0 | | 49 | |
| 2.25 | 0 | | 17 | |
| 0 | 18 | | 2 | |
| 0 | 9 | | 2 | |
| 9.0 | 18 | 1:2 | 78 | 60 |
| 4.50 | 9 | 1:2 | 51 | 50 |
| 2.25 | 9 | 1:4 | 56 | 18 |

TABLE D21

| Activity (% of untreated) against *Phakopsora pachyrhizi* | | | | |
|---|---|---|---|---|
| Compound X.04 (g/ha) | Pyraclostrobin (g/ha) | Compound:Mixing partner | Observed Activity (%) | COLBY Expected Activity (%) |
| 9.0 | 0 | | 59 | |
| 4.50 | 0 | | 49 | |
| 2.25 | 0 | | 17 | |
| 0 | 18 | | 0 | |
| 0 | 9 | | 1 | |
| 0 | 4.5 | | 1 | |
| 9.0 | 18 | 1:2 | 92 | 59 |
| 4.50 | 9 | 1:2 | 86 | 49 |
| 2.25 | 4.5 | 1:2 | 82 | 18 |
| 2.25 | 9 | 1:4 | 88 | 18 |

TABLE D22

| Activity (% of untreated) against *Phakopsora pachyrhizi* | | | | |
|---|---|---|---|---|
| Compound X.04 (g/ha) | (Z,2E)-5-[1-(2,4-dichlorophenyl)pyrazol-3-yl]oxy-2-methoxyimino-N,3-dimethyl-pent-3-enamide (g/ha) | Compound:Mixing partner | Observed Activity (%) | COLBY Expected Activity (%) |
| 9.0 | 0 | | 59 | |
| 4.50 | 0 | | 49 | |
| 2.25 | 0 | | 17 | |
| 0 | 18 | | 3 | |
| 0 | 9 | | 2 | |
| 9.0 | 18 | 1:2 | 90 | 61 |
| 4.50 | 9 | 1:2 | 89 | 50 |
| 2.25 | 9 | 1:4 | 83 | 19 |

TABLE D23

| Activity (% of untreated) against *Phakopsora pachyrhizi* | | | | |
|---|---|---|---|---|
| Compound X.04 (g/ha) | Benzovindiflupyr (g/ha) | Compound:Mixing partner | Observed Activity (%) | COLBY Expected Activity (%) |
| 4.50 | 0 | | 53 | |
| 2.25 | 0 | | 22 | |
| 0 | 4.50 | | 94 | |
| 0 | 2.25 | | 92 | |
| 4.50 | 4.50 | 1:1 | 100 | 97 |
| 2.25 | 2.25 | 1:1 | 98 | 94 |
| 2.25 | 4.50 | 1:2 | 99 | 95 |

TABLE D24

| Activity (% of untreated) against *Phakopsora pachyrhizi* | | | | |
|---|---|---|---|---|
| Compound X.04 (g/ha) | Pydiflumetofen (g/ha) | Compound:Mixing partner | Observed Activity (%) | COLBY Expected Activity (%) |
| 4.50 | 0 | | 53 | |
| 2.25 | 0 | | 22 | |
| 0 | 45 | | 4 | |
| 0 | 22.5 | | 0 | |
| 4.50 | 45 | 1:10 | 81 | 55 |
| 2.25 | 22.5 | 1:10 | 70 | 22 |
| 2.25 | 45 | 1:20 | 66 | 25 |

TABLE D25

| Activity (% of untreated) against *Phakopsora pachyrhizi* | | | | |
|---|---|---|---|---|
| Compound X.04 (g/ha) | Prothioconazole (g/ha) | Compound:Mixing partner | Observed Activity (%) | COLBY Expected Activity (%) |
| 4.50 | 0 | | 53 | |
| 2.25 | 0 | | 22 | |
| 0 | 45 | | 76 | |
| 0 | 22.5 | | 74 | |
| 4.50 | 45 | 1:10 | 92 | 89 |
| 2.25 | 22.5 | 1:10 | 96 | 80 |
| 2.25 | 45 | 1:20 | 94 | 81 |

TABLE D26

| Activity (% of untreated) against *Phakopsora pachyrhizi* | | | | |
|---|---|---|---|---|
| Compound X.04 (g/ha) | Difenoconazole (g/ha) | Compound:Mixing partner | Observed Activity (%) | COLBY Expected Activity (%) |
| 4.50 | 0 | | 53 | |
| 2.25 | 0 | | 22 | |
| 0 | 45 | | 0 | |
| 0 | 22.5 | | 0 | |
| 4.50 | 45 | 1:10 | 75 | 53 |
| 2.25 | 22.5 | 1:10 | 65 | 22 |
| 2.25 | 45 | 1:20 | 71 | 22 |

TABLE D27

| Activity (% of untreated) against *Phakopsora pachyrhizi* | | | | |
|---|---|---|---|---|
| Compound X.04 (g/ha) | Cyproconazole (g/ha) | Compound:Mixing partner | Observed Activity (%) | COLBY Expected Activity (%) |
| 2.25 | 0 | | 22 | |
| 0 | 45 | | 52 | |
| 0 | 22.5 | | 51 | |
| 2.25 | 22.5 | 1:10 | 89 | 62 |
| 2.25 | 45 | 1:20 | 96 | 63 |

The invention claimed is:

1. A fungicidal composition comprising a mixture of components (A) and (B) as active ingredients, wherein component (A) is a compound of formula (I):

(I)

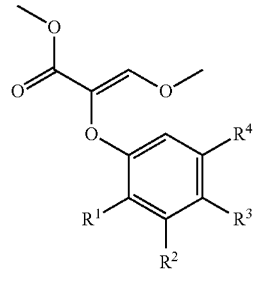

wherein

R1 is methyl;

R2 is hydrogen;

R3 is hydrogen;

R4 is C3-C7 cycloalkyl;

or an agronomically acceptable salt thereof;

and component (B) is a compound selected from the group consisting of:

bixafen, sulfur, copper hydroxide, triclopyricarb, acibenzolar-S-methyl, copper oxychloride, cyproconazole, difenoconazole, epoxiconazole, flutriafol, hexaconazole, ipconazole, metconazole, paclobutrazole, prothioconazole, prochloraz, propiconazole, pyrisoxazole, tebuconazole, fenpropidin, fenpropimorph, spiroxamine, cyprodinil, fludioxonil, metalaxyl, metalaxyl-M, carbendazim, penthiopyrad, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, folpet, chlorothalonil, fluazinam, fluxapyroxad, fenhexamid, fosetyl-aluminium, pyribencarb, tricyclazole, mandipropamid, flubeneteram, isopyrazam, sedaxane, benzovindiflupyr, pydiflumetofen, isoflucypram, isotianil, dipymetitrone, fluindapyr, coumethoxystrobin, ivbenmixianan, mandestrobin, oxathiapiprolin, pyraziflumid, inpyrfluxam, mefentrifluconazole, ipfentrifluconazole, aminopyrifen, (Z,2E)-5-[1-(4-chlorophenyl) pyrazol-3-yl]oxy-2-methoxyimino-N,3-dimethyl-pent-3-enamide, florylpicoxamid, fenpicoxamid, ipflufenoquin, quinofumelin, benzothiostrobin, fluopyram, pyrapropoyne, 2-(difluoromethyl)-N-(3-ethyl-1,1-dimethyl-indan-4-yl) pyridine-3-carboxamide, 4-[[6-[2-(2,4-difluorophenyl)-1, 1-difluoro-2-hydroxy-3-(1,2,4-triazol-1-yl) propyl]-3-pyridyl]oxy] benzonitrile, metyltetraprole, fluoxapiprolin, enoxastrobin, 4-[[6-[2-(2,4-difluorophenyl)-1,1-difluoro-2-hydroxy-3-(5-thioxo-4H-1,2,4-triazol-1-yl) propyl]-3-pyridyl]oxy] benzonitrile, trinexapac, trinexapac-ethyl, coumoxystrobin, N'-[5-bromo methyl-6-[(1 S)-1-methyl-2-propoxy-ethoxy]-3-pyridyl]-N-ethyl-N-methyl-formamidine, N'-[5-bromo-2-methyl-6-[(1R)-1-methyl-2-propoxy-ethoxy]-3-pyridyl]-N-ethyl-N-methyl-formamidine, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N'-[5-bromo-2-methyl-6-(2-propoxypropoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N'-[4-(1-cyclopropyl-2,2,2-trifluoro-1-hydroxy-ethyl)-5-methoxy-2-methyl-phenyl]-N-isopropyl-N-methyl-formamidine, N-ethyl-N'-[5-methoxy-2-methyl-4-[2-trifluoromethyl) oxetan-2-yl]phenyl]-N-methyl-formamidine, N-ethyl-N'-[5-methoxy-2-methyl-4-[2-trifluoromethyl) tetrahydrofuran-2-yl]phenyl]-N-methyl-formamidine, N-(2-fluorophenyl)-4-[5-(trifluoromethyl)-1,2,4-oxadiazol-3-yl]benzamide, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl] propanamide, [(1S,2S)-1-methyl-2-(o-tolyl) propyl] (2 S)-2-[(4-methoxy-3-propanoyloxy-pyridine-2-carbonyl)amino]propanoate, 1-methoxy-3-methyl-1-[[4-[5-(trifluoromethyl)-1,2,4-oxadiazol-3-yl]phenyl]methyl] urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl]phenyl]methyl]isoxazolidin-3-one, 5,5-dimethyl-2-[[4-[5-(trifluoromethyl)-1,2,4-oxadiazol-3-yl]phenyl] methyl]isoxazolidin-3-one, ethyl 1-[[4-[5-(trifluoromethyl)-1,2,4-oxadiazol-3-yl]phenyl]methyl] pyrazole-4-carboxylate, N,N-dimethyl-1-[[4-[5-(trifluoromethyl)-1,2,4-oxadiazol-3-yl]phenyl] methyl]-1,2,4-triazol amine, 2-[6-(4-chlorophenoxy)-2-(trifluoromethyl)-3-pyridyl]-1-(1,2,4-triazol-1-yl) propan-2-ol, 2-[6-(4-bromophenoxy)-2-(trifluoromethyl)-3-pyridyl]-1-(1,2,4-triazol-1-yl) propan-2-ol, 3-[2-(1-chlorocyclopropyl)-3-(2-fluorophenyl)-2-hydroxy-propyl]imidazole-4-carbonitrile, 3-[2-(1-chloro-cyclopropyl)-3-(3-chloro-2-fluoro-phenyl)-2-hydroxy-propyl]imidazole-4-carbonitrile, (4-phenoxyphenyl) methyl 2-amino-6-methyl-pyridine-3-carboxylate, N-methyl-4-[5-(trifluoromethyl)-1,2,4-oxadiazol-3-yl] benzenecarbothioamide, N-methyl-4-[5-(trifluoromethyl)-1,2,4-oxadiazol-3-yl]benzamide, (Z,2E)-5-[1-(2,4-dichlorophenyl) pyrazol-3-yl]oxy-2-methoxyimino-N, 3-dimethyl-pent-3-enamide, (5-methyl-2-pyridyl)-[4-[5-(trifluoromethyl)-1,2,4-oxadiazol-3-yl]phenyl] methanone, (3-methylisoxazol-5-yl)-[4-[5-(trifluoromethyl)-1,2,4-oxadiazol-3-yl]phenyl] methanone, ethyl 1-[[5-[5-(trifluoromethyl)-1,2,4-oxadiazol-3-yl]-2-thienyl]methyl]pyrazole-4-carboxylate, 2,2-difluoro-N-methyl-2-[4-[5-(trifluoromethyl)-1,2,4-oxadiazol-3-yl]phenyl] acetamide, N—[(Z)-methoxyiminomethyl]-4-[5-(trifluoromethyl)-1,2,4-oxadiazol-3-yl]benzamide, N—[N-methoxy-C-methyl-carbonimidoyl]-4-[5-(trifluoromethyl)-1,2,4-oxadiazol-3-yl]benzamide, N—[3-(4-chlorophenyl)-4,5-dihydroisoxazol-5-yl]-5-methyl-1,2,4-oxadiazole-3-carboxamide, 2-(difluoromethyl)-N-(1,1-dimethyl-3-propyl-indan-4-yl)pyridine-3-carboxamide, [(1S,2S)-2-(4-fluoro-2-methyl-phenyl)-1,3-dimethyl-butyl] (2S)-2-[(3-acetoxy-4-methoxy-pyridine-2-carbonyl)amino]propanoate, [(1S,2S)-2-(4-fluoro-2-methyl-phenyl)-1,3-dimethyl-butyl] (2S)-2-[[3-(acetoxymethoxy)-4-methoxy-pyridine-2-carbonyl]amino]propanoate, cis-jasmone, potassium phosphonate, calcium phosphonate, glyphosate, 2,4-D, dicamba, glufosinate, thiamethoxam, cyclobutrifluram, isocycloseram, spiropidion, abamectin, emamectin, cyantraniliprole, chlorantraniliprole, diafenthiuron, broflanilide, 2-chloro-N-cyclopropyl-5-(1-{2,6-dichloro-4-[1,2,2,2-tetrafluoro-1-(trifluoromethyl)ethyl] phenyl}-1H-pyrazol-4-yl)-N-methylnicotinamide and fluxametamide.

2. The fungicidal composition according claim 1, wherein component (A) is a compound selected from:

methyl (Z)-2-(5-cyclobutyl-2-methyl-phenoxy)-3-methoxy-prop-2-enoate (compound X.01), methyl (Z)-2-(5-cyclopentyl-2-methyl-phenoxy)-3-methoxy-prop-2-enoate (compound X.02), methyl (Z)-2-(5-cyclopropyl-2-methyl-phenoxy)-3-methoxy-prop-2-enoate (compound X.03), methyl (Z)-2-(5-cyclohexyl-2-methyl-phenoxy)-3-methoxy-prop-2-enoate (compound X.04);

or an agronomically acceptable salt thereof.

3. The fungicidal composition according to claim 1, wherein component (A) is:

methyl (Z)-2-(5-cyclopentyl-2-methyl-phenoxy)-3-methoxy-prop-2-enoate (compound X.02), or methyl (Z)-2-(5-cyclohexyl-2-methyl-phenoxy)-3-methoxy-prop-2-enoate (compound X.04);

or an agronomically acceptable salt thereof.

4. The fungicidal composition according to claim 1, wherein component (B) is a compound selected from the group consisting of bixafen, triclopyricarb, cyproconazole, difenoconazole, epoxiconazole, flutriafol, hexaconazole, ipconazole, metconazole, prothioconazole, propiconazole, tebuconazole, azoxystrobin, dimoxystrobin, fenaminstrobin, flufenoxystrobin, fluoxastrobin, metominostrobin, trifloxystrobin, orysastrobin, picoxystrobin, pyraclostrobin, pyrametostrobin, pyraoxystrobin, mancozeb, chlorothalonil, fluxapyroxad, pyribencarb, benzovindiflupyr, isoflucypram, coumethoxystrobin, mandestrobin, mefentrifluconazole, ipfentrifluconazole, benzothiostrobin, metyltetraprole, enoxastrobin, coumoxystrobin, 2-[6-(4-chlorophenoxy)-2-(trifluoromethyl)-3-pyridyl]-1-(1,2,4-triazol-1-yl) propan-2-ol, 2-[6-(4-bromophenoxy)-2-(trifluoromethyl)-3-pyridyl]-1-(1,2,4-triazol-1-yl) propan-2-ol, 3-[2-(1-chlorocyclopropyl)-3-(2-fluorophenyl)-2-hydroxy-propyl] imidazole-4-carbonitrile and 3-[2-(1-chlorocyclopropyl)-3-(3-chloro-2-fluoro-phenyl)-2-hydroxy-propyl]imidazole-4-carbonitrile.

5. The fungicidal composition according to claim 1, wherein component (B) is a compound selected from the group consisting of cyproconazole, difenoconazole, hexaconazole, prothioconazole, propiconazole, azoxystrobin, trifloxystrobin, picoxystrobin, pyraclostrobin, mancozeb, chlorothalonil, fluxapyroxad, benzovindiflupyr, isoflucypram and metyltetraprole.

6. The fungicidal composition according to claim 1, wherein component (B) is azoxystrobin or trifloxystrobin.

7. The fungicidal composition according to claim 1, wherein the weight ratio of component (A) to component (B) is from 100:1 to 1:100.

8. The fungicidal composition according to claim 1, wherein the weight ratio of component (A) to component (B) is from 20:1 to 1:40.

9. The fungicidal composition according to claim 1, wherein the weight ratio of component (A) to component (B) is from 12:1 to 1:25.

10. The fungicidal composition according to claim 1, wherein the weight ratio of component (A) to component (B) is from 5:1 and 1:15.

11. The fungicidal composition according to claim 1, wherein the weight ratio of component (A) to component (B) is from 2:1 to 1:5.

12. The fungicidal composition according to claim 1, wherein the composition further comprises an agriculturally acceptable carrier and, optionally, a surfactant and/or formulation adjuvants.

13. A method of controlling or preventing phytopathogenic diseases on useful plants or on propagation material thereof, which comprises applying to the useful plants, the locus thereof or propagation material thereof the fungicidal composition as defined in claim 1.

14. The method according to claim 13, wherein the composition components (A) and (B) are applied in a sequential manner.

15. The fungicidal composition according to claim 1, wherein the component (A) is methyl (Z)-2-(5-cyclopentyl-2-methyl-phenoxy)-3-methoxy-prop-2-enoate (compound X.02), or an agronomically acceptable salt thereof; and the component (B) is selected from azoxystrobin, trifloxystrobin, fenpropidin, fenpropimorph, pyraclostrobin, metyltetraprole, benzovindiflupyr, pydiflumetofen, prothioconazole, difenoconazole, cyproconazole, or (Z,2E)-5-[1-(2,4-dichlorophenyl) pyrazol-3-yl]oxy-2-methoxyimino-N,3-dimethyl-pent-3-enamide.

16. The fungicidal composition according to claim 15, wherein the weight ratio of the component (A) to the component (B) is from 1:1 to 1:400.

17. The fungicidal composition according to claim 16, wherein the weight ratio of the component (A) to the component (B) is from 1:1 to 1:20.

18. The fungicidal composition according to claim 1, wherein the component (A) is methyl (Z)-2-(5-cyclohexyl-2-methyl-phenoxy)-3-methoxy-prop-2-enoate (compound X.04), or an agronomically acceptable salt thereof; and the component (B) is selected from azoxystrobin, trifloxystrobin, fenpropimorph, fenpropidin, mancozeb, chlorothalonil, folpet, trifloxystrobin, metyltetraprole, pyraclostrobin, benzovindiflupyr, pydiflumetofen, prothioconazole, difenoconazole, cyproconazole, or (Z,2E)-5-[1-(2,4-dichlorophenyl) pyrazol-3-yl]oxy-2-methoxyimino-N,3-dimethyl-pent-3-enamide.

19. The fungicidal composition according to claim 18, wherein the weight ratio of the component (A) to the component (B) is from 1:1 to 1:800.

* * * * *